(12) United States Patent
Wan et al.

(10) Patent No.: US 12,666,163 B2
(45) Date of Patent: Jun. 23, 2026

(54) AUTOMATED ROOM-SPECIFIC WHITE BALANCE CORRECTION IN A BUILDING IMAGE WITH VISUAL DATA SHOWING MULTIPLE ROOMS

(71) Applicant: MFTB Holdco, Inc., Seattle, WA (US)

(72) Inventors: Zhiqiang Wan, Lynnwood, WA (US); Jasmine Jayant Bhanushali, Bothell, WA (US); Haithem Albadawi, Redmond, WA (US)

(73) Assignee: MFTB Holdco, Inc., Seattle, WA (US)

( * ) Notice: Subject to any disclaimer, the term of this patent is extended or adjusted under 35 U.S.C. 154(b) by 0 days.

(21) Appl. No.: 18/676,299

(22) Filed: May 28, 2024

(65) Prior Publication Data

US 2025/0373952 A1 Dec. 4, 2025

(51) Int. Cl.
H04N 23/88 (2023.01)
H04N 23/61 (2023.01)
(Continued)

(52) U.S. Cl.
CPC ............. H04N 23/88 (2023.01); H04N 23/61 (2023.01); H04N 23/698 (2023.01); H04N 23/71 (2023.01); H04N 23/76 (2023.01)

(58) Field of Classification Search
CPC ...... H04N 23/88; H04N 23/61; H04N 23/698; H04N 23/71; H04N 23/76
See application file for complete search history.

(56) References Cited

U.S. PATENT DOCUMENTS 5,140,352 A 8/1992 Moore et al.
6,031,540 A 2/2000 Golin et al.
(Continued)

FOREIGN PATENT DOCUMENTS

EP 2413097 A2 2/2012
EP 2505961 A2 10/2012
(Continued)

OTHER PUBLICATIONS

CubiCasa | From video to floor plan in under 5 minutes, retrieved on Mar. 26, 2019, from https://www.cubi.casa/, 6 pages.
(Continued)

*Primary Examiner* — Shadan E Haghani
(74) *Attorney, Agent, or Firm* — VLP Law Group LLP; James A.D. White

(57) ABSTRACT

Techniques are described for using computing devices to perform automated operations involving, for an image acquired at a building and having visual data that shows portions of multiple separate rooms or other spatial regions at the building, automatically analyzing and manipulating visual data of the image to perform white balancing corrections separately for different parts of the image corresponding to the different spatial regions, such as to separately correct for different illumination levels in the different spatial regions. The described techniques may further include using one or more resulting modified images with white balancing corrections in one or more further automated manners, such as to determine one or more types of building information (e.g., a building floor plan) for an as-built multi-room building, and optionally further using the determined building information to provide navigational data for the building.

10 Claims, 20 Drawing Sheets
(9 of 20 Drawing Sheet(s) Filed in Color)

(51) Int. Cl.
    *H04N 23/698*      (2023.01)
    *H04N 23/71*       (2023.01)
    *H04N 23/76*       (2023.01)

(56)            References Cited

U.S. PATENT DOCUMENTS

| | | | |
|---|---|---|---|
| 6,141,034 A | 10/2000 | McCutchen | |
| 6,317,166 B1 | 11/2001 | McCutchen | |
| 6,320,584 B1 | 11/2001 | Golin et al. | |
| 6,323,858 B1 | 11/2001 | Gilbert et al. | |
| 6,337,683 B1 | 1/2002 | Gilbert et al. | |
| 6,654,019 B2 | 11/2003 | Gilbert et al. | |
| 6,683,608 B2 | 1/2004 | Golin et al. | |
| 6,690,374 B2 | 2/2004 | Park et al. | |
| 6,731,305 B1 | 5/2004 | Park et al. | |
| 6,738,073 B2 | 5/2004 | Park et al. | |
| 7,050,085 B1 | 5/2006 | Park et al. | |
| 7,129,971 B2 | 10/2006 | McCutchen | |
| 7,196,722 B2 | 3/2007 | White et al. | |
| 7,525,567 B2 | 4/2009 | McCutchen | |
| 7,620,909 B2 | 11/2009 | Park et al. | |
| 7,627,235 B2 | 12/2009 | McCutchen et al. | |
| 7,782,319 B2 | 8/2010 | Ghosh et al. | |
| 7,791,638 B2 | 9/2010 | McCutchen | |
| 7,909,241 B2 | 3/2011 | Stone et al. | |
| 7,973,838 B2 | 7/2011 | McCutchen | |
| 8,072,455 B2 | 12/2011 | Temesvari et al. | |
| 8,094,182 B2 | 1/2012 | Park et al. | |
| RE43,786 E | 11/2012 | Cooper | |
| 8,463,020 B1 | 6/2013 | Schuckmann et al. | |
| 8,517,256 B2 | 8/2013 | Stone et al. | |
| 8,520,060 B2 | 8/2013 | Zomet et al. | |
| 8,523,066 B2 | 9/2013 | Stone et al. | |
| 8,523,067 B2 | 9/2013 | Stone et al. | |
| 8,528,816 B2 | 9/2013 | Stone et al. | |
| 8,540,153 B2 | 9/2013 | Stone et al. | |
| 8,594,428 B2 | 11/2013 | Aharoni et al. | |
| 8,654,180 B2 | 2/2014 | Zomet et al. | |
| 8,666,815 B1 | 3/2014 | Chau | |
| 8,699,005 B2 | 4/2014 | Likholyot | |
| 8,705,892 B2 | 4/2014 | Aguilera et al. | |
| RE44,924 E | 6/2014 | Cooper et al. | |
| 8,854,684 B2 | 10/2014 | Zomet | |
| 8,861,840 B2 | 10/2014 | Bell et al. | |
| 8,861,841 B2 | 10/2014 | Bell et al. | |
| 8,879,828 B2 | 11/2014 | Bell et al. | |
| 8,953,871 B2 | 2/2015 | Zomet | |
| 8,989,440 B2 | 3/2015 | Klusza et al. | |
| 8,996,336 B2 | 3/2015 | Malka et al. | |
| 9,021,947 B2 | 5/2015 | Landa | |
| 9,026,947 B2 | 5/2015 | Lee et al. | |
| 9,035,968 B2 | 5/2015 | Zomet | |
| 9,041,796 B2 | 5/2015 | Malka et al. | |
| 9,071,714 B2 | 6/2015 | Zomet | |
| 9,129,438 B2 | 9/2015 | Aarts et al. | |
| 9,151,608 B2 | 10/2015 | Malka et al. | |
| 9,165,410 B1 | 10/2015 | Bell et al. | |
| 9,171,405 B1 | 10/2015 | Bell et al. | |
| 9,324,190 B2 | 4/2016 | Bell et al. | |
| 9,361,717 B2 | 6/2016 | Zomet | |
| 9,396,586 B2 | 7/2016 | Bell et al. | |
| 9,438,759 B2 | 9/2016 | Zomet | |
| 9,438,775 B2 | 9/2016 | Powers et al. | |
| 9,489,775 B1 | 11/2016 | Bell et al. | |
| 9,495,783 B1 | 11/2016 | Samarasekera et al. | |
| 9,576,401 B2 | 2/2017 | Zomet | |
| 9,619,933 B2 | 4/2017 | Spinella-Marno et al. | |
| 9,635,252 B2 | 4/2017 | Accardo et al. | |
| 9,641,702 B2 | 5/2017 | Bin-Nun et al. | |
| 9,760,994 B1 | 9/2017 | Bell et al. | |
| 9,786,097 B2 | 10/2017 | Bell et al. | |
| 9,787,904 B2 | 10/2017 | Birkler et al. | |
| 9,836,885 B1 * | 12/2017 | Eraker | G06Q 30/0623 |
| 9,852,351 B2 | 12/2017 | Aguilera Perez et al. | |
| 9,953,111 B2 | 4/2018 | Bell et al. | |
| 9,953,430 B1 | 4/2018 | Zakhor | |
| 9,990,760 B2 | 6/2018 | Aguilera Perez et al. | |
| 9,990,767 B1 | 6/2018 | Sheffield et al. | |
| 10,026,224 B2 | 7/2018 | Bell et al. | |
| 10,030,979 B2 | 7/2018 | Bjorke et al. | |
| 10,055,876 B2 | 8/2018 | Ford et al. | |
| 10,068,344 B2 | 9/2018 | Jovanovic et al. | |
| 10,083,522 B2 | 9/2018 | Jovanovic et al. | |
| 10,102,639 B2 | 10/2018 | Bell et al. | |
| 10,102,673 B2 | 10/2018 | Eraker et al. | |
| 10,120,397 B2 | 11/2018 | Zakhor et al. | |
| 10,122,997 B1 | 11/2018 | Sheffield et al. | |
| 10,127,718 B2 | 11/2018 | Zakhor et al. | |
| 10,127,722 B2 | 11/2018 | Shakib et al. | |
| 10,139,985 B2 | 11/2018 | Mildrew et al. | |
| 10,163,261 B2 | 12/2018 | Bell et al. | |
| 10,163,271 B1 | 12/2018 | Powers et al. | |
| 10,181,215 B2 | 1/2019 | Sedeffow | |
| 10,192,115 B1 | 1/2019 | Sheffield et al. | |
| 10,204,185 B2 | 2/2019 | Mrowca et al. | |
| 10,210,285 B2 | 2/2019 | Wong et al. | |
| 10,235,797 B1 | 3/2019 | Sheffield et al. | |
| 10,242,400 B1 | 3/2019 | Eraker et al. | |
| 10,339,716 B1 | 7/2019 | Powers et al. | |
| 10,366,531 B2 | 7/2019 | Sheffield | |
| 10,375,306 B2 | 8/2019 | Shan et al. | |
| 10,395,435 B2 | 8/2019 | Powers et al. | |
| 10,530,997 B2 | 1/2020 | Shan et al. | |
| 10,643,386 B2 | 5/2020 | Li et al. | |
| 10,708,507 B1 | 7/2020 | Dawson et al. | |
| 10,809,066 B2 * | 10/2020 | Colburn | G06V 20/20 |
| 10,825,247 B1 | 11/2020 | Vincent et al. | |
| 10,834,317 B2 | 11/2020 | Boyadzhiev et al. | |
| 11,055,531 B2 | 7/2021 | Maestas | |
| 11,057,561 B2 | 7/2021 | Shan et al. | |
| 11,164,361 B2 | 11/2021 | Moulon et al. | |
| 11,164,368 B2 | 11/2021 | Vincent et al. | |
| 11,165,959 B2 | 11/2021 | Shan et al. | |
| 11,200,421 B1 | 12/2021 | Chavez et al. | |
| 11,217,019 B2 | 1/2022 | Li et al. | |
| 11,238,652 B2 | 2/2022 | Impas et al. | |
| 11,243,656 B2 | 2/2022 | Li et al. | |
| 11,252,329 B1 | 2/2022 | Cier et al. | |
| 11,284,006 B2 | 3/2022 | Dawson et al. | |
| 11,405,549 B2 | 8/2022 | Cier et al. | |
| 11,405,558 B2 | 8/2022 | Dawson et al. | |
| 11,408,738 B2 | 8/2022 | Colburn et al. | |
| 11,480,433 B2 | 10/2022 | Colburn et al. | |
| 11,481,925 B1 | 10/2022 | Li et al. | |
| 11,494,973 B2 | 11/2022 | Boyadzhiev et al. | |
| 11,501,492 B1 | 11/2022 | Li et al. | |
| 11,514,674 B2 | 11/2022 | Moulon et al. | |
| 11,592,969 B2 | 2/2023 | Li et al. | |
| 11,632,516 B2 | 4/2023 | Boyadzhiev et al. | |
| 11,632,602 B2 | 4/2023 | Cier et al. | |
| 11,638,069 B2 | 4/2023 | Guan et al. | |
| 11,645,781 B2 | 5/2023 | Li et al. | |
| 11,676,344 B2 | 6/2023 | Li et al. | |
| 11,790,648 B2 | 10/2023 | Stoeva et al. | |
| 11,797,159 B2 | 10/2023 | Li et al. | |
| 11,823,325 B2 | 11/2023 | Vincent et al. | |
| 11,830,135 B1 | 11/2023 | Khosravan et al. | |
| 11,836,973 B2 | 12/2023 | Wixson et al. | |
| 11,842,464 B2 | 12/2023 | Khosravan et al. | |
| 2006/0256109 A1 | 11/2006 | Acker et al. | |
| 2007/0133071 A1 * | 6/2007 | Noyes | H04N 23/88 358/518 |
| 2010/0208099 A1 * | 8/2010 | Nomura | H04N 23/88 348/E9.051 |
| 2010/0232709 A1 | 9/2010 | Zhang et al. | |
| 2012/0075414 A1 | 3/2012 | Park et al. | |
| 2012/0293613 A1 | 11/2012 | Powers et al. | |
| 2013/0050407 A1 | 2/2013 | Brinda et al. | |
| 2013/0342533 A1 | 12/2013 | Bell et al. | |
| 2014/0043436 A1 | 2/2014 | Bell et al. | |
| 2014/0044343 A1 | 2/2014 | Bell et al. | |
| 2014/0044344 A1 | 2/2014 | Bell et al. | |
| 2014/0125658 A1 | 5/2014 | Bell et al. | |
| 2014/0125767 A1 | 5/2014 | Bell et al. | |

(56) References Cited

U.S. PATENT DOCUMENTS

| | | | |
|---|---|---|---|
| 2014/0125768 A1 | 5/2014 | Bell et al. | |
| 2014/0125769 A1 | 5/2014 | Bell et al. | |
| 2014/0125770 A1 | 5/2014 | Bell et al. | |
| 2014/0236482 A1 | 8/2014 | Dorum et al. | |
| 2014/0267631 A1 | 9/2014 | Powers et al. | |
| 2014/0307100 A1 | 10/2014 | Myllykoski et al. | |
| 2014/0320674 A1 | 10/2014 | Kuang | |
| 2015/0109338 A1 | 4/2015 | McKinnon et al. | |
| 2015/0116691 A1 | 4/2015 | Likholyot | |
| 2015/0189165 A1 | 7/2015 | Milosevski et al. | |
| 2015/0262421 A1 | 9/2015 | Bell et al. | |
| 2015/0269785 A1 | 9/2015 | Bell et al. | |
| 2015/0302636 A1 | 10/2015 | Arnoldus et al. | |
| 2015/0310596 A1 | 10/2015 | Sheridan et al. | |
| 2015/0326841 A1* | 11/2015 | Cho | H04N 23/88 |
| | | | 348/223.1 |
| 2015/0332464 A1 | 11/2015 | O'Keefe et al. | |
| 2016/0055268 A1 | 2/2016 | Bell et al. | |
| 2016/0134860 A1 | 5/2016 | Jovanovic et al. | |
| 2016/0140676 A1 | 5/2016 | Fritze et al. | |
| 2016/0217225 A1 | 7/2016 | Bell et al. | |
| 2016/0260250 A1 | 9/2016 | Jovanovic et al. | |
| 2016/0286119 A1 | 9/2016 | Rondinelli | |
| 2016/0300385 A1 | 10/2016 | Bell et al. | |
| 2017/0034430 A1 | 2/2017 | Fu et al. | |
| 2017/0067739 A1 | 3/2017 | Siercks et al. | |
| 2017/0194768 A1 | 7/2017 | Powers et al. | |
| 2017/0195654 A1 | 7/2017 | Powers et al. | |
| 2017/0263050 A1 | 9/2017 | Ha et al. | |
| 2017/0324941 A1 | 11/2017 | Birkler | |
| 2017/0330273 A1 | 11/2017 | Holt et al. | |
| 2017/0337737 A1 | 11/2017 | Edwards et al. | |
| 2018/0007340 A1 | 1/2018 | Stachowski | |
| 2018/0025536 A1 | 1/2018 | Bell et al. | |
| 2018/0075168 A1 | 3/2018 | Tiwari et al. | |
| 2018/0139431 A1 | 5/2018 | Simek et al. | |
| 2018/0143023 A1 | 5/2018 | Bjorke et al. | |
| 2018/0143756 A1 | 5/2018 | Mildrew et al. | |
| 2018/0144487 A1 | 5/2018 | Bell et al. | |
| 2018/0144535 A1 | 5/2018 | Ford et al. | |
| 2018/0144547 A1 | 5/2018 | Shakib et al. | |
| 2018/0144555 A1 | 5/2018 | Ford et al. | |
| 2018/0146121 A1 | 5/2018 | Hensler et al. | |
| 2018/0146193 A1 | 5/2018 | Safreed et al. | |
| 2018/0146212 A1 | 5/2018 | Hensler et al. | |
| 2018/0165871 A1 | 6/2018 | Mrowca | |
| 2018/0203955 A1 | 7/2018 | Bell et al. | |
| 2018/0241985 A1 | 8/2018 | O'Keefe et al. | |
| 2018/0293793 A1 | 10/2018 | Bell et al. | |
| 2018/0300936 A1 | 10/2018 | Ford et al. | |
| 2018/0306588 A1 | 10/2018 | Bjorke et al. | |
| 2018/0348854 A1 | 12/2018 | Powers et al. | |
| 2018/0365496 A1 | 12/2018 | Hovden et al. | |
| 2019/0012833 A1 | 1/2019 | Eraker et al. | |
| 2019/0026956 A1 | 1/2019 | Gausebeck et al. | |
| 2019/0026957 A1 | 1/2019 | Gausebeck | |
| 2019/0026958 A1 | 1/2019 | Gausebeck et al. | |
| 2019/0035165 A1 | 1/2019 | Gausebeck | |
| 2019/0041972 A1 | 2/2019 | Bae | |
| 2019/0045163 A1* | 2/2019 | Nikkanen | H04N 1/6077 |
| 2019/0050137 A1 | 2/2019 | Mildrew et al. | |
| 2019/0051050 A1 | 2/2019 | Bell et al. | |
| 2019/0051054 A1 | 2/2019 | Jovanovic et al. | |
| 2019/0087067 A1 | 3/2019 | Hovden et al. | |
| 2019/0122422 A1 | 4/2019 | Sheffield et al. | |
| 2019/0164335 A1 | 5/2019 | Sheffield et al. | |
| 2019/0180104 A1 | 6/2019 | Sheffield et al. | |
| 2019/0251645 A1 | 8/2019 | Winans | |
| 2019/0287164 A1 | 9/2019 | Eraker et al. | |
| 2020/0396434 A1 | 12/2020 | Romanenko et al. | |
| 2021/0065271 A1 | 3/2021 | Benkreira et al. | |
| 2022/0076491 A1 | 3/2022 | Zellner et al. | |
| 2022/0092227 A1 | 3/2022 | Yin et al. | |
| 2022/0103795 A1 | 3/2022 | Lee et al. | |
| 2022/0164493 A1 | 5/2022 | Li et al. | |
| 2023/0071446 A1 | 3/2023 | Narayana et al. | |
| 2023/0125295 A1 | 4/2023 | Min et al. | |
| 2023/0138762 A1 | 5/2023 | Lambert et al. | |
| 2023/0196684 A1 | 6/2023 | Li et al. | |
| 2023/0206393 A1 | 6/2023 | Hutchcroft et al. | |
| 2024/0160797 A1* | 5/2024 | Narayana | G06V 10/82 |

FOREIGN PATENT DOCUMENTS

| | | | |
|---|---|---|---|
| EP | 2506170 A2 | 10/2012 | |
| EP | 4207069 A1 | 5/2023 | |
| JP | 2007158997 A | * 6/2007 | |
| KR | 101770648 B1 | 8/2017 | |
| KR | 101930796 B1 | 12/2018 | |
| WO | 2005091894 A2 | 10/2005 | |
| WO | 2016154306 A1 | 9/2016 | |
| WO | 2018204279 A1 | 11/2018 | |
| WO | 2019058266 A1 | 3/2019 | |
| WO | 2019083832 A1 | 5/2019 | |
| WO | 2019104049 A1 | 5/2019 | |
| WO | 2019118599 A2 | 6/2019 | |
| WO | 2020068177 A1 | 4/2020 | |
| WO | 2022053888 A1 | 3/2022 | |
| WO | 2022183321 A1 | 9/2022 | |

OTHER PUBLICATIONS

CubiCasa FAQ & Manual, retrieved on Mar. 26, 2019, from https://www.cubi.casa/faq/, 5 pages.
Cupix Home, retrieved on Mar. 26, 2019, from https://www.cupix.com/, 1 page.
Cupix—FAQ, retrieved on Mar. 26, 2019, from https://www.cupix.com/faq.html, 3 pages.
IGuide: 3D Virtual Tours, retrieved on Mar. 26, 2019, from https://goiguide.com/, 6 pages.
Immoviewer.com | Automated Video Creation & Simple Affordable 3D 360 Tours, retrieved on Mar. 26, 2019, from https://www.immoviewer.com/, 5 pages.
MagicPlan | #1 Floor Plan App, Construction & Surveying Samples, retrieved on Mar. 26, 2019, from https://www.magicplan.app/, 9 pages.
EyeSpy360 Virtual Tours | Virtual Tour with any 360 camera, retrieved on Mar. 27, 2019, from https://www.eyespy360.com/en-us/, 15 pages.
Indoor Reality, retrieved on Mar. 27, 2019, from https://www.indoorreality.com/, 9 pages.
InsideMaps, retrieved on Mar. 27, 2019, from https://www.insidemaps.com/, 7 pages.
IStaging | Augmented & Virtual Reality Platform for Business, retrieved on Mar. 27, 2019, from https://www.istaging.com/en/, 7 pages.
Metareal, retrieved on Mar. 27, 2019, from https://www.metareal.com/, 4 pages.
PLNAR—The Ar 3D Measuring / Modeling Platform, retrieved on Mar. 27, 2019, from https://www.plnar. co, 6 pages.
YouVR Global, retrieved on Mar. 27, 2019, from https://global.youvr.io/, 9 pages.
GeoCV, retrieved on Mar. 28, 2019, from https://geocv.com/, 4 pages.
Biersdorfer, J.D., "How to Make A 3-D Model of Your Home Renovation Vision," in The New York Times, Feb. 13, 2019, retrieved Mar. 28, 2019, 6 pages.
Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.
Immersive 3D for the Real World, retrieved from https://matterport.com/, on Mar. 27, 2017, 5 pages.
Learn About Our Complete 3D System, retrieved from https://matterport.com/how-it-works/, on Mar. 27, 2017, 6 pages.
Surefield FAQ, retrieved from https://surefield.com/faq, on Mar. 27, 2017, 1 page.
Why Surefield, retrieved from https://surefield.com/why-surefield, on Mar. 27, 2017, 7 pages.

(56) References Cited

OTHER PUBLICATIONS

Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.

Tango (platform), Wikipedia, retrieved from https://en.wikipedia.org/wiki/Tango_(platform), on Jun. 12, 2018, 5 pages.

Zou et al. "LayoutNet: Reconstructing the 3D Room Layout from a Single RGB Image" in arXiv:1803.08999, submitted Mar. 23, 2018, 9 pages.

Lee et al. "RoomNet: End-to-End Room Layout Estimation" in arXiv:1703.00241v2, submitted Aug. 7, 2017, 10 pages.

Time-of-flight camera, Wikipedia, retrieved from https://en.wikipedia.org/wiki/Time-of-flight_camera, on Aug. 30, 2018, 8 pages.

Magicplan—Android Apps on Go . . . , retrieved from https://play.google.com/store/apps/details?id=com.sensopia.magicplan, on Feb. 21, 2018, 5 pages.

Pintore et al., "AtlantaNet: Inferring the 3D Indoor Layout from a Single 360 Image beyond the Manhattan World Assumption", ECCV 2020, 16 pages.

Cowles, Jeremy, "Differentiable Rendering", Aug. 19, 2018, accessed Dec. 7, 2020 at https://towardsdatascience.com/differentiable-rendering-d00a4b0f14be, 3 pages.

Yang et al., "DuLa-Net: A Dual-Projection Network for Estimating Room Layouts from a Single RGB Panorama", in arXiv:1811.11977[cs.v2], submitted Apr. 2, 2019, 14 pages.

Sun et al., "HoHoNet: 360 Indoor Holistic Understanding with Latent Horizontal Features", in arXiv:2011.11498[cs.v2], submitted Nov. 24, 2020, 15 pages.

Nguyen-Phuoc et al., "RenderNet: A deep convolutional network for differentiable rendering from 3D shapes", in arXiv:1806.06575[cs.v3], submitted Apr. 1, 2019, 17 pages.

Convolutional neural network, Wikipedia, retrieved from https://en.wikipedia.org/wiki/Convolutional_neural_network, on Dec. 7, 2020, 25 pages.

Hamilton et al., "Inductive Representation Learning on Large Graphs", in 31st Conference on Neural Information Processing Systems (NIPS 2017), 2017, 19 pages.

Kipf et al., "Variational Graph Auto-Encoders", in arXiv:1611.07308v1 [stat.ML], submitted Nov. 21, 2016, 3 pages.

Cao et al., "MolGAN: An Implicit Generative Model for Small Molecular Graphs", in arXiv1805.11973v1 [stat. ML], submitted May 30, 2018, 11 pages.

Chen et al., "Intelligent Home 3D: Automatic 3D-House Design from Linguistic Descriptions Only", in arXiv:2003.00397v1 [cs.CV], submitted Mar. 1, 2020, 14 pages.

Cucurull et al., "Context-Aware Visual Compatibility Prediction", in arXiv:1902.03646v2 [cs.CV], submitted Feb. 12, 2019, 10 pages.

Fan et al., "Labeled Graph Generative Adversarial Networks", in arXiv:1906.03220v1 [cs.LG], submitted Jun. 7, 2019, 14 pages.

Gong et al., "Exploiting Edge Features in Graph Neural Networks", in arXiv:1809.02709v2 [cs.LG], submitted Jan. 28, 2019, 10 pages.

Genghis Goodman, "A Machine Learning Approach to Artificial Floorplan Generation", University of Kentucky Theses and Dissertations—Computer Science, 2019, accessible at https://uknowledge.uky.edu/cs_etds/89, 40 pages.

Grover et al., "node2vec: Scalable Feature Learning for Networks", in arXiv:1607.00653v1 [cs.SI], submitted Jul. 3, 2016, 10 pages.

Nauata et al., "House-GAN: Relational Generative Adversarial Networks for Graph-constrained House Layout Generation", in arXiv:2003.06988v1 [cs.CV], submitted Mar. 16, 2020, 17 pages.

Kang et al., "A Review of Techniques for 3D Reconstruction of Indoor Environments", in ISPRS International Journal of Geo-Information 2020, May 19, 2020, 31 pages.

Kipf et al., "Semi-Supervised Classification With Graph Convolutional Networks", in arXiv:1609.02907v4 [cs.LG], submitted Feb. 22, 2017, 14 pages.

Li et al., "Graph Matching Networks for Learning the Similarity of Graph Structured Objects", in Proceedings of the 36th International Conference on Machine Learning (PMLR 97), 2019, 18 pages.

Liu et al., "Hyperbolic Graph Neural Networks", in 33rd Conference on Neural Information Processing Systems (NeurIPS 2019), 2019, 12 pages.

Merrell et al., "Computer-Generated Residential Building Layouts", in ACM Transactions on Graphics, Dec. 2010, 13 pages.

Adobe, "Adjusting white balance settings to improve photos", accessed on Apr. 30, 2024 at https://www.adobe.com/creativecloud/photography/discover/white-balance.html, 10 pages.

Barnard et al., "Color Constancy for Scenes with Varying Illumination", Computer Vision and Image Understanding, 65, 2, pp. 311-321 (1997), 30 pages.

Cambridge in Colour, "Tutorials: White Balance", accessed Apr. 30, 2024 at https://www.cambridgeincolour.com/tutorials/white-balance.htm, 8 pages.

Freescale Semiconductor, "White Balance and Color Correction in Digital Cameras", 2000, accessed Apr. 30, 2024 at https://www.nxp.com/docs/en/application-note/AN1904.pdf, 6 pages.

Gershon et al., "From [R,G,B] to Surface Reflectance: Computing Color Constant Descriptors in Images", Proceedings of the 10th International Joint Conference on Artificial Intelligence. Milan, Italy, Aug. 23-28, 1987, 4 pages.

ResearchGate, "Computational Color Constancy: Survey and Experiments", IEEE Transactions on Image Processing, vol. 20, No. 9, Sep. 2011, 16 pages.

Edwin H. Land, "The Retinex Theory of Color Vision", Scientific American, vol. 237, No. 6, pp. 108-128, Dec. 1977, 18 pages.

Van de Weijer et al., "Edge-Based Color Constancy", IEEE Transactions on Image Processing, vol. 16, No. 9, Sep. 2007, 8 pages.

Xiong et al., "Automatic White Balancing via Gray Surface Identification", Proceedings of the Fifteenth IS&T Color Imaging Conference, Nov. 2007, 4 pages.

Mahmoud Afifi et al., "Auto White-Balance Correction for Mixed-Illuminant Scenes", Proceedings of the IEEE/CVF Winter Conference on Applications of Computer Vision (WACV), 2022, accessible at https://openaccess.thecvf.com/content/WACV2022/papers/Afifi_Auto_White-Balance_Correction_for_Mixed-Illuminant_Scenes_WACV_2022_paper.pdf, 10 pages.

Steve Cruz et al., "Zillow Indoor Dataset: Annotated Floor Plans With 360° Panoramas and 3D Room Layouts", 2021 IEEE/CVF Conference on Computer Vision and Pattern Recognition (CVPR), 2021, accessible at https://openaccess.thecvf.com/content/CVPR2021/papers/Cruz_Zillow_Indoor_Dataset_Annotated_Floor_Plans_With_360deg_Panoramas_and_CVPR_2021_paper.pdf, 11 pages.

* cited by examiner

230g

273 -- Co-Visibility Probability
274 -- Image Angular Correspondence
275/235 -- Wall-Floor Boundary
276 -- Window Location Probability
277 -- Doorway Location Probability
278 -- Inter-Wall Border Probability
252 -- Inter-Image Direction
279 -- Image Angular Visual Key

*Fig. 2M*
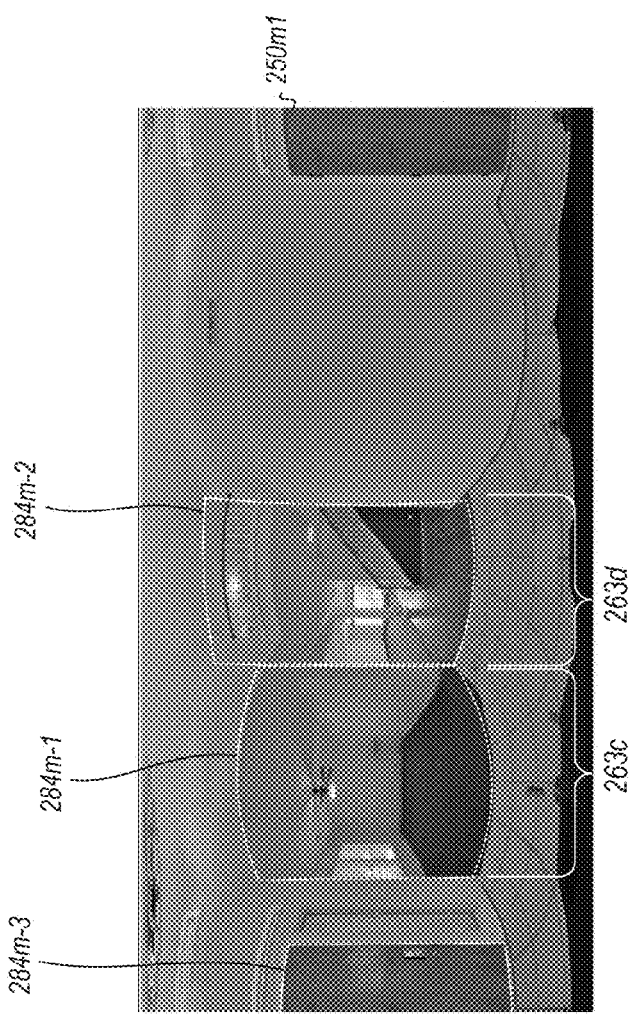

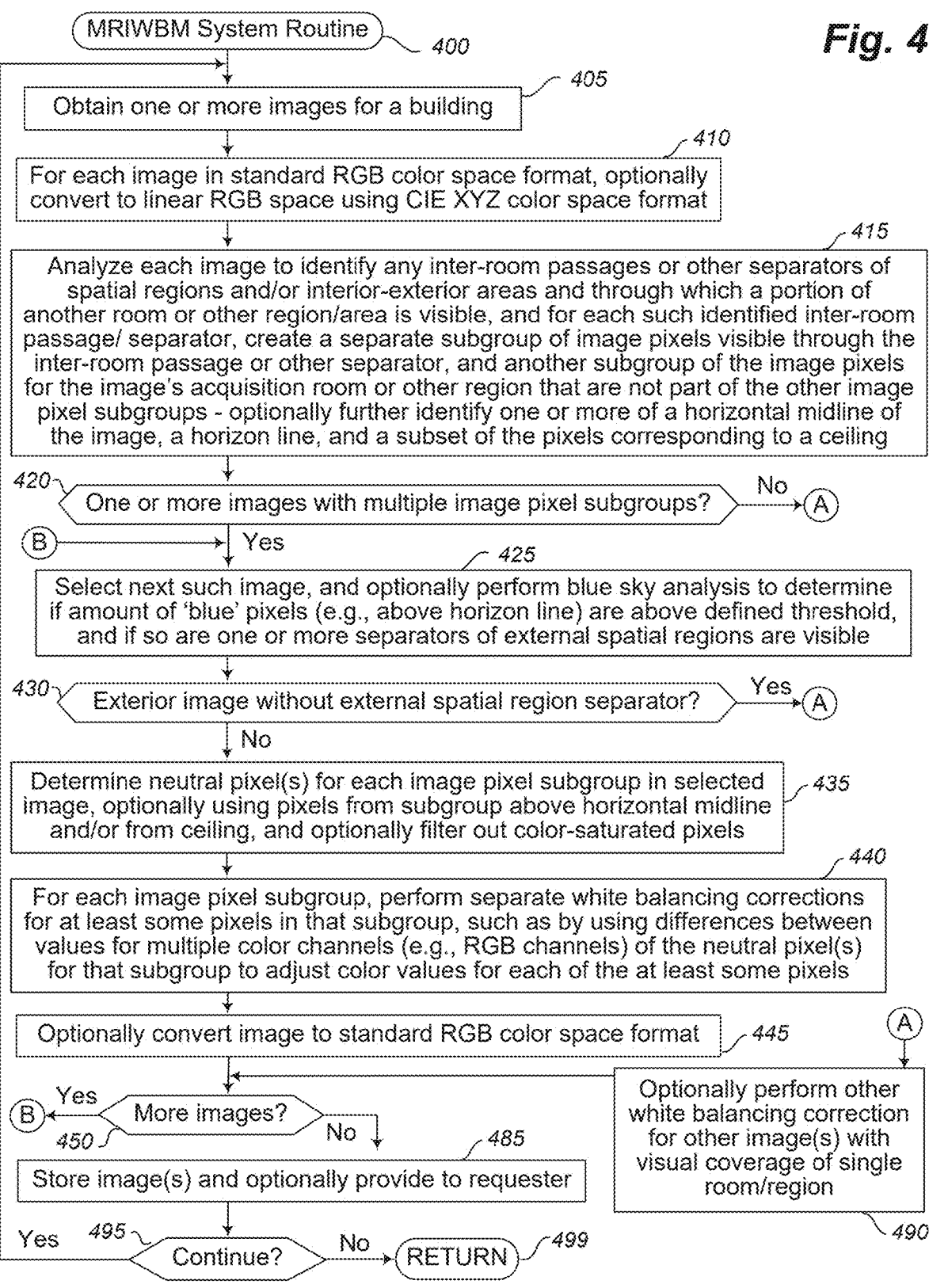

*Fig. 4*

MRIWBM System Routine — 400

Obtain one or more images for a building — 405

For each image in standard RGB color space format, optionally convert to linear RGB space using CIE XYZ color space format — 410

Analyze each image to identify any inter-room passages or other separators of spatial regions and/or interior-exterior areas and through which a portion of another room or other region/area is visible, and for each such identified inter-room passage/ separator, create a separate subgroup of image pixels visible through the inter-room passage or other separator, and another subgroup of the image pixels for the image's acquisition room or other region that are not part of the other image pixel subgroups - optionally further identify one or more of a horizontal midline of the image, a horizon line, and a subset of the pixels corresponding to a ceiling — 415

420 — One or more images with multiple image pixel subgroups? — No → (A)

(B) → Yes

Select next such image, and optionally perform blue sky analysis to determine if amount of 'blue' pixels (e.g., above horizon line) are above defined threshold, and if so are one or more separators of external spatial regions are visible — 425

430 — Exterior image without external spatial region separator? — Yes → (A)

No

Determine neutral pixel(s) for each image pixel subgroup in selected image, optionally using pixels from subgroup above horizontal midline and/or from ceiling, and optionally filter out color-saturated pixels — 435

For each image pixel subgroup, perform separate white balancing corrections for at least some pixels in that subgroup, such as by using differences between values for multiple color channels (e.g., RGB channels) of the neutral pixel(s) for that subgroup to adjust color values for each of the at least some pixels — 440

Optionally convert image to standard RGB color space format — 445

(A)

Optionally perform other white balancing correction for other image(s) with visual coverage of single room/region — 490

(B) ← Yes — More images? — No
450

Store image(s) and optionally provide to requester — 485

495 — Yes — Continue? — No → (RETURN) — 499

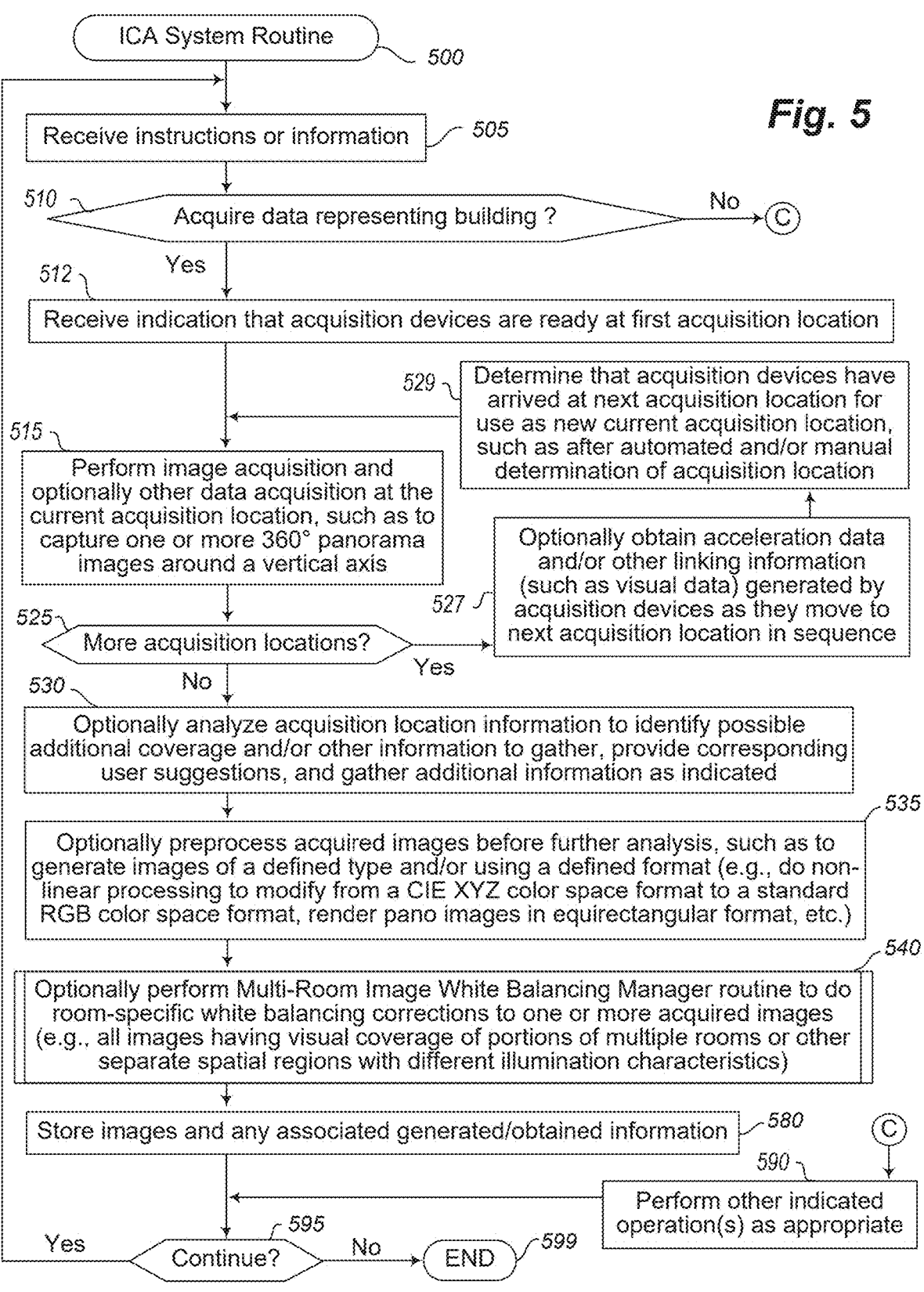

Fig. 5

ICA System Routine — 500

Receive instructions or information — 505

510 — Acquire data representing building ? — No — C

Yes

512 — Receive indication that acquisition devices are ready at first acquisition location 529 — Determine that acquisition devices have arrived at next acquisition location for use as new current acquisition location, such as after automated and/or manual determination of acquisition location 515 — Perform image acquisition and optionally other data acquisition at the current acquisition location, such as to capture one or more 360° panorama images around a vertical axis 527 — Optionally obtain acceleration data and/or other linking information (such as visual data) generated by acquisition devices as they move to next acquisition location in sequence 525 — More acquisition locations? — Yes No 530 — Optionally analyze acquisition location information to identify possible additional coverage and/or other information to gather, provide corresponding user suggestions, and gather additional information as indicated 535 — Optionally preprocess acquired images before further analysis, such as to generate images of a defined type and/or using a defined format (e.g., do non-linear processing to modify from a CIE XYZ color space format to a standard RGB color space format, render pano images in equirectangular format, etc.)

540 — Optionally perform Multi-Room Image White Balancing Manager routine to do room-specific white balancing corrections to one or more acquired images (e.g., all images having visual coverage of portions of multiple rooms or other separate spatial regions with different illumination characteristics)

580 — Store images and any associated generated/obtained information

C

590 — Perform other indicated operation(s) as appropriate

Yes — 595 — Continue? — No — END — 599

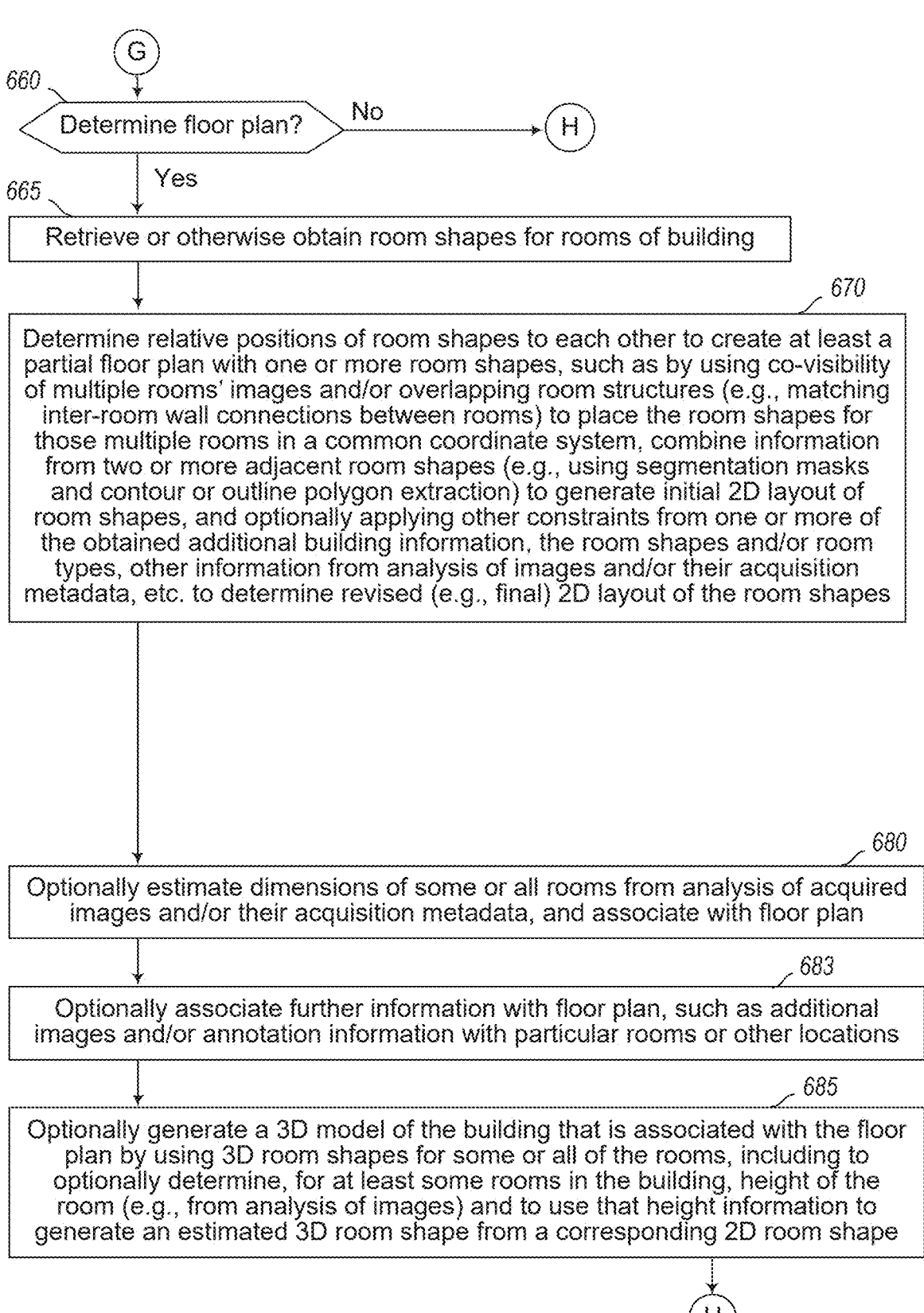

660

G

Determine floor plan?     No     H

665     Yes

Retrieve or otherwise obtain room shapes for rooms of building

670

Determine relative positions of room shapes to each other to create at least a partial floor plan with one or more room shapes, such as by using co-visibility of multiple rooms' images and/or overlapping room structures (e.g., matching inter-room wall connections between rooms) to place the room shapes for those multiple rooms in a common coordinate system, combine information from two or more adjacent room shapes (e.g., using segmentation masks and contour or outline polygon extraction) to generate initial 2D layout of room shapes, and optionally applying other constraints from one or more of the obtained additional building information, the room shapes and/or room types, other information from analysis of images and/or their acquisition metadata, etc. to determine revised (e.g., final) 2D layout of the room shapes

680

Optionally estimate dimensions of some or all rooms from analysis of acquired images and/or their acquisition metadata, and associate with floor plan

683

Optionally associate further information with floor plan, such as additional images and/or annotation information with particular rooms or other locations

685

Optionally generate a 3D model of the building that is associated with the floor plan by using 3D room shapes for some or all of the rooms, including to optionally determine, for at least some rooms in the building, height of the room (e.g., from analysis of images) and to use that height information to generate an estimated 3D room shape from a corresponding 2D room shape

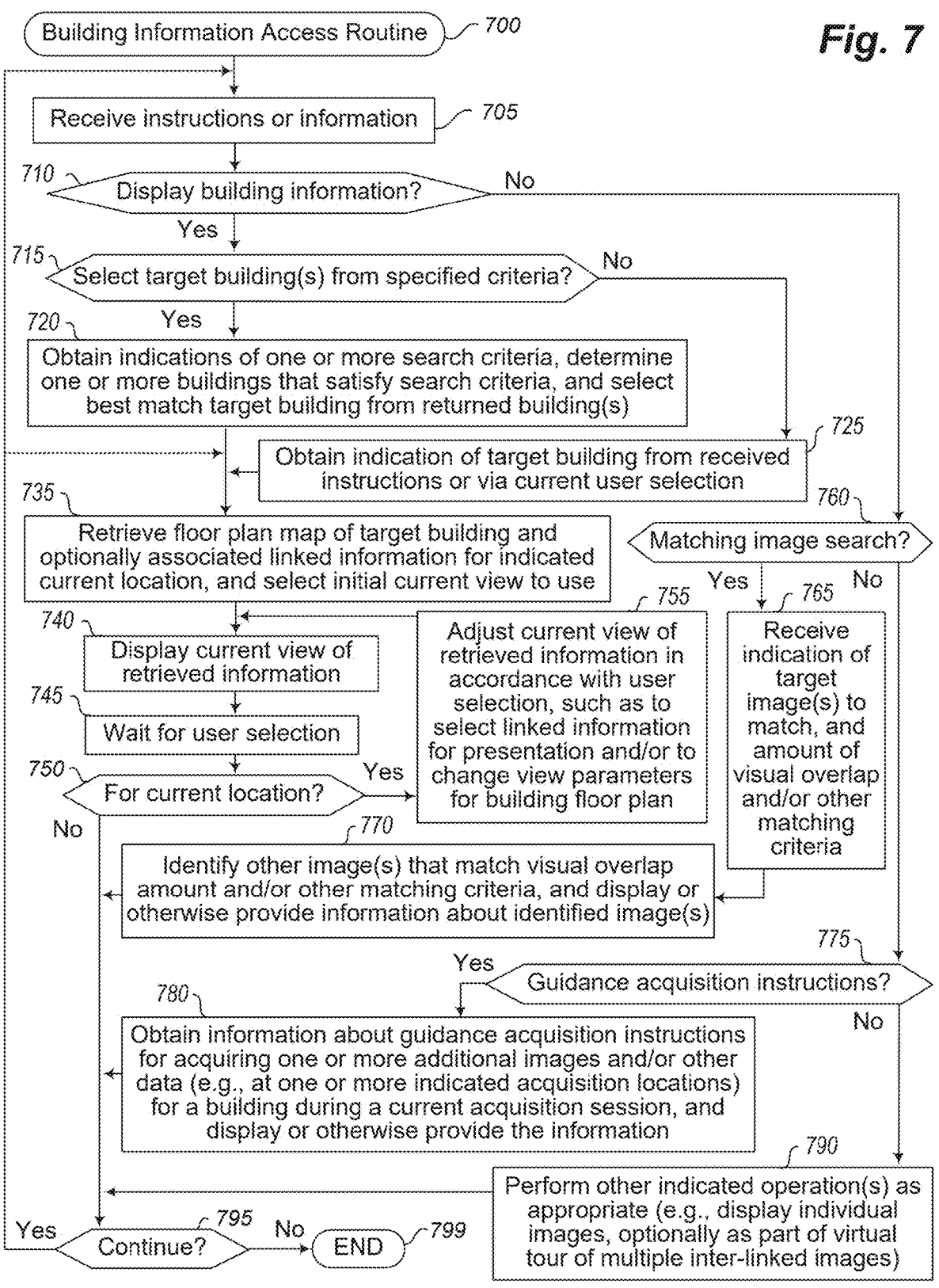

Fig. 7

Building Information Access Routine — 700

Receive instructions or information — 705

710 — Display building information? — No

Yes

715 — Select target building(s) from specified criteria? — No

Yes

720 — Obtain indications of one or more search criteria, determine one or more buildings that satisfy search criteria, and select best match target building from returned building(s)

725 — Obtain indication of target building from received instructions or via current user selection 735 — Retrieve floor plan map of target building and optionally associated linked information for indicated current location, and select initial current view to use 760 — Matching image search?

740 — Display current view of retrieved information

755 — Adjust current view of retrieved information in accordance with user selection, such as to select linked information for presentation and/or to change view parameters for building floor plan 765 — Receive indication of target image(s) to match, and amount of visual overlap and/or other matching criteria Yes     No 745 — Wait for user selection 750 — For current location? — Yes No 770 — Identify other image(s) that match visual overlap amount and/or other matching criteria, and display or otherwise provide information about identified image(s)

775 — Guidance acquisition instructions? — Yes

No

780 — Obtain information about guidance acquisition instructions for acquiring one or more additional images and/or other data (e.g., at one or more indicated acquisition locations) for a building during a current acquisition session, and display or otherwise provide the information 790 — Perform other indicated operation(s) as appropriate (e.g., display individual images, optionally as part of virtual tour of multiple inter-linked images)

Yes — 795 — Continue? — No — END — 799

AUTOMATED ROOM-SPECIFIC WHITE BALANCE CORRECTION IN A BUILDING IMAGE WITH VISUAL DATA SHOWING MULTIPLE ROOMS

TECHNICAL FIELD

The following disclosure relates generally to automated techniques to, for an image acquired at a building and whose visual data shows portions of multiple rooms of the building, automatically analyze and manipulate visual data of the image to perform white balancing corrections separately for different parts of the image corresponding to the different rooms, such as to separately correct for different illumination levels in the different rooms in a panorama image showing parts of the different rooms, and to further use the resulting modified image with the white balancing corrections in one or more further automated manners.

BACKGROUND

In various circumstances, such as architectural analysis, property inspection, real estate acquisition and development, general contracting, improvement cost estimation, etc., it may be desirable to know the interior of a house or other building without physically traveling to and entering the building. However, it can be difficult to effectively capture, represent and use such building interior information, including to identify buildings that satisfy criteria of interest, and to display visual information captured within building interiors to users at remote locations (e.g., to enable a user to understand the layout and other details of the interior, including to control the display in user-selected manners). Also, even if a user is present at a building, it can be difficult to effectively navigate the building and determine information about the building that is not readily apparent. While a floor plan of a building may provide some information about layout and other details of a building interior, such use of floor plans has some drawbacks, including that floor plans can be difficult to construct and maintain, to accurately scale and populate with information about room interiors, to visualize and otherwise use, etc.

In addition, when analyzing captured images, various types of image analyses have been performed, including in some situations to perform white balancing corrections to pixels of a captured image, such as to attempt to correct for a particular color of light emitted by a particular type of light source providing illumination for the area shown in the visual data of the image. However, such existing white balancing corrections suffer from various problems, such as to typically assume a single illumination source for an entire image or otherwise to assume consistent illumination across all pixels of an image—for example, such techniques may be inapplicable outside of a limited set of circumstances (e.g., an exterior setting where all of the visual coverage is of a single area with consistent illumination, a single room with consistent illumination, etc.).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A-2M illustrate examples of automatically analyzing visual data of an image acquired at a building that shows at least parts of multiple rooms in order to perform white balancing corrections separately for different parts of the image corresponding to the different rooms, and for subsequently using one or more such resulting modified images in one or more automated manners such as to determine a building floor plan and/or one or more other types of building information.

FIG. 4 illustrates an example embodiment of a flow diagram for a Multi-Room Image White Balancing Manager (MRIWBM) system routine in accordance with an embodiment of the present disclosure.

FIG. 5 illustrates an example embodiment of a flow diagram for an Image Capture and Analysis (ICA) system routine in accordance with an embodiment of the present disclosure.

FIGS. 6A-6B illustrate an example embodiment of a flow diagram for a Mapping Information Generation Manager (MIGM) system routine in accordance with an embodiment of the present disclosure.

FIG. 7 illustrates an example embodiment of a flow diagram for a Building Information Access system routine in accordance with an embodiment of the present disclosure.

DETAILED DESCRIPTION

Figure 1:
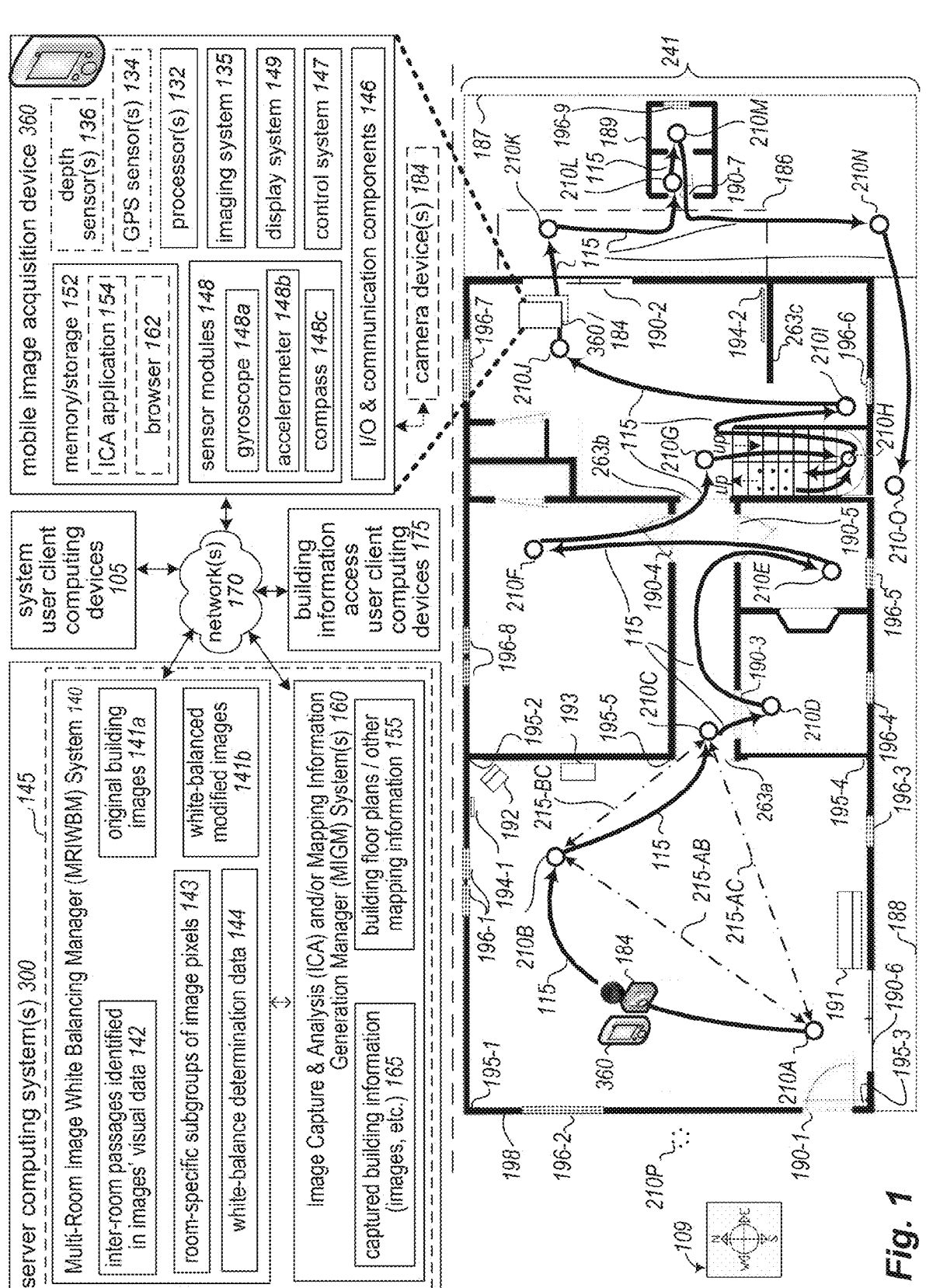
FIG. 1 includes a diagram depicting an exemplary building interior environment and computing system(s) for use in embodiments of the present disclosure, including to automatically analyze visual data of an image acquired at the building that shows at least parts of multiple rooms in order to perform white balancing corrections separately for different parts of the image corresponding to the different rooms.

The present disclosure describes techniques for using computing devices to perform automated operations involving, for an image acquired at a building and having visual data that shows portions of multiple separate spatial regions at the building, automatically analyzing and manipulating visual data of the image to perform white balancing corrections separately for different parts of the image corresponding to the different spatial regions, such as to separately correct for different illumination levels in multiple different rooms in a panorama image whose visual data shows at least part of each of the different rooms. In at least some embodiments, the described techniques further include using the resulting modified image with the white balancing corrections in one or more further automated manners, such as to determine one or more types of building information (e.g., a building floor plan) for an as-built multi-room building (e.g., a house, office building, etc.) based on one or more such modified images with white balancing corrections, and optionally further using the determined building information to provide navigational data for the building (e.g., for controlling navigation of mobile devices, such as autonomous vehicles, in the building). A building image to analyze may be a panorama image (e.g., in equirectangular format and having 360 degrees of horizontal visual coverage around a vertical axis) or other type of image (e.g., a photo or other non-panoramic rectilinear perspective image) acquired at an acquisition location in or around the building (e.g., without having or using information from any depth sensors or other distance-measuring devices about distances from an image's acquisition location to walls or other objects in the surrounding environment), and the analysis may include analyzing the visual data of the image to identify visible inter-room passages (e.g., doorways, non-doorway wall openings, etc.) or other inter-region separators (e.g., windows, pathways, etc.) in order to segment the image's pixels into multiple different pixel groups each having a subset of the image's pixels that are associated with the visible data in the image for a respective one of the multiple different rooms and/or other spatial regions, then determining one or more neutral pixels in the subset of pixels for each pixel group, and then using the determined neutral pixel(s) for each pixel group to perform chromatic adjustments to at least some of the pixels in that pixel group, such as to perform white balancing corrections separately for each of the multiple rooms or other spatial regions for the pixel group subset corresponding to that room or other spatial region in order to correct for different illumination levels in different rooms or other spatial regions (e.g., from different illumination sources in the different rooms or other spatial regions). Additional details are included below regarding automated determination and use of modified images with white balancing corrections performed separately for different parts of the images corresponding to different rooms or other spatial regions, and some or all techniques described herein may, in at least some embodiments, be performed via automated operations of a Multi-Room Image White Balancing Manager ("MRIWBM") system, as discussed further below.

As noted above, automated operations of a MRIWBM system may include, for an image acquired at a building and having visual data that shows portions of multiple separate rooms or other spatial regions at the building, automatically analyzing and manipulating visual data of the image to perform white balancing corrections separately for different parts of the image corresponding to the different rooms or other spatial regions. As part of such automated analysis of an image, the MRIWBM system may in at least some embodiments capture an image using a camera of a camera device or other computing device including the camera (e.g., a smartphone computing device), or otherwise obtain such an image from such a device with a camera, with the image having been preprocessed by the camera device or other computing device to render the image in a standardized format, such as a standard RGB (red-green-blue) format using multiple color channels (e.g., one each of a red channel, green channel and blue channel) in which each pixel has a color value for each of the three color channels. In particular, in at least some embodiments, the camera device or other computing device may obtain an image in a raw image format that includes unprocessed or minimally processed data from an image sensor of the camera, optionally do some initial processing to place an initial version of the image in a complete standardized color space (e.g., CIE XYZ or CIE xyY, such as to reflect a CIELAB color space defined by the International Commission on Illumination, including the CIE 1931 color space; a linear RGB space; etc.) in which color values are directly proportional to the amount of light illuminating the image sensor, and then do further non-linear processing to generate a finalized version of the image in a non-linear gamma-corrected standard RGB (SRGB) color space format that uses a subset of the complete standardized color space. If a version of an image that is captured or otherwise obtained by the MRIWBM system is in a non-linear color space such as sRGB, the MRIWBM system may first perform automated operations to revert or otherwise transform the obtained image to linear RGB space (e.g., by raising the RGB color values to the power of 2.2; determining if an sRGB value S is between 0 and 0.04045 and if so then setting the linear RGB value L to be S/12.92, and if the sRGB value S is between 0.04045 and 1 then setting the linear RGB value L to be $((S+0.055)/1.055)$ to the power of 2.4; etc.) before performing other analyses of the image, while in other embodiments and situations the MRIWBM system may obtain and use a raw image file version of the image or otherwise a non-linear RGB version of the image without performing such a reversion or transformation, and in yet other embodiments the MRIWBM system may do its further analyses using an image in an sRGB format or other non-linear color format.

After the MRIWBM converts an image into a raw image file or other non-linear RGB version of the image, or otherwise obtains an image in such a raw image file or other non-linear RGB version of the image, the MRIWBM system may in at least some embodiments perform further analysis of the image to determine room structure information or other spatial region structure information, optionally in combination with one or more other types of information extracted from the visual data of the image—as noted above, in other embodiments the analysis of the image to determine such room structure information or other spatial region structure information may be performed on an image in an sRGB format or other non-linear color format. The determination of the room structure information or other spatial region structure information may include, in at least some embodiments, analyzing the visual data of the image to identify one or more inter-room passages, such as doorways and/or non-doorway wall openings, and/or other inter-region passages (e.g., windows, pathways, etc.) between two or more spatial regions or between at least one spatial region and at least one interior room, and for each such inter-room passage or other inter-region passage, associate the image's pixels that are visible through that passage (a subset of the total image pixels) with a pixel group for a different room or other spatial region than the one that includes the acquisition location of the image, and to create another pixel group associated with the room or other spatial region in which the image was captured of the remaining pixels that are not visible through an identified inter-room passage or other inter-region passage. In at least some embodiments, the identification of such inter-room passages and/or inter-region passages may be performed using one or more trained machine learning models, and may optionally further determine other information about the images (e.g., borders between walls, ceilings and/or floors, including in some cases to identify corresponding planar surfaces or other structures corresponding to particular walls, ceilings and/or floors; a midpoint horizontal line for the image, such that substantially half of the pixels are above the line and substantially half of the pixels are below the line; a horizon line, such as for an exterior image or an image that includes a view of at least one exterior space and that separates sky from on-earth surface(s); etc.). As one non-exclusive example, the four corners of a doorway and/or the doorway edges may be identified in an image and used to locate a position of the doorway within the image, and if the doorway is sufficiently open to include pixels within the doorway that are not of the door, associate those pixels of the image that are located within the doorway and not part of the door as being a pixel group for a room visible through the doorway—similarly, the multiple corners and/or edges associated with a non-doorway wall opening (e.g., four corners if the wall opening is a rectangle) may be identified in an image and used to locate a position of the non-doorway wall opening within the image, with a subset of the pixels of the image that are located within the non-doorway wall opening being identified as a pixel group for a room visible through the non-doorway wall opening. If multiple additional rooms or other spatial regions are visible within a single doorway or non-doorway wall opening, the MRIWBM system may treat all of such multiple additional rooms or other spatial regions as a single room or other spatial region in some embodiments and situations for the purpose of subsequent room-specific and/or region-specific white balancing correction operations, while in other embodiments may further delineate the pixels visible within a single doorway or non-doorway wall opening into multiple pixel groups each associated with one of those multiple additional rooms or other spatial regions, such as by identifying further building structure visible through the doorway that separates those multiple additional rooms or other spatial regions from each other, or otherwise using information about a known structure of the building (e.g., as determined from analysis of other images captured in the building) for such separation. In a similar manner, the MRIWBM system may identify windows and/or other inter-region separators in an image, and associate a subset of the pixels of the image that are located within and visible through that window or other inter-region separator as a pixel group associated with another room or other spatial region visible through that window or other inter-region separator (e.g., for an image captured within a room of the building and having one or more windows to an exterior of the building, treat the pixels visible within each window as a separate external spatial region from the room in which the image was captured (e.g., a patio, a deck, a yard, a garden, etc.), or alternatively treat the pixels visible within multiple such windows as a single other external region, such as if the windows are on a single wall and/or are within a defined distance of each other. Additional details are included below regarding the determination of room structure information or other spatial region structure information and optionally other structural information within an image, including with respect to FIGS. 2C-2M.

After the pixels within an image are separated into multiple groups each having a subset of the pixels that are associated with a single respective one of multiple rooms or other spatial regions visible within the image, the MRIWBM system may perform further processing to identify and initiate white balancing corrections within the image, by performing separate such processing for each pixel group and associated room or other spatial region. In particular, in at least some embodiments the MRIWBM system determines, for each pixel group, one or more pixels from that group that each represents a neutral pixel, such as by having all three color values for its three color channels being equal or having differences from each other that are within a defined threshold (e.g., for pixels that are substantially white, black, brown, gray, etc.). In at least some embodiments, the selection of the one or more neutral pixels within a pixel group includes, for at least some of the pixel groups, selecting one or more pixels that are above a midpoint horizontal line and/or part of an identified ceiling, such as to reflect an increased likelihood that such pixels in a building interior are more likely to be neutral pixels then in other portions of the image, and optionally using the determined midpoint horizontal line and/or ceiling section(s) for the image that were determined as part of the prior determination of structural elements visible in the image. The use of such neutral pixels for a pixel group may, in at least some embodiments, be performed as part of using a gray world analysis (or gray world assumption) based on the color pixels within the image (or within that pixel group) having an average color that is substantially a neutral gray, and/or as part of using a white patch analysis by selecting pixels from a lightest patch within that pixel group—by selecting the neutral pixels from within a pixel group, their color values will reflect an illumination source or other illumination level specific to the associated room or other spatial region for which those pixels show objects within or other contents of that room or other spatial region. In addition, in at least some embodiments, the MRIWBM system may further identify and filter some or all color-saturated pixels from each of some or all pixel groups before performing further white balancing corrections, such as based on each such color-saturated pixel having a color value for one or two or three of its color channels that is above a defined color threshold.

In addition, to further perform the white balancing corrections within the image, the MRIWBM system may, for each pixel group and after identifying the neutral pixels for the various pixel groups and optionally filtering some or all of the color-saturated pixels, use the one or more identified neutral pixels for that pixel group to perform chromatic adjustments for some or all pixels within that pixel group. As one non-exclusive example, the MRIWBM system may determine differences between the three color values for a neutral pixel, and perform chromatic adjustments on that neutral pixel so that all three color values are equal or otherwise so that the differences are reduced (e.g., reduce and/or increase a color value for a first of the color channels by a first determined amount, and/or reduce and/or increase a color value for a second of the color channels by a second determined amount, and/or reduce and/or increase a color value for a third of the color channels by a third determined amount), and perform the same or similar chromatic adjustments on some or all of the other pixels within that pixel group (e.g., all of the pixels within that group other than any color-saturated pixels that have been previously filtered) to adjust one or more of the color values for each of those other pixels by the same or similar fixed and/or proportional amount(s) determined from the neutral pixel-if multiple neutral pixels have been identified, the differences between the three color values for the multiple neutral pixels may be averaged or otherwise combined, with resulting differences similarly used to perform chromatic adjustments on all of those neutral pixels and on some or all of the other pixels within that pixel group. In other embodiments and situations, the MRIWBM system may use the one or more identified neutral pixels for a pixel group to determine chromatic adjustments to make to at least some of the pixels of a pixel group in other manners.

After the white balancing corrections are performed within an image, the MRIWBM system may perform further automated operations to convert the format of the resulting modified image with the white balancing corrections to an sRGB format, such as if the white balancing correction operations were performed on an image in a linear RGB or raw image format, and such as by raising each of the RGB color values by the power of 1.0/2.2, or otherwise processing the color values in the original image. While the example discussed above uses RGB color channels, it will be appreciated that the same operations can be performed on images using other color channel formats, such as for images using a CMYK (cyan, magenta, yellow, key/black color) color format, a YUV color format, an HSV (hue, saturation, value) color format, or other color format.

In at least some embodiments, the automated operations of the MRIWBM system may further include analyzing an image to determine whether it is an interior or exterior image, and doing further handling of the image in specific manners based on that determination. In particular, in at least some embodiments, the MRIWBM system may analyze pixels above a horizon line that is identified in the image to determine an amount of blue in each such pixel (e.g., to determine if the pixel represents the sky), and to further determine if a percentage or other amount or quantity of the pixels identified as containing blue are above a defined threshold (e.g., 50%, 60%, 65%, 70%, 75%, 80%, 90%, etc.) of the total pixels above the horizon line-if so, the image may be determined to be an exterior image. The determination of whether an image contains a sufficient amount of blue include, for example, determining that the color value for the blue color channel is above a defined blue threshold, and/or that the color value for the red and/or green color channels are below one or more other defined thresholds. In at least some embodiments and situations, the determination of an image as being an interior or exterior image may be performed before the white balancing corrections are implemented, and if an image is determined to be an exterior image, the MRIWBM system may not perform further white balancing corrections. In other embodiments, the MRIWBM system may perform the white balancing corrections only if an image is determined to be an interior image. In yet other embodiments, if an image is determined to be an exterior image, the MRIWBM system may perform further processing to determine if one or more inter-region separators are visible in the image, such as to separate the visible area of the exterior image into multiple spatial regions having different illumination levels (e.g., a first area under a covered porch or other ceiling or shade structure, a second area in the sunlight and not shaded, etc.), and if so may continue to perform white balancing corrections as discussed above with respect to the multiple spatial regions. In addition, in at least some embodiments and situations, the MRIWBM system may determine to not perform the described types of white balancing corrections in other situations, such as if an image does not have any identified inter-room passages or other inter-region separators that provide visual data for multiple separate rooms or other spatial regions—in such embodiments and situations, the MRIWBM system may opt to perform no white balancing correction on the image, or may instead perform white balancing correction on the image as a whole (e.g., by treating all of the image pixels as a single pixel group) and without using multiple room-specific or other region-specific white balancing corrections within the image.

The described techniques provide various benefits in various embodiments, including to enable white balancing corrections to be effectively performed for panorama images and other images that have visual data of multiple different rooms with different illuminations, such as to apply multiple different white balancing analyses and corrections to different pixel subsets of a single image corresponding to different rooms based at least in part on structural room information determined from analysis of visual data of the image, in order to correct for different illumination sources for different rooms or otherwise for different illumination levels in different rooms by applying a room-specific white balancing correction analysis to each of the different subsets of the image's pixels that show visual coverage of the different rooms, or in some embodiments to similarly enable white balancing corrections to be effectively performed for panorama images and other images that have visual data of multiple different spatial regions other than multiple rooms with different illuminations (e.g., an interior room and one or more separate exterior spaces, multiple exterior spaces separated by walls or foliage or other light-blocking structural objects, etc. Such white-balance corrected images may be further used in various manners in various embodiments, such as to enable generation and use of floor plans of multi-room buildings and other structures more efficiently and rapidly and in manners not previously available. Such described techniques further provide benefits in allowing improved automated navigation of a building by mobile devices (e.g., semi-autonomous or fully autonomous vehicles), including by providing more color-accurate visual data for the building, as well as to significantly reduce computing power and time used to attempt to otherwise learn a building's layout and/or recognize parts of the building from later captured images that may include color matching. In addition, in some embodiments the described techniques may be used to provide an improved GUI (graphical user interface) in which a user may more accurately and quickly obtain and use building information that includes such white-balance corrected images (e.g., for use in navigating an interior of one or more buildings), including in response to search requests, as part of providing personalized information to the user, as part of providing value estimates and/or other information about a building to a user (e.g., after analysis of information about one or more target building floor plans that are similar to one or more initial floor plans or that otherwise match specified criteria), etc. Various other benefits are also provided by the described techniques, some of which are further described elsewhere herein.

As noted above, automated operations of a MRIWBM system may include determining information for a building floor plan in at least some embodiments. Such a floor plan of a building may include a 2D (two-dimensional) representation of various information about the building (e.g., the rooms, doorways between rooms and other inter-room connections, exterior doorways, windows, etc.), and may be further associated with various types of supplemental or otherwise additional information (about the building (e.g., data for a plurality of other building-related attributes)—such additional building information may, for example, include one or more of the following: a 3D, or three-dimensional, model of the building that includes height information (e.g., for building walls and other vertical areas); a 2.5D, or two-and-a-half dimensional, model of the building that when rendered includes visual representations of walls and/or other vertical surfaces without explicitly modeling measured heights of those walls and/or other vertical surfaces; images and/or other types of data captured in rooms of the building, including panoramic images (e.g., 360° panorama images); etc., as discussed in greater detail below.

In addition, in at least some embodiments and situations, some or all of the images acquired for a building and associated with the building's floor plan may be panorama images that are each acquired at one of multiple acquisition locations in or around the building, such as to generate a panorama image at each such acquisition location from one or more of a video at that acquisition location (e.g., a 360° video taken from a smartphone or other mobile device held by a user turning at that acquisition location), or multiple images acquired in multiple directions from the acquisition location (e.g., from a smartphone or other mobile device held by a user turning at that acquisition location), or a simultaneous capture of all the image information (e.g., using one or more fisheye lenses), etc. Such images may include visual data, and in at least some embodiments and situations, acquisition metadata regarding the acquisition of such panorama images may be obtained and used in various manners, such as data acquired from IMU (inertial measurement unit) sensors or other sensors of a mobile device as it is carried by a user or otherwise moved between acquisition locations (e.g., compass heading data, GPS location data, etc.). It will be appreciated that such a panorama image may in some situations be represented in an equirectangular coordinate system and provide up to 360° coverage around horizontal and/or vertical axes, such that a user viewing a starting panorama image may move the viewing direction within the starting panorama image to different orientations to cause different images (or "views") to be rendered within the starting panorama image (including, if the panorama image is represented in an equirectangular coordinate system, to convert the image being rendered into a planar coordinate system, such as for a view rendered as a rectilinear perspective image). Additional details are included below related to the acquisition and usage of panorama images or other images for a building, including with respect to FIGS. 2A-2E and 2I-2M and their associated descriptions.

In at least some embodiments, a MRIWBM system may operate in conjunction with one or more separate ICA (Image Capture and Analysis) systems and/or MIGM (Mapping Information and Generation Manager) systems, such as to obtain and use images from the ICA system and/or to obtain floor plan and other associated information for buildings from the MIGM system, while in other embodiments such an MRIWBM system may incorporate some or all functionality of such ICA and/or MIGM systems as part of the MRIWBM system. In yet other embodiments, the MRIWBM system may operate without using some or all functionality of the ICA and/or MIGM systems, such as if the MRIWBM system obtains information about images and/or building floor plans and associated information from other sources (e.g., from manual capture of one or more such images by one or more users, from manual creation or provision of such building floor plans and/or associated information by one or more users, etc.).

With respect to functionality of such an ICA system, it may perform automated operations in at least some embodiments to acquire images (e.g., panorama images) at various acquisition locations associated with a building (e.g., in the interior of multiple rooms of the building), and optionally further acquire metadata related to the image acquisition process (e.g., compass heading data, GPS location data, etc.) and/or to movement of a capture device between acquisition locations—in at least some embodiments, such acquisition and subsequent use of acquired information may occur without having or using information from depth sensors or other distance-measuring devices about distances from images' acquisition locations to walls or other objects in a surrounding building or other structure. For example, in at least some such embodiments, such techniques may include using one or more mobile devices (e.g., a camera having one or more fisheye lenses and mounted on a rotatable tripod or otherwise having an automated rotation mechanism; a camera having one or more fisheye lenses sufficient to capture 360 degrees horizontally without rotation; a smart phone held in a constant position relative to a user (e.g., chest height, eye height, etc.) and moved by the user, such as to rotate the user's body and held smart phone in a 360° circle around a vertical axis; a camera held by or mounted on a user or the user's clothing; a camera mounted on an aerial and/or ground-based drone or other robotic device; etc.) to capture visual data from a sequence of multiple acquisition locations within multiple rooms of a house (or other building). Additional details are included elsewhere herein regarding operations of device(s) implementing an ICA system, including with respect to FIG. 5 and its associated description, such as to perform such automated operations, and in some cases to further interact with one or more ICA system operator user(s) in one or more manners to provide further functionality.

With respect to functionality of such an MIGM system, it may perform automated operations in at least some embodiments to analyze multiple 360° panorama images (and optionally other images) that have been acquired for a building interior (and optionally an exterior of the building), and determine room shapes and locations of passages connecting rooms for some or all of those panorama images, as well as to determine wall elements and other elements of some or all rooms of the building in at least some embodiments and situations. The types of connecting passages between two or more rooms may include one or more of doorway openings and other inter-room non-doorway wall openings, windows, stairways, non-room hallways, etc., and the automated analysis of the images may identify such elements based at least in part on identifying the outlines of the passages, identifying different content within the passages than outside them (e.g., different colors or shading), etc. The automated operations may further include using the determined information to generate a floor plan for the building and to optionally generate other mapping information for the building, such as by using the inter-room passage information and other information to determine relative positions of the associated room shapes to each other, and to optionally add distance scaling information and/or various other types of information to the generated floor plan. In addition, the MIGM system may in at least some embodiments perform further automated operations to determine and associate additional information with a building floor plan and/or specific rooms or locations within the floor plan, such as to analyze images and/or other environmental information (e.g., audio) captured within the building interior to determine particular attributes (e.g., a color and/or material type and/or other characteristics of particular features or other elements, such as a floor, wall, ceiling, countertop, furniture, fixture, appliance, cabinet, island, fireplace, etc.; the presence and/or absence of particular features or other elements; etc.), or to otherwise determine relevant attributes (e.g., directions that building features or other elements face, such as windows; views from particular windows or other locations; etc.). Additional details are included below regarding operations of computing device(s) implementing an MIGM system, including with respect to FIGS. 6A-6B and their associated description, such as to perform such automated operations and in some cases to further interact with one or more MIGM system operator user(s) in one or more manners to provide further functionality.

For illustrative purposes, some embodiments are described below in which specific types of information are acquired, used and/or presented in specific ways for specific types of structures and by using specific types of devices-however, it will be understood that the described techniques may be used in other manners in other embodiments, and that the invention is thus not limited to the exemplary details provided. As one non-exclusive example, while specific types of data structures (e.g., images of one or more types and in one or more formats, floor plans, adjacency graphs, vector embeddings, etc.) are generated and used in specific manners in some embodiments, it will be appreciated that other types of information to describe floor plans and other associated information may be similarly generated and used in other embodiments, including for buildings (or other structures or layouts) separate from houses, and that images and/or floor plans identified as matching specified criteria may be used in other manners in other embodiments. The term "building" refers herein to any partially or fully enclosed structure, typically but not necessarily encompassing one or more rooms that visually or otherwise divide the interior space of the structure-non-limiting examples of such buildings include houses, apartment buildings or individual apartments therein, condominiums, office buildings, commercial buildings or other wholesale and retail structures (e.g., shopping malls, department stores, warehouses, etc.), supplemental structures on a property with another main building (e.g., a detached garage or shed on a property with a house), etc. The term "acquire" or "capture" as used herein with reference to a building interior, acquisition location, or other location (unless context clearly indicates otherwise) may refer to any recording, storage, or logging of media, sensor data, and/or other information related to spatial characteristics and/or visual characteristics and/or otherwise perceivable characteristics of the building interior or subsets thereof, such as by a recording device or by another device that receives information from the recording device. As used herein, the term "panorama image" may refer to a visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction. The term "sequence" of acquisition locations, as used herein, refers generally to two or more acquisition locations that are each visited at least once in a corresponding order, whether or not other non-acquisition locations are visited between them, and whether or not the visits to the acquisition locations occur during a single continuous period of time or at multiple different times, or by a single user and/or device or by multiple different users and/or devices. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify the same or similar elements or acts.

FIG. 1 includes an example block diagram of various computing devices and systems that may participate in the described techniques in some embodiments, such as with respect to an example building 198 (in this example, a house), and by the example Multi-Room Image White Balancing Manager ("MRIWBM") system 140 executing on one or more server computing systems 300 in this example embodiment.

In the illustrated embodiment, the MRIWBM system 140 analyzes obtained original building images 141a (e.g., some or all images 165 acquired by the ICA system 160) for a building in order to generate white-balanced modified images 141b having room-specific or other region-specific white balancing corrections performed to different subsets of the image. As part of its processing, the MRIWBM system generate and use various data, including information 142 about inter-room passages and/or other inter-region passages identified in visual data of the images 141a (and optionally various other types of determined structural data and other data from image analysis, such as image horizontal midlines, image horizon lines, etc.), corresponding room-specific and/ or other region-specific pixel subgroups 143, and data 144 determined as part of the white balancing correction operations (e.g., neutral pixels and associated chromatic adjustment data, color-saturated pixels, blue sky analysis data, etc.), and as discussed in greater detail elsewhere herein. The MRIWBM system may further use the generated white-balanced modified images 141b in various manners, including to determine a floor plan of the building and optionally associate sizes of rooms and/or the building as a whole with the floor plan, such as for use in improved navigation of the building. In some embodiments and situations, the MRIWBM system may optionally further use supporting information supplied by system operator users via computing devices 105 over intervening computer network(s) 170, and in some embodiments and situations some or all of the determinations performed by the MRIWBM system may include using one or more trained machine learning models (e.g., one or more trained neural networks). In some embodiments, the building images 141a that are analyzed by the MRIWBM system may be obtained in manners other than via ICA and/or MIGM systems 160 (e.g., if such ICA and/or MIGM systems are not part of the MRIWBM system), such as to receive building images from other sources. Additional details related to the automated operations of the MRIWBM system are included elsewhere herein, including with respect to FIGS. 2I-2M and FIG. 4.

In addition, an Interior Capture and Analysis ("ICA") system (e.g., an ICA system 160 executing on the one or more server computing systems 300, such as part of the MRIWBM system; an optional ICA system application 154 executing on a mobile image acquisition device 360; etc.) captures information 165 with respect to one or more buildings or other structures (e.g., by capturing one or more 360° panorama images and/or other images for multiple acquisition locations 210 in an example house 198), and a MIGM (Mapping Information Generation Manager) system 160 executing on the one or more server computing systems 300 (e.g., as part of the MRIWBM system) further uses those images (e.g., the generated white-balanced modified images from the system 140) and optionally other captured building information and additional supporting information (e.g., supplied by system operator users via computing devices 105 over intervening computer network(s) 170) to generate and provide building floor plans 155 and/or other mapping-related information (not shown) for the building(s) or other structure(s). In the illustrated embodiment, the ICA and MIGM systems 160 are operating as part of a combined system 145 with the MRIWBM system 140 that analyzes building images 141a (e.g., images 165 acquired by the ICA system) and generates and uses corresponding white-balanced modified images 141b in one or more further automated manners, but in other embodiments the ICA and/or MIGM systems 160 may operate separately from the MRIWBM system. Similarly, while the ICA and MIGM systems 160 are illustrated in this example embodiment as executing on the same server computing system(s) 300 as the MRIWBM system (e.g., with all systems being operated by a single entity or otherwise being executed in coordination with each other, such as with some or all functionality of all the systems integrated together), in other embodiments the ICA system 160 and/or MIGM system 160 and/or MRIWBM system 140 may operate on one or more other systems separate from the system(s) 300 (e.g., on mobile device 360; one or more other computing systems, not shown; etc.), whether instead of or in addition to the copies of those systems executing on the system(s) 300 (e.g., to have a copy of the MIGM system 160 executing on the device 360 to incrementally generate at least partial building floor plans as building images are acquired by the ICA system 160 executing on the device 360 and/or by that copy of the MIGM system, while another copy of the MIGM system optionally executes on one or more server computing systems to generate a final complete building floor plan after all images are acquired), and in yet other embodiments the MRIWBM system may instead operate without an ICA system and/or MIGM system and instead obtain panorama images (or other images) and/or building floor plans from one or more external sources. Additional details related to the automated operation of the ICA and MIGM systems are included elsewhere herein, including with respect to FIGS. 2A-2H and with respect to FIGS. 5 and 6A-6B, respectively.

Various components of the mobile computing device 360 are also illustrated in FIG. 1, including one or more hardware processors 132 (e.g., CPUs, GPUs, etc.) that execute software (e.g., optional ICA application 154, optional browser 162, etc.) using executable instructions stored and/ or loaded on one or more memory/storage components 152 of the device 360, and optionally one or more imaging systems 135 of one or more types to acquire visual data of one or more panorama images 165 and/or other images (not shown, such as rectilinear perspective images)—some or all such images may in some embodiments be supplied by one or more separate associated camera devices 184 (e.g., via a wired/cabled connection, via Bluetooth or other inter-device wireless communications, etc.), whether in addition to or instead of images captured by the mobile device 360. The illustrated embodiment of mobile device 360 further includes one or more sensor modules 148 that include a gyroscope 148*a*, accelerometer 148*b* and compass 148*c* in this example (e.g., as part of one or more IMU units, not shown separately, on the mobile device), one or more control systems 147 managing I/O (input/output) and/or communications and/or networking for the device 360 (e.g., to receive instructions from and present information to the user) such as for other device I/O and communication components 146 (e.g., network interfaces or other connections, keyboards, mice or other pointing devices, microphones, speakers, GPS receivers, etc.), a display system 149 (e.g., with a touch-sensitive screen), optionally one or more depth-sensing sensors or other distance-measuring components 136 of one or more types, optionally a GPS (or Global Positioning System) sensor 134 or other position determination sensor (not shown in this example), etc. Other computing devices/ systems 105, 175 and 300 and/or camera devices 184 may include various hardware components and stored information in a manner analogous to mobile device 360, which are not shown in this example for the sake of brevity, and as discussed in greater detail below with respect to FIG. 3.

One or more users (not shown) of one or more client computing devices 175 may further interact over one or more computer networks 170 with the MRIWBM system 140 (and optionally the ICA system 160 and/or MIGM system 160), such as to obtain generated white-balanced modified images 141*b* and/or to assist in the generation of those images, as well as obtaining and using the underlying images 165 and/or resulting floor plans 155 in one or more further automated manners-such interactions by the user(s) may include, for example, specifying target criteria to use in searching for corresponding floor plans or otherwise providing information about target criteria of interest to the users, or obtaining and optionally interacting with one or more particular identified floor plans and/or with additional associated information (e.g., to change between a floor plan view and a view of a particular image at an acquisition location within or near the floor plan; to change the horizontal and/or vertical viewing direction from which a corresponding view of a panorama image is displayed, such as to determine a portion of a panorama image to which a current user viewing direction is directed, etc.). In addition, a floor plan (or portion of it) may be linked to or otherwise associated with one or more other types of information, including for a floor plan of a multi-story or otherwise multi-level building to have multiple associated sub-floor plans for different stories or levels that are interlinked (e.g., via connecting stairway passages), for a two-dimensional ("2D") floor plan of a building to be linked to or otherwise associated with a three-dimensional ("3D") rendering of the building, etc. Also, while not illustrated in FIG. 1, in some embodiments the client computing devices 175 (or other devices, not shown) may receive and use information about determined building dimensions and/or about identified floor plans or other mapping-related information in additional manners, such as to control or assist automated navigation activities by those devices (e.g., by autonomous vehicles or other devices), whether instead of or in addition to display of the identified information.

In the depicted computing environment of FIG. 1, the network 170 may be one or more publicly accessible linked networks, possibly operated by various distinct parties, such as the Internet. In other implementations, the network 170 may have other forms. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks in various situations. In addition, the client computing devices 175 and server computing systems 300 may include various hardware components and stored information, as discussed in greater detail below with respect to FIG. 3.

In the example of FIG. 1, the ICA system may perform automated operations involved in generating multiple 360° panorama images at multiple associated acquisition locations (e.g., in multiple rooms or other locations within a building or other structure and optionally around some or all of the exterior of the building or other structure), such as using visual data acquired via the mobile device(s) 360 and/or associated camera devices 184, and for use in generating and providing a representation of an interior of the building or other structure. For example, in at least some such embodiments, such techniques may include using one or more mobile devices (e.g., a camera having one or more fisheye lenses and mounted on a rotatable tripod or otherwise having an automated rotation mechanism, a camera having sufficient fisheye lenses to capture 360° horizontally without rotation, a smart phone held and moved by a user, a camera held by or mounted on a user or the user's clothing, etc.) to capture data from a sequence of multiple acquisition locations within multiple rooms of a house (or other building), and to optionally further capture data involved in movement of the acquisition device (e.g., movement at an acquisition location, such as rotation; movement between some or all of the acquisition locations, such as for use in linking the multiple acquisition locations together; etc.), in at least some cases without having distances between the acquisition locations being measured or having other measured depth information to objects in an environment around the acquisition locations (e.g., without using any depth-sensing sensors). After an acquisition location's information is captured, the techniques may include producing a 360° panorama image from that acquisition location with 360 degrees of horizontal information around a vertical axis (e.g., a 360° panorama image that shows the surrounding room in an equirectangular format), and then providing the panorama images for subsequent use by the MIGM and/or MRIWBM systems. Additional details related to embodiments of a system providing at least some such functionality of an ICA system are included in U.S. Non-Provisional patent application Ser. No. 16/693,286, filed Nov. 23, 2019 and entitled "Connecting And Using Building Data Acquired From Mobile Devices" (which includes disclosure of an example BICA system that is generally directed to obtaining and using panorama images from within one or more buildings or other structures); in U.S. Non-Provisional patent application Ser. No. 16/236,187, filed Dec. 28, 2018 and entitled "Automated Control Of Image Acquisition Via Use Of Acquisition Device Sensors" (which includes disclosure of an example ICA system that is generally directed to obtaining and using panorama images from within one or more buildings or other structures); and in U.S. Non-Provisional patent application Ser. No. 16/190,162, filed Nov. 14, 2018 and entitled "Automated Mapping Information Generation From Inter-Connected Images"; each of which is incorporated herein by reference in its entirety.

One or more end users (not shown) of one or more building information access client computing devices 175 may further interact over computer networks 170 with the MRIWBM system 140 (and optionally the MIGM system 160 and/or ICA system 160), such as to obtain, display and interact with a generated floor plan (and/or other generated mapping information) and/or associated images such as images 141*b* (e.g., by supplying information about one or more indicated buildings of interest and/or other criteria and receiving information about one or more corresponding matching buildings), as discussed in greater detail elsewhere herein, including with respect to FIG. 7. In addition, while not illustrated in FIG. 1, a floor plan (or portion of it) may be linked to or otherwise associated with one or more additional types of information, such as one or more associated and linked images or other associated and linked information, including for a two-dimensional ("2D") floor plan of a building to be linked to or otherwise associated with a separate 2.5D model floor plan rendering of the building and/or a 3D model floor plan rendering of the building, etc., and including for a floor plan of a multi-story or otherwise multi-level building to have multiple associated sub-floor plans for different stories or levels that are interlinked (e.g., via connecting stairway passages) or are part of a common 2.5D and/or 3D model. Accordingly, non-exclusive examples of an end user's interactions with a displayed or otherwise generated 2D floor plan of a building may include one or more of the following: to change between a floor plan view and a view of a particular image at an acquisition location within or near the floor plan; to change between a 2D floor plan view and a 2.5D or 3D model view that optionally includes images texture-mapped to walls of the displayed model; to change the horizontal and/or vertical viewing direction from which a corresponding subset view of (or portal into) a panorama image is displayed, such as to determine a portion of a panorama image in a 3D coordinate system to which a current user viewing direction is directed, and to render a corresponding planar image that illustrates that portion of the panorama image without the curvature or other distortions present in the original panorama image; etc. Additional details regarding a BIIP (Building Information Integrated Presentation) system and/or an ILTM (Image Locations Transition Manager) system, which are example embodiments of systems to provide or otherwise support at least some functionality of a building information access system and routine as discussed herein, are included in U.S. Non-Provisional patent application Ser. No. 16/681,787, filed Nov. 12, 2019 and entitled "Presenting Integrated Building Information Using Three-Dimensional Building Models," and in U.S. Non-Provisional patent application Ser. No. 15/950,881, filed Apr. 11, 2018 and entitled "Presenting Image Transition Sequences Between Acquisition Locations," each of which is incorporated herein by reference in its entirety. In addition, while not illustrated in FIG. 1, in some embodiments the client computing devices 175 (or other devices, not shown) may receive and use generated floor plans and/or other generated mapping-related information in additional manners, such as to control or assist automated navigation activities by those devices (e.g., by autonomous vehicles or other devices), whether instead of or in addition to display of the generated information.

FIG. 1 further depicts an exemplary building interior environment in which 360° panorama images and/or other images are acquired, such as by the ICA system and for use by the MRIWBM and/or MIGM systems to generate corresponding white-balanced modified images 141*b* and to generate and provide one or more corresponding building floor plans (e.g., multiple incremental partial building floor plans), respectively. In particular, FIG. 1 illustrates one story of a multi-story house (or other building) 198 with an interior that was captured at least in part via multiple panorama images, such as by a mobile image acquisition device 360 with image acquisition capabilities and/or one or more associated camera devices 184 as they are moved through the building interior to a sequence of multiple acquisition locations 210 (e.g., starting at acquisition location 210A, moving to acquisition location 210B along travel path 115, etc., and ending at acquisition location 210-O or 210P outside of the building). An embodiment of the ICA system may automatically perform or assist in the capturing of the data representing the building interior (as well as to further analyze the captured data to generate 360° panorama images to provide a visual representation of the building interior), and an embodiment of the MIGM system may analyze the visual data of the acquired images to generate one or more building floor plans for the house 198 (e.g., multiple incremental building floor plans, including to determine directions between images, such as directions 215-AB, 215-AC and 215-BC between image acquisition locations 210A, 210B and 210C). While such a mobile image acquisition device may include various hardware components, such as a camera, one or more sensors (e.g., a gyroscope, an accelerometer, a compass, etc., such as part of one or more IMUs, or inertial measurement units, of the mobile device; an altimeter; light detector; etc.), a GPS receiver, one or more hardware processors, memory, a display, a microphone, etc., the mobile device may not in at least some embodiments have access to or use equipment to measure the depth of objects in the building relative to a location of the mobile device, such that relationships between different panorama images and their acquisition locations in such embodiments may be determined in part or in whole based on features in different images but without using any data from any such depth sensors, while in other embodiments such depth data may be obtained and used. In addition, while directional indicator 109 is provided in FIG. 1 for reference of the reader relative the example house 198, the mobile device and/or ICA system may not use such absolute directional information and/or absolute locations in at least some embodiments, such as to instead determine relative directions and distances between acquisition locations 210 without regard to actual geographical positions or directions in such embodiments, while in other embodiments such absolute directional information and/or absolute locations may be obtained and used.

In operation, the mobile device 360 and/or camera device(s) 184 arrive at a first acquisition location 210A within a first room of the building interior (in this example, in a living room accessible via an external door 190-1), and captures or acquires a view of a portion of the building interior that is visible from that acquisition location 210A (e.g., some or all of the first room, and optionally small portions of one or more other adjacent or nearby rooms, such as through doorway wall openings, non-doorway wall openings, hallways, stairways or other connecting passages from the first room). The view capture may be performed in various manners as discussed herein, and may include a number of objects or other features (e.g., structural details) that may be visible in images captured from the acquisition location—in the example of FIG. 1, such objects or other features within the building 198 include the doorways 190 (including 190-1 through 190-6, such as with swinging and/or sliding doors), windows 196 (including 196-1 through 196-8), corners or edges 195 (including corner 195-1 in the northwest corner of the building 198, corner 195-2 in the northeast corner of the first room, corner 195-3 in the southwest corner of the first room, corner 195-4 in the southeast corner of the first room, corner 195-5 at the northern edge of the inter-room passage between the first room and a hallway, edge 183-1 at the northern edge of non-doorway wall opening 263a, etc.), furniture 191-193 (e.g., a couch 191; chair 192; table 193; etc.), pictures or paintings or televisions or other hanging objects 194 (such as 194-1 and 194-2) hung on walls, light fixtures (not shown in FIG. 1), various built-in appliances or fixtures or other structural elements (not shown in FIG. 1), etc. The user may also optionally provide a textual or auditory identifier to be associated with an acquisition location and/or a surrounding room, such as "living room" for one of acquisition locations 210A or 210B or for the room including acquisition locations 210A and/or 210B, while in other embodiments the ICA and/or MIGM system may automatically generate such identifiers (e.g., by automatically analyzing images and/or video and/or other recorded information for a building to perform a corresponding automated determination, such as by using machine learning; based at least in part on input from ICA and/or MIGM system operator users; etc.) or the identifiers may not be used.

After the first acquisition location 210A has been captured, the mobile device 360 and/or camera device(s) 184 may move or be moved to a next acquisition location (such as acquisition location 210B), optionally recording images and/or video and/or other data from the hardware components (e.g., from one or more IMUs, from the camera, etc.) during movement between the acquisition locations. At the next acquisition location, the mobile 360 and/or camera device(s) 184 may similarly capture a 360° panorama image and/or other type of image from that acquisition location. This process may repeat for some or all rooms of the building and in some cases external to the building, as illustrated for additional acquisition locations 210C-210P in this example, with the images from acquisition locations 210A to 210-O being captured in a single image acquisition session in this example (e.g., in a substantially continuous manner, such as within a total of 5 minutes or 15 minutes), and with the image from acquisition location 210P optionally being acquired at a different time (e.g., from a street adjacent to the building or front yard of the building). In this example, multiple of the acquisition locations 210K-210P are external to but associated with the building 198, including acquisition locations 210L and 210M in one or more additional structures 189 on the same property 241 (e.g., an ADU, or accessory dwelling unit; a garage; a shed; etc.), acquisition location 210K on an external deck or patio 186, and acquisition locations 210N-210P at multiple yard locations on the property (e.g., backyard 187, side yard 188, front yard including acquisition location 210P, etc.). The acquired images for each acquisition location may be further analyzed, including in some embodiments to render or otherwise place each panorama image in an equirectangular format, whether at the time of image acquisition or later, as well as further analyzed by the MIGM and/or MRIWBM systems in the manners described herein.

Various details are provided with respect to FIG. 1, but it will be appreciated that the provided details are non-exclusive examples included for illustrative purposes, and other embodiments may be performed in other manners without some or all such details.

FIGS. 2A-2M illustrate examples of automatically analyzing visual data of an image acquired at a building having visual data showing at least parts of multiple rooms in order to perform white balancing corrections separately for different parts of the image corresponding to the different rooms, and for subsequently using one or more such resulting modified images in one or more automated manners such as to determine a building floor plan and/or one or more other types of building information, such as for the building 198 discussed in FIG. 1.

Figure 2A:
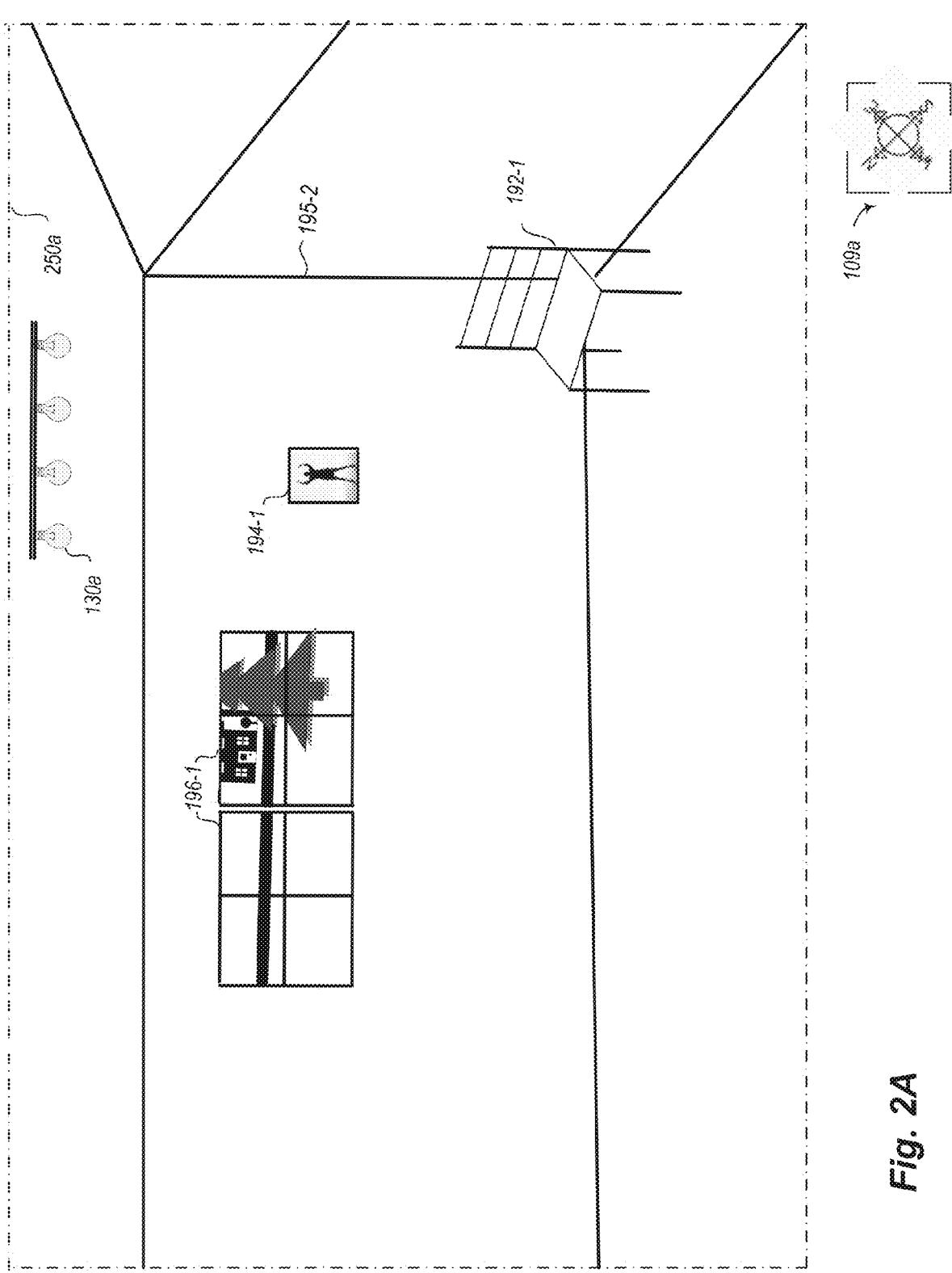

In particular, FIG. 2A illustrates an example image 250a, such as a non-panorama perspective image taken in a northeasterly direction from acquisition location 210B in the living room of house 198 of FIG. 1 (or a northeasterly facing subset view of a 360° panorama image taken from that acquisition location and formatted in a rectilinear manner)—the directional indicator 109a is further displayed in this example to illustrate the northeasterly direction in which the image is taken. In the illustrated example, the displayed image includes built-in elements (e.g., light fixture 130a), furniture (e.g., chair 192), two windows 196-1, and a picture 194-1 hanging on the north wall of the living room. No inter-room passages into or out of the living room (e.g., doorways or other wall openings) are visible in this image. However, multiple room borders are visible in the image 250a, including horizontal borders between a visible portion of the north wall of the living room and the living room's ceiling and floor, horizontal borders between a visible portion of the east wall of the living room and the living room's ceiling and floor, and the inter-wall vertical border 195-2 between the north and east walls.

Figure 2B:
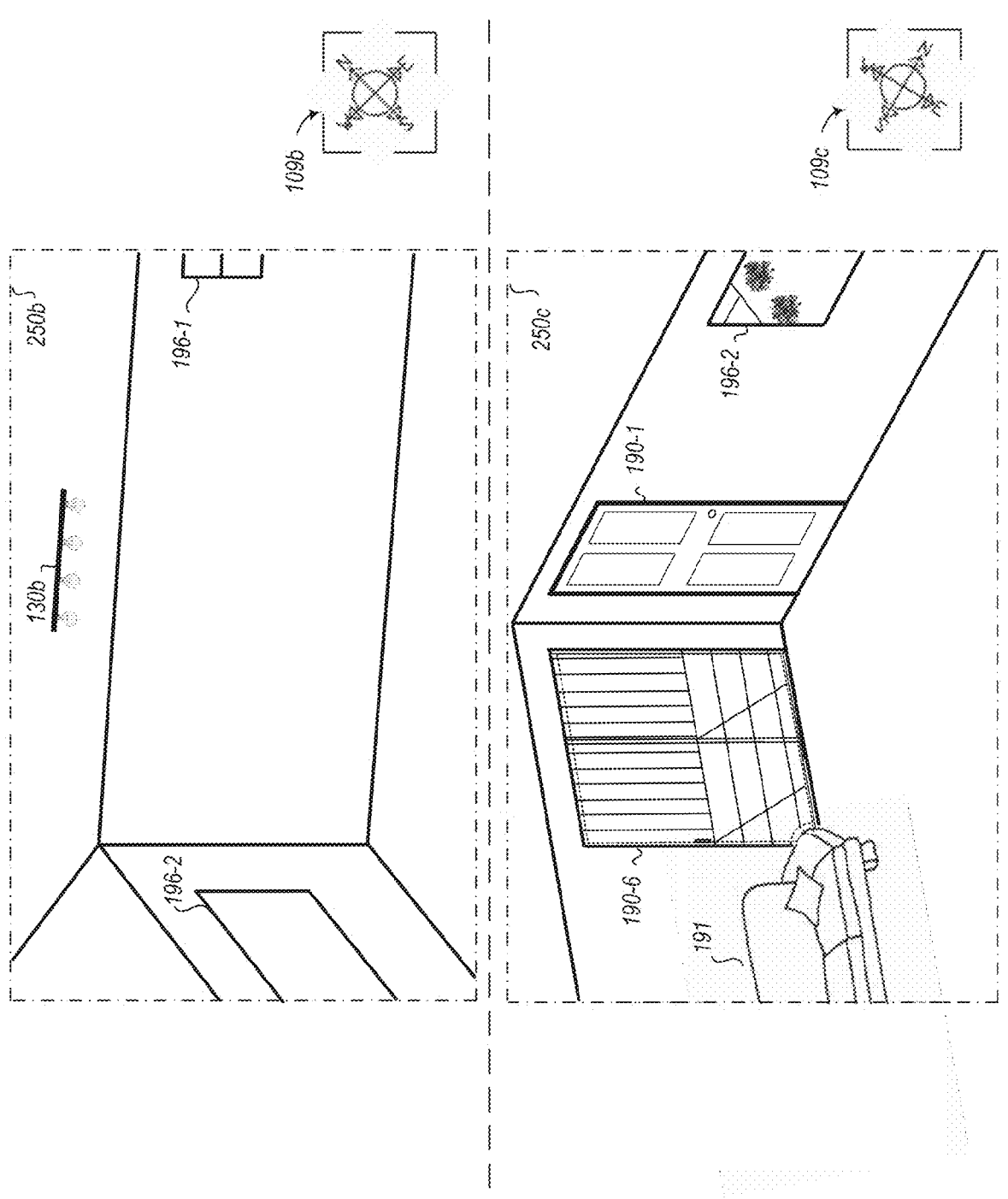

FIG. 2B continues the example of FIG. 2A, and illustrates two additional perspective images, including an additional perspective image 250b taken in a northwesterly direction from acquisition location 210B in the living room of house 198 of FIG. 1—the directional indicator 109b is further displayed to illustrate the northwesterly direction in which the image is taken. In this example image, a small portion of one of the windows 196-1 continues to be visible, along with a portion of window 196-2 and a new lighting fixture 130b. In addition, horizontal and vertical room borders are visible in image 250b in a manner similar to that of FIG. 2A. FIG. 2B further illustrates a third perspective image 250c taken in a southwesterly direction in the living room of house 198 of FIG. 1, such as from acquisition location 210B—the directional indicator 109c is further displayed to illustrate the southwesterly direction in which the image is taken. In this example image, a portion of window 196-2 continues to be visible, as is a couch 191 and visual horizontal and vertical room borders in a manner similar to that of FIGS. 2A and 2B. This example image further illustrates two inter-region passages for the living room, which in this example include a doorway 190-1 with a swinging door to enter and leave the living room (which FIG. 1 identifies as a door to the exterior of the house, such as the front yard), and a doorway 190-6 with a sliding door to move between the living room and side yard 188—as is shown in the information in FIG. 1, an additional inter-room passage that is a non-doorway wall opening 263a exists in the east wall of the living room to move between the living room and hallway, but is not visible in the images 250a-250c. It will be appreciated that a variety of other perspective images may be taken from acquisition location 210B and/or other acquisition locations and displayed in a similar manner.

Figure 2C:
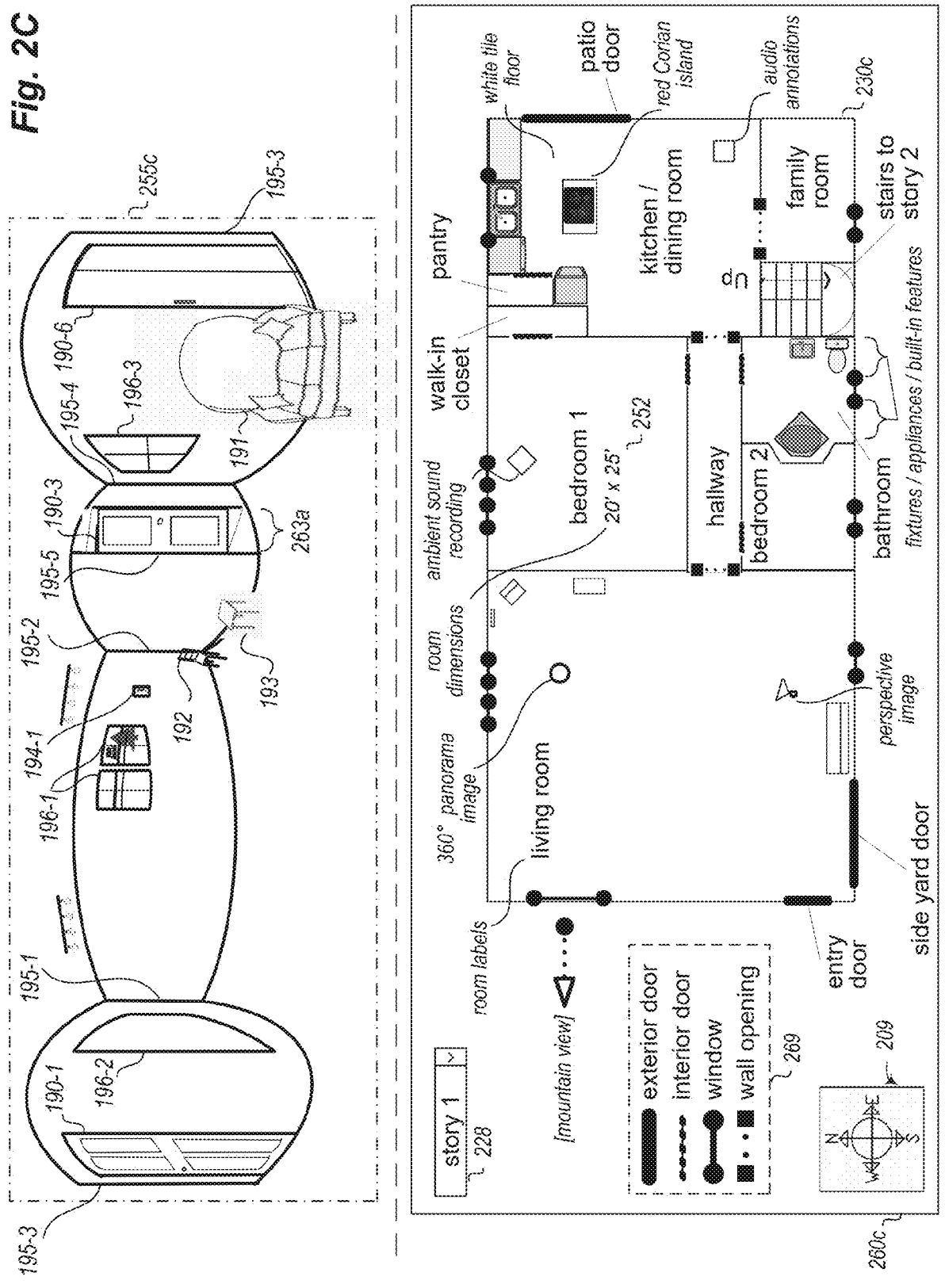

FIG. 2C continues the examples of FIGS. 2A-2B, and illustrates a 360° panorama image 255c (e.g., taken from acquisition location 210B), which displays the entire living room in an equirectangular format-since the panorama image does not have a direction in the same manner as the perspective images of FIGS. 2A-2B, the directional indicator 109 is not displayed in FIG. 2C, although a pose for the panorama image may include one or more associated directions (e.g., a starting and/or ending direction for the panorama image, such as if acquired via rotation). A portion of the visual data of panorama image 255c corresponds to the first perspective image 250a (shown in approximately the center portion of the image 255c), while the left portion of the image 255c and the far-right portion of the image 255c contain visual data corresponding to those of the perspective images 250b and 250c. This example panorama image 255c includes windows 196-1, 196-2 and 196-3, furniture 191-193, doorways 190-1 and 190-6, and non-doorway wall opening 263a to the hallway room (with the opening showing part of a door 190-3 visible in the adjacent hallway). Image 255c further illustrates a variety of room borders in a manner similar to that of the perspective images, but with the horizontal borders displayed in an increasingly curved manner as distance from the image's horizontal midline increases-borders include vertical inter-wall borders 195-1 through 195-4, vertical border 195-5 at the north/left side of the hallway opening, vertical borders at the right side of the hallway opening, and horizontal borders between the walls and the floor and between the walls and the ceiling.

Figure 2D:
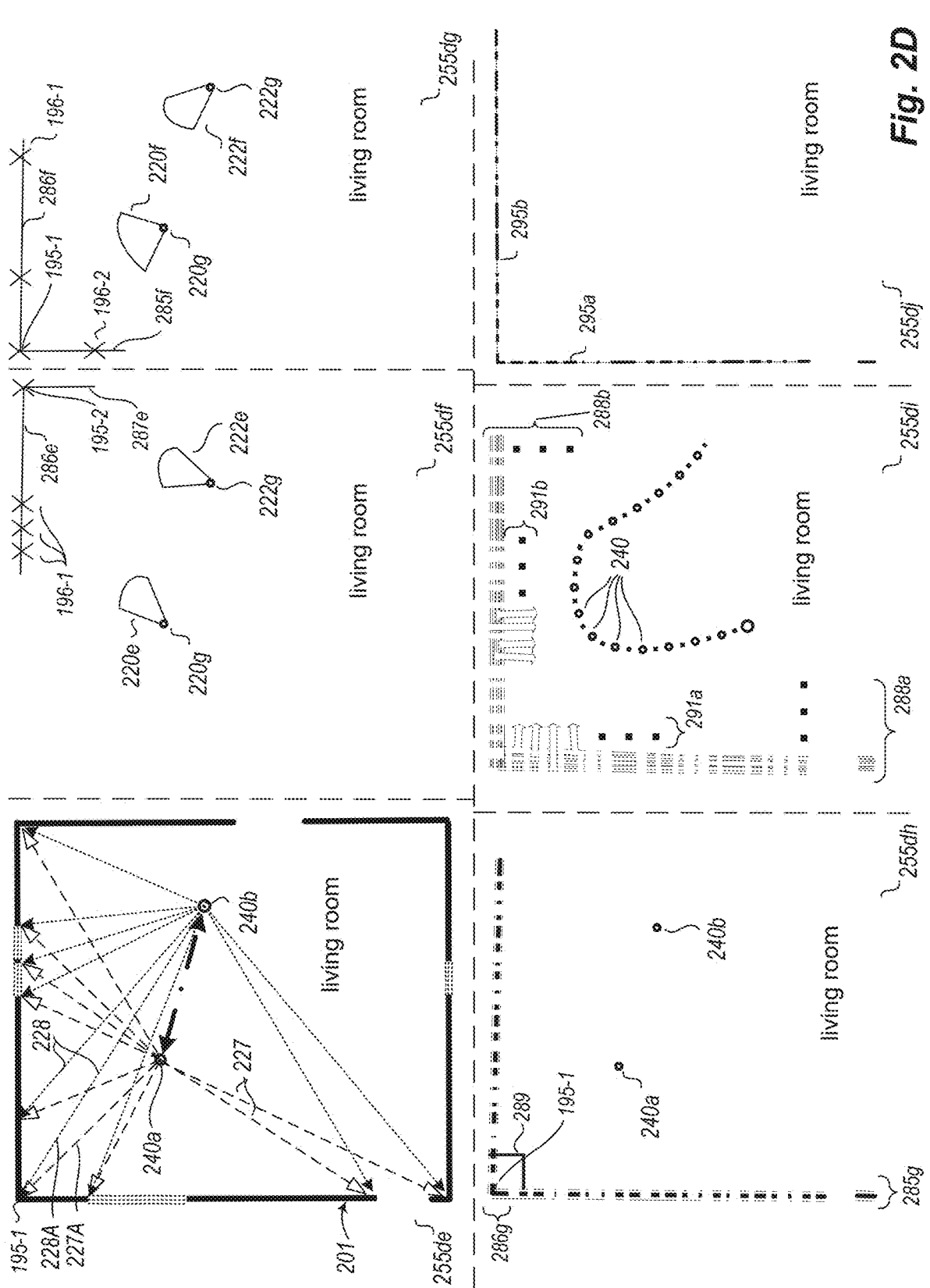
Figure 2E:
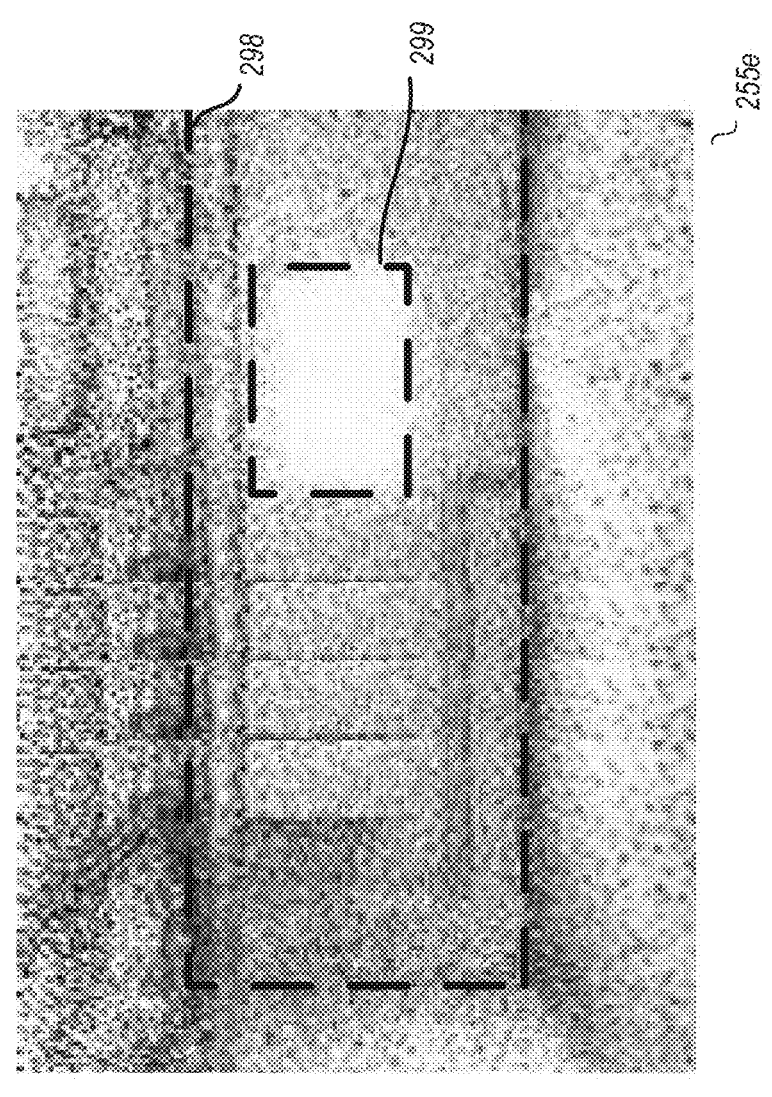
Figure 2F:
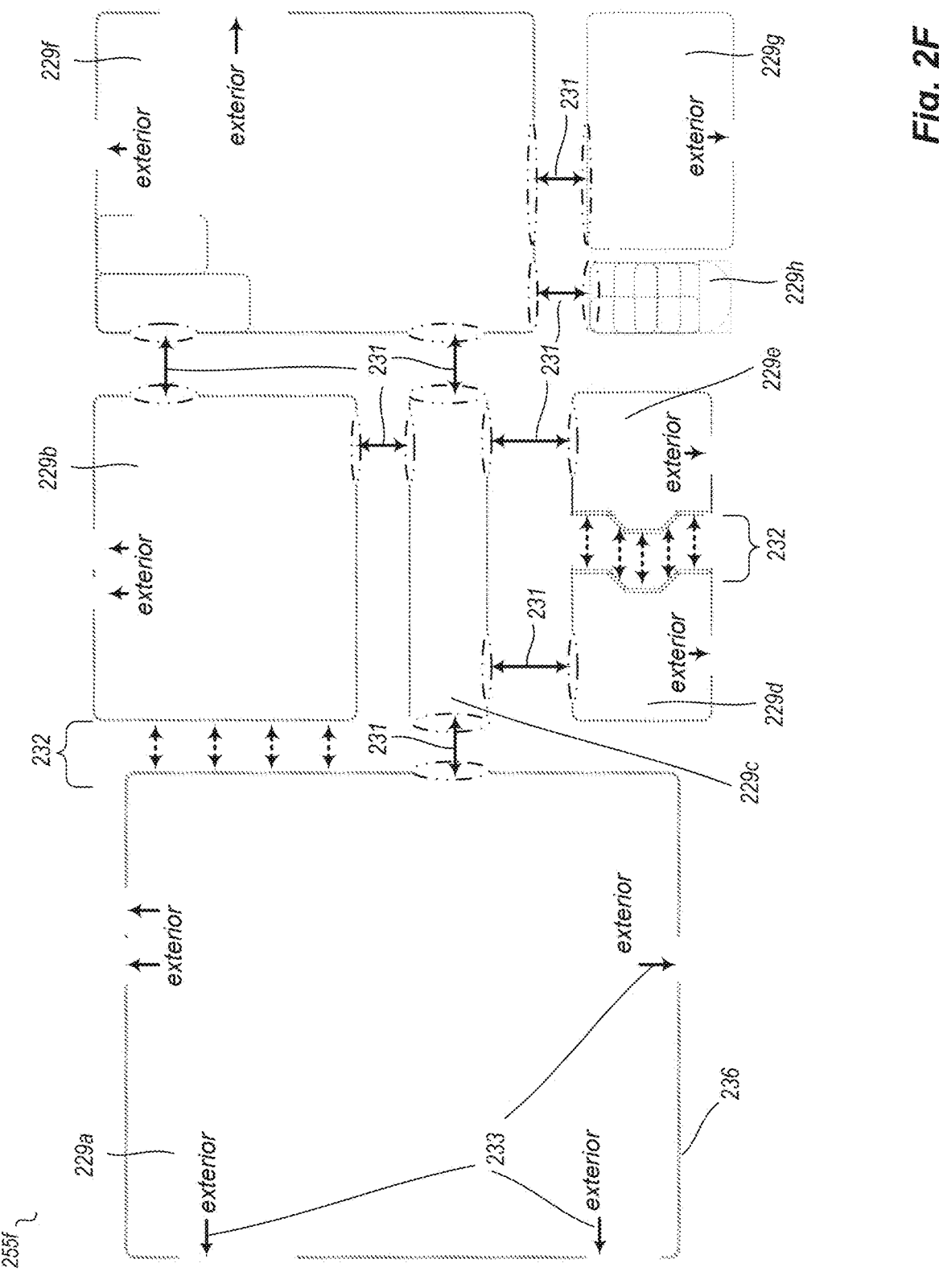
Figure 2G:
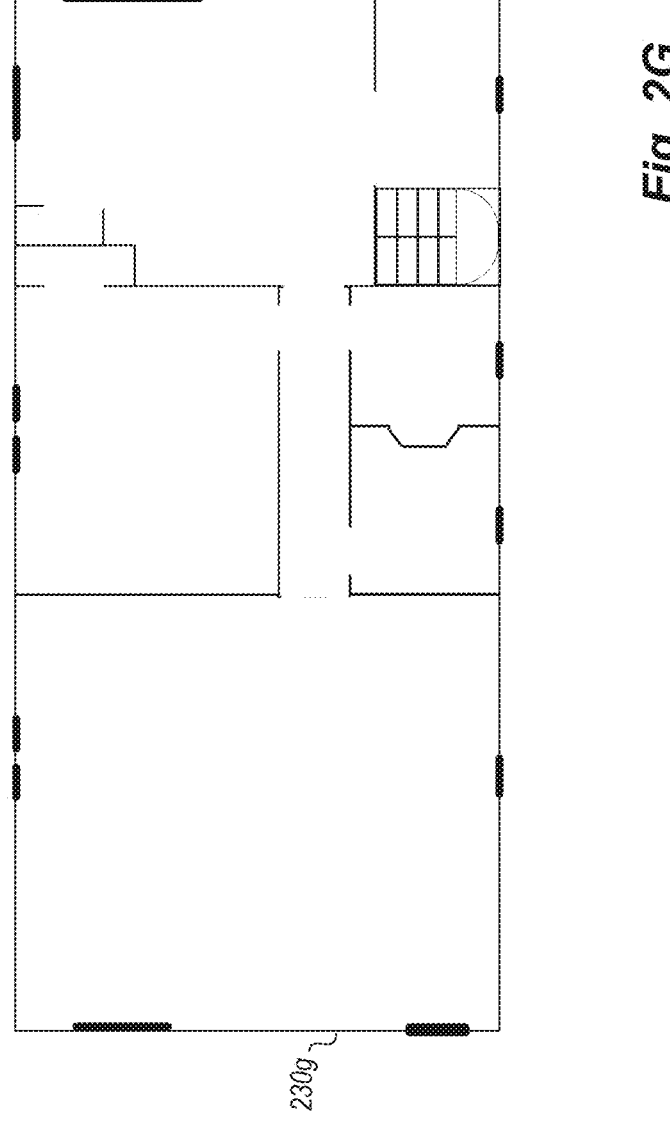
Figure 2H:
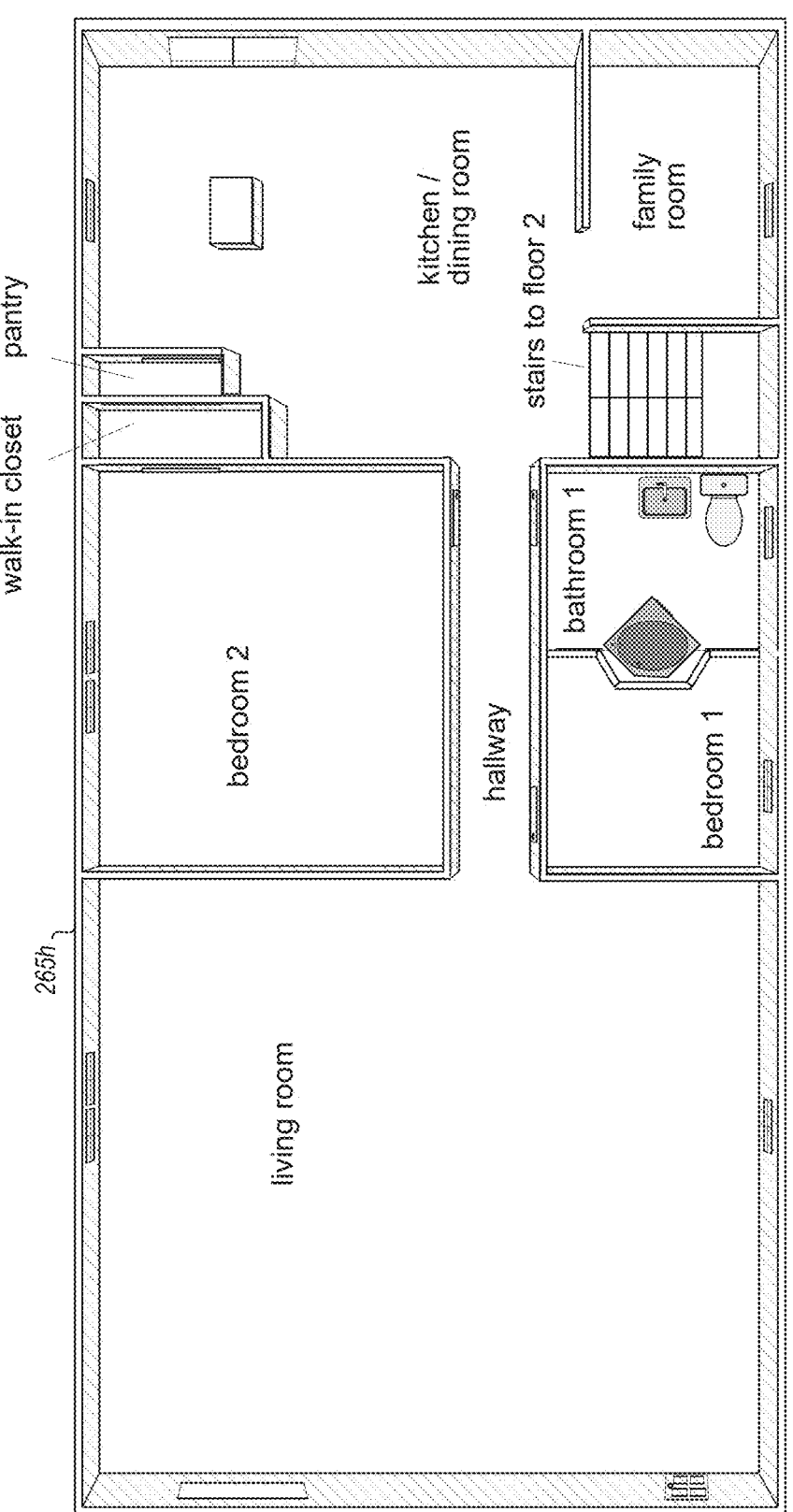

FIG. 2C further illustrates one example of a 2D floor plan 230c for the house 198, such as may be generated by a MIGM system and presented to an end-user in a GUI 260c, with the living room being the most westward room of the house (as reflected by directional indicator 209)—it will be appreciated that a 3D or 2.5D floor plan building model with rendered wall height information may be similarly generated and displayed in some embodiments, whether in addition to or instead of such a 2D floor plan, with one example of such a floor plan building model illustrated in FIG. 2H. Various types of information are illustrated on the 2D floor plan 230c in this example. For example, such types of information may include one or more of the following: room labels added to some or all rooms (e.g., "living room" for the living room); room dimensions added for some or all rooms, such as based on building dimension information determined by the MRIWBM system; visual indications of features such as installed fixtures or appliances (e.g., kitchen appliances, bathroom items, etc.) or other built-in elements (e.g., a kitchen island) added for some or all rooms; visual indications added for some or all rooms of positions of additional types of associated and linked information (e.g., of other panorama images and/or perspective images that an end-user may select for further display, of audio annotations and/or sound recordings that an end-user may select for further presentation, etc.); visual indications added for some or all rooms of structural features such as doors and windows; visual indications of visual appearance information (e.g., color and/or material type and/or texture for installed items such as floor coverings or wall coverings or surface coverings); visual indications of views from particular windows or other building locations and/or of other information external to the building (e.g., a type of an external space; items present in an external space; other associated buildings or structures, such as sheds, garages, pools, decks, patios, walkways, gardens, etc.); a key or legend 269 identifying visual indicators used for one or more types of information; etc. When displayed as part of a GUI, some or all such illustrated information may be user-selectable controls (or be associated with such controls) that allows an end-user to select and display some or all of the associated information (e.g., to select the 360° panorama image indicator for acquisition location 210B to view some or all of that panorama image (e.g., in a manner similar to that of FIGS. 2A-2C). In addition, in this example a user-selectable control 221 is added to indicate a current story that is displayed for the floor plan, and to allow the end-user to select a different story to be displayed—in some embodiments, a change in stories or other levels may also be made directly from the floor plan, such as via selection of a corresponding connecting passage in the illustrated floor plan (e.g., the stairs to story 2), and other visual changes may be made directly from the displayed floor plan by selecting corresponding displayed user-selectable controls (e.g., to select a control corresponding to a particular image at a particular location, and to receive a display of that image, whether instead of or in addition to the previous display of the floor plan from which the image is selected). In other embodiments, information for some or all different floors may be displayed simultaneously, such as by displaying separate sub-floor plans for separate floors, or instead by integrating the room connection information for all rooms and floors into a single floor plan that is shown together at once. It will be appreciated that a variety of other types of information may be added in some embodiments, that some of the illustrated types of information may not be provided in some embodiments, and that visual indications of and user selections of linked and associated information may be displayed and selected in other manners in other embodiments.

FIG. 2D continues the examples of FIGS. 2A-2C, and illustrates additional information about the living room and about analyzing 360° images captured in the living room (e.g., for target panorama images captured at two or more of acquisition locations 210A, 210B and 210C) as part of determining one type of estimate of a partial likely shape of the room, such as by the MIGM system. In particular, FIG. 2D includes information 255de illustrating that a 360° image taken from location 240b in living room 201 will share information about a variety of visible 2D features with that of a 360° image taken from location 240a, although only a limited subset of such features are illustrated in FIG. 2D for a portion of the living room for the sake of simplicity. In FIG. 2D, example lines of sight 228 from location 240b to various example features in the room are shown, and similar example lines of sight 227 from location 240a to corresponding features are shown, which illustrate degrees of difference between the views at significantly spaced capture locations. FIG. 2D further illustrates information 255*df* about the northeast portion of the living room that is visible in subsets of 360° images taken from locations 240*a* and 240*b* (e.g., video frames taken along a sequence of locations 240), and information 255*dg* about the northwest portion of the living room that is visible in other subsets of 360° images taken from locations 240*a* and 240*b*, with various example features in those portions of the living room being visible in both 360° image frames (e.g., corners 195-1 and 195-2, windows 196-1 and 196-2, etc.). As part of the automated analysis of the 360° images, partial information about planes 286*e* and 286*f* corresponding to portions of the northern wall of the living room may be determined from the features that are detected, and partial information 287*e* and 285*f* about portions of the east and west walls of the living room may be similarly determined from corresponding features identified in the images. In addition to identifying such partial plane information for detected features (e.g., for each point in a determined sparse 3D point cloud from the image analysis), the automated techniques (optionally including SLAM and/or MVS and/or SfM techniques) may further determine information about likely locations and orientations/directions 220 for the image subsets from capture location 240*a*, and likely locations and orientations/directions 222 for the image subsets from capture location 240*b* (e.g., locations 220*g* and 222*g* of the capture locations 240*a* and 240*b*, respectively, and optionally directions 220*e* and 222*e* for the image subsets shown in 255*df*; and corresponding locations 220*g* and 222*g* of the capture locations 240*a* and 240*b*, respectively, and optionally directions 220*f* and 222*f* for the image subsets shown in 255*dg*). While only features for part of the living room are illustrated in FIG. 2D, it will be appreciated that the other portions of the 360° images corresponding to other portions of the living room may be analyzed in a similar manner, in order to determine possible information about possible planes for the various walls of the room, as well as for other features (not shown) in the living room. In addition, similar analyses may be performed between some or all other images at locations 215 in the living room that are selected for use, resulting in a variety of determined feature planes from the various image analyses that may correspond to portions of the walls of the room.

FIG. 2D further illustrates information 255*dh* about a variety of determined feature planes that may correspond to portions of the west and north walls of the living room, from analyses of the 360° images captured at locations 240*a* and 240*b*. The illustrated plane information includes determined planes 286*g* near or at the northern wall (and thus corresponding possible locations of parts of the northern wall), and determined planes 285*g* near or at the western wall (and thus corresponding possible locations of parts of the western wall). As would be expected, there are a number of variations in different determined planes for the northern and western walls from different features detected in the analysis of the two 360° images, such as differences in position, angle and/or length, as well as missing data for some portions of the walls, causing uncertainty as to the actual exact position and angle of each of the walls. While not illustrated in FIG. 2D, it will be appreciated that similar determined feature planes for the other walls of the living room would similarly be detected, along with determined feature planes corresponding to features that are not along the walls (e.g., furniture). FIG. 2D further illustrates information 255*di* about additional determined feature plane information that may correspond to portions of the west and north walls of the living room, from analyses of various additional 360° images in the living room—as would be expected, the analyses of the further images provides even greater variations in different determined planes for the northern and western walls in this example. FIG. 2D further illustrates additional determined information that is used to aggregate information about the various determined feature planes portions in order to identify likely partial locations 295*a* and 295*b* of the west and north walls, as illustrated in information 255*dj* of FIG. 2D. In particular, FIG. 2D illustrates information 291*a* about normal orthogonal directions for some of the determined feature planes corresponding to the west wall, along with additional information 288*a* about those determined feature planes. In the example embodiment, the determined feature planes are clustered to represent hypothesized wall locations of the west wall, and the information about the hypothesized wall locations is combined to determine the likely wall location 295*a*, such as by weighting information from the various clusters and/or the underlying determined feature planes. In at least some embodiments, the hypothesized wall locations and/or normal information is analyzed via use of machine learning techniques to determine the resulting likely wall location, optionally by further applying assumptions or other constraints (such as a 90° corner, as illustrated in information 289 of FIG. 2D, and/or having flat walls) as part of the machine learning analysis or to results of the analysis. Similar analysis may be performed for the north wall using information 288*b* about corresponding determined feature planes and additional information 291*b* about resulting normal orthogonal directions for at least some of those determined feature planes. FIG. 2D illustrates the resulting likely partial wall locations 295*a* and 295*b* for the west and north walls of the living room, respectively.

While not illustrated in FIG. 2D, it will be appreciated that similar determined feature planes and corresponding normal directions for the other walls of the living room will similarly be detected and analyzed to determine their likely locations, resulting in an estimated partial overall room shape for the living room that is based on visual data acquired by the one or more image acquisition devices in the living room, and that some or all of the floor and/or ceiling may similarly be identified if visible in the captured images. In addition, similar analyses are performed for each of the rooms of the building, providing estimated partial room shapes of each of the rooms. While not illustrated in FIG. 2D, other room shape estimation operations may be performed in at least some embodiments using only a single target panorama image, such as via an analysis of the visual data of that target panorama image by one or more trained neural networks, as discussed in greater detail elsewhere herein. Furthermore, while also not illustrated in FIG. 2D, the analysis of the visual data captured by the one or more image acquisition devices may be supplemented and/or replaced in some embodiments by analysis of depth data (not shown) captured by the one or more image acquisition devices in the living room, such as to directly generate an estimated 3D point cloud from the depth data that represents the walls and optionally ceiling and/or floor of the living room, such as illustrated in FIG. 2E. In particular, FIG. 2E continues the examples of FIGS. 2A-2D, and illustrates information 255*e* about additional information that may be generated from one or more images in a room and used in one or more manners in at least some embodiments. Images (e.g., video frames) captured in the living room of the house 198 may be analyzed in order to determine an estimated 3D shape of the living room, such as from a 3D point cloud of features detected in the video frames (e.g., using SLAM and/or SfM and/or MVS techniques, and optionally further based on IMU data captured by the one or more image acquisition devices). In this example, information 255e reflects an example portion of such a point cloud for the living room, such as in this example to correspond to a northwesterly portion of the living room (e.g., to include northwest corner 195-1 of the living room, as well as windows 196-1) in a manner similar to image 250c of FIG. 2B. Such a point cloud may be further analyzed to detect features such as windows, doorways and other inter-room openings, etc.—in this example, an area 299 corresponding to windows 196-1 is identified, as well as borders 298 corresponding to the north wall of the living room. It will be appreciated that in other embodiments such an estimated 3D shape of the living room may be determined by using depth data captured by the one or more image acquisition devices in the living room, whether in addition to or instead of using visual data of one or more images captured by the one or more image acquisition devices in the living room. In addition, it will be appreciated that various other walls and other features may be similarity identified in the living room and in the other rooms of the house 198.

FIG. 2F continues the examples of FIGS. 2A-2E, and illustrates additional information 255f corresponding to, after final estimated room shapes are determined for the rooms of the illustrated floor of the house 198 (e.g., 2D room shape 236 for the living room), positioning the rooms' estimated room shapes relative to each other, based at least in part in this example on connecting inter-room passages between rooms and matching room shape information between adjoining rooms—in at least some embodiments, such information may be treated as constraints on the positioning of the rooms, and an optimal or otherwise preferred solution is determined for those constraints. Examples of such constraints in FIG. 2F include matching 231 connecting passage information (e.g., passages detected in the automated image analyses discussed with respect to FIG. 2D) for adjacent rooms so that the locations of those passages are co-located, and matching 232 shapes of adjacent rooms in order to connect those shapes (e.g., as shown for rooms 229d and 229e, and for rooms 229a and 229b). Various other types of information may be used in other embodiments for room shape positions, whether in addition to or instead of passage-based constraints and/or room shape-based constraints, such as exact or approximate dimensions for an overall size of the house (e.g., based on additional metadata available regarding the building, analysis of images from one or more image acquisition locations external to the building, etc.). Exterior information 233 outside of the house may further be identified and used as constraints (e.g., based at least in part of automated identification of passages and other features corresponding to the building exterior, such as windows), such as to prevent another room from being placed at a location that has been identified as the building's exterior. In the example of FIG. 2F, the final estimated room shapes that are used may be 2D room shapes, or instead 2D versions of 3D final estimated room shapes may be generated and used (e.g., by taking a horizontal slice of a 3D room shape).

FIGS. 2G and 2H continue the examples of FIG. 2A-2F, and illustrate mapping information that may be generated from the types of analyses discussed in FIGS. 2D-2F. In particular, FIG. 2G illustrates an example floor plan 230g that may be constructed based on the positioning of determined final estimated room shapes, which in this example includes walls and indications of doorways and windows, and before the determination and addition of further building information as shown in floor plan 230c of FIG. 2C. FIG. 2H illustrates additional information 265h that may be generated from the automated analysis techniques disclosed herein, and displayed (e.g., in a GUI similar to that of FIG. 2C), which in this example is a 2.5D or 3D model floor plan of the house. Such a model 265h may be additional mapping-related information that is generated based on the floor plan 230g, with additional information about height shown in order to illustrate visual locations in walls of features such as windows and doors, or instead by combining final estimated room shapes that are 3D shapes. While not illustrated in FIG. 2H, various types of additional information may be determined for the building and added to the floor plan model 265h in some embodiments and situations, such as the types of information illustrated for floor place 230c of FIG. 2C. In addition, further information may be added to the displayed walls in some embodiments, such as from images taken during the video capture (e.g., to render and illustrate actual paint, wallpaper or other surfaces from the house on the rendered model 265h), and/or may otherwise be used to add specified colors, textures or other visual information to walls and/or other surfaces.

Additional details related to embodiments of a system providing at least some such functionality of an MIGM system or related system for generating floor plans and associated information and/or presenting floor plans and associated information are included in co-pending U.S. Non-Provisional patent application Ser. No. 16/190,162, filed Nov. 14, 2018 and entitled "Automated Mapping Information Generation From Inter-Connected Images" (which includes disclosure of an example Floor Map Generation Manager, or FMGM, system that is generally directed to automated operations for generating and displaying a floor map or other floor plan of a building using images acquired in and around the building); in U.S. Non-Provisional patent application Ser. No. 16/681,787, filed Nov. 12, 2019 and entitled "Presenting Integrated Building Information Using Three-Dimensional Building Models" (which includes disclosure of an example FMGM system that is generally directed to automated operations for displaying a floor map or other floor plan of a building and associated information); in U.S. Non-Provisional patent application Ser. No. 16/841,581, filed Apr. 6, 2020 and entitled "Providing Simulated Lighting Information For Three-Dimensional Building Models" (which includes disclosure of an example FMGM system that is generally directed to automated operations for displaying a floor map or other floor plan of a building and associated information); in U.S. Provisional Patent Application No. 62/927,032, filed Oct. 28, 2019 and entitled "Generating Floor Maps For Buildings From Automated Analysis Of Video Of The Buildings' Interiors" (which includes disclosure of an example Video-To-Floor Map, or MRIWBM, system that is generally directed to automated operations for generating a floor map or other floor plan of a building using video data acquired in and around the building); in U.S. Non-Provisional patent application Ser. No. 16/807,135, filed Mar. 2, 2020 and entitled "Automated Tools For Generating Mapping Information For Buildings" (which includes disclosure of an example MIGM system that is generally directed to automated operations for generating a floor map or other floor plan of a building using images acquired in and around the building); and in U.S. Non-Provisional patent application Ser. No. 17/013,323, filed Sep. 4, 2020 and entitled "Automated Analysis Of Image Contents To Determine The Acquisition Location Of The Image" (which includes disclosure of an example MIGM system that is generally directed to automated operations for generating a floor map or other floor plan of a building using images acquired in and around the building, and an example ILMM system for determining the acquisition location of an image on a floor plan based at least in part on an analysis of the image's contents); each of which is incorporated herein by reference in its entirety.

Figure 2I:
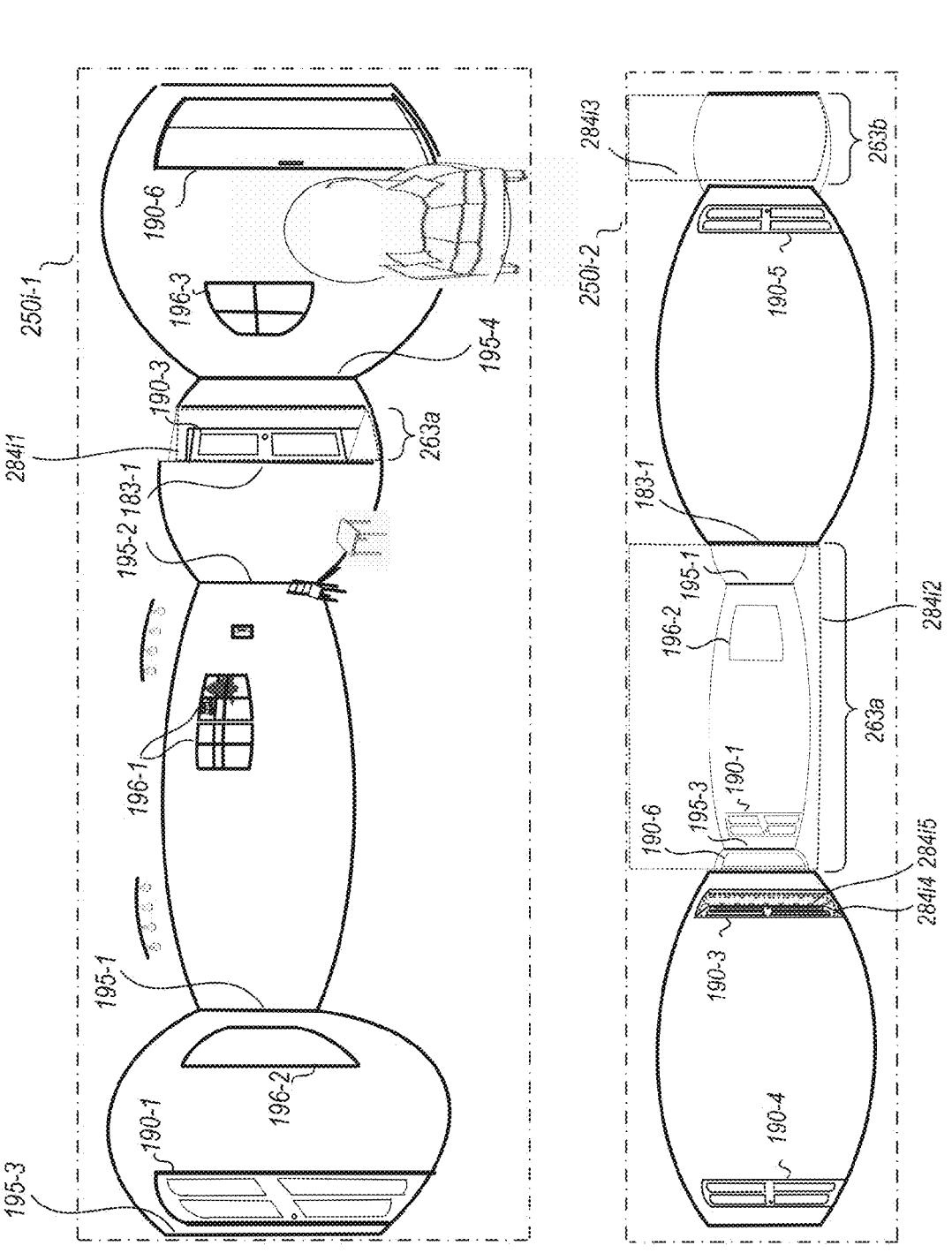
Figure 2J:
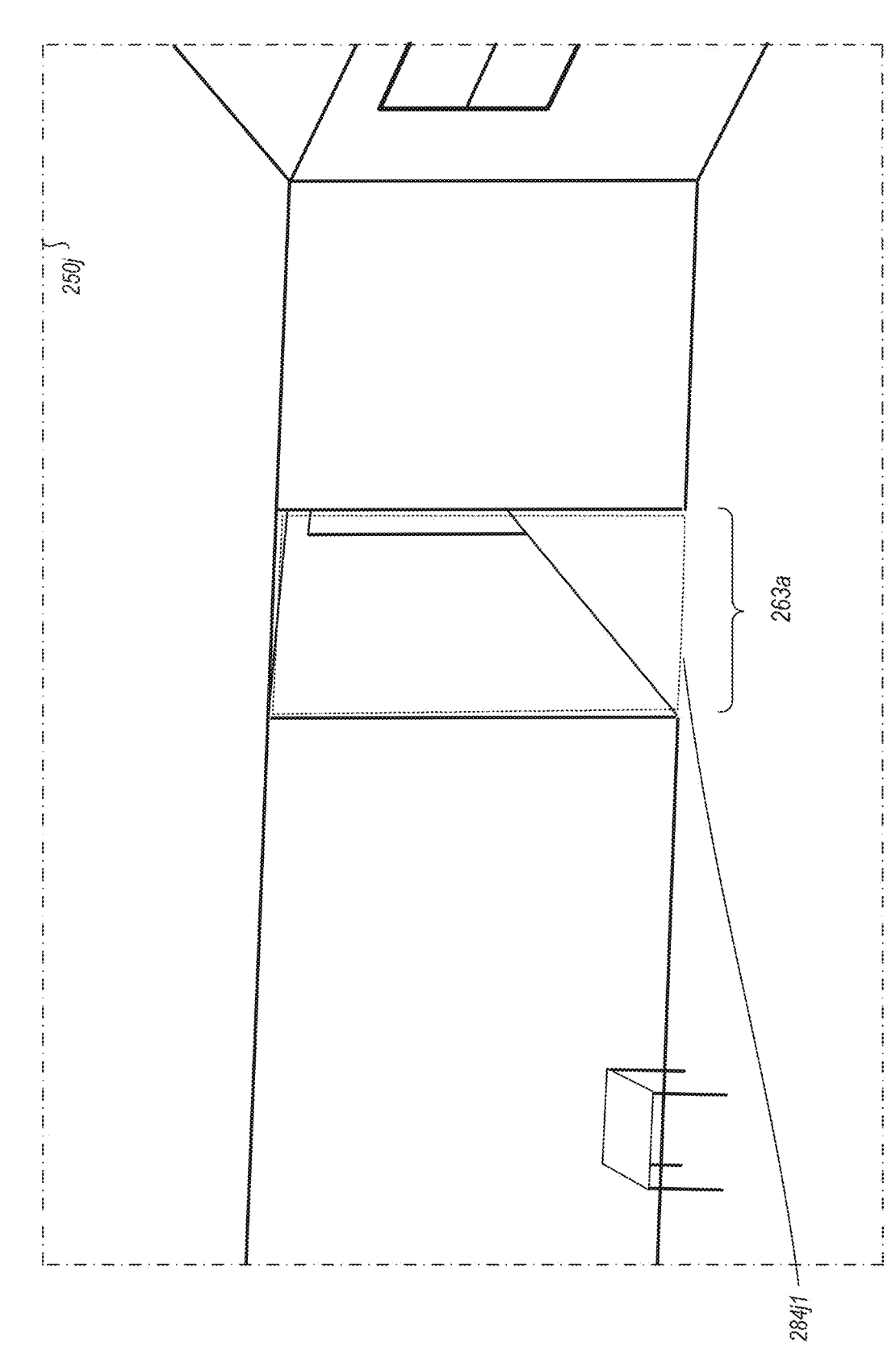

FIGS. 2I and 2J continue the examples of FIGS. 2A-2H, with FIG. 2I illustrating information 255*i* that shows examples of segmenting pixels of an image into multiple pixel groups each corresponding to a different room or other spatial region. In particular, FIG. 2I illustrates image 255*i*1, which is a 360° target panorama image (displayed using a straightened equirectangular projection format) corresponding to image 255*c* of FIG. 2C and illustrating a view from a living room of example house 198 (e.g., from acquisition location 210B), and showing a first group of image pixels 284*i*1 that are determined by the MRIWBM system corresponding to a small part of the hallway of the house that is visible through non-doorway wall opening 263*a* (with the wall opening determined by the MRIWBM system from analysis of the visual data of the image), with the other pixels of the image being a second group of image pixels representing the living room—it will be appreciated that different vantage points within the living room may illustrate different portions of the hallway, such as further illustrated with respect to FIG. 2J. While not illustrated in image 255*i*1, in some embodiments and situations, one or more other additional groups of image pixels are determined (and segmented from the second group of image pixels representing the living room), such as for one or more of the pixels within glass sliding door 190-6, windows 196-1, window 196-2, and/or window 196-3, such as to each represent a separate external spatial region (with the pixels visible through the two windows 196-1 being grouped together in this example due to their proximity on the same wall, and with the pixels visible through door 190-6 and window 196-3 further optionally grouped together to represent a single external spatial region, which in this example is an external patio in side yard 188). In addition, while doorway 190-1 is also identified from analysis of the image 250*i*-1, in this example embodiment and situation, the pixels within the doorway are not segmented into a separate group of pixels due to the door within the doorway being closed and content through the doorway to the front yard not being visible. FIG. 2I further illustrates an additional image 250*i*-2 that is a 360° target panorama image (displayed using a straightened equirectangular projection format) acquired at acquisition location 210C within the hallway—as is shown, a portion of the living room is visible through wall opening 263*a*, including window 196-2, doorway 190-1, inter-wall borders 195-1 and 195-3, etc., and the image further illustrates additional portions of the hallway and dining room to the east of the hallway (through inter-wall opening 263*b*), as well as a small portion of the bedroom through doorway 190-3. In this example, portions of the rooms behind doorways 190-4 and 190-5 (a bathroom and second bedroom, respectively) are not visible due to the door in those doorways being closed. In a manner similar to image 250*i*-1, the MRIWBM system determines one group of image pixels 28412 corresponding to a part of the living room of the house that is visible through non-doorway wall opening 263*a* (with the wall opening determined by the MRIWBM system from analysis of the visual data of the image, and such as including visual data of doors 190-1 and 190-6, window 196-2, inter-wall borders 195-1 and 195-3, etc.), another group of pixels 284*i*3 corresponding to a part of the dining room visible through the non-doorway wall opening 263*b*, and another group of pixels 284*i*4 corresponding to a part of bedroom 1 visible through the doorway 190-3, and with the other pixels of the image being a further group of image pixels representing the hallway room. In other embodiments and situations, only some of the pixels within the doorway 190-3 that correspond to bedroom 1 and not to the door in the doorway are determined to be a group of image pixels 28415 that is used instead of the larger pixel group 284*i*4, such as by segmenting a visible part of the door from other pixels visible within the doorway, and/or one or more other additional groups of image pixels may be determined (and segmented from the group of image pixels representing the living room), such as for one or more of the pixels within glass sliding door 190-6 and/or window 196-2, such as to each represent a separate external spatial region. As with doorway 190-1 in image 250*i*-1, the pixels within doorways 190-1, 190-4 and 190-5 in image 250*i*-2 are not selected as separate groups of image pixels due to the doors being closed and contents of the rooms or other spatial regions on the other sides of the doorways not being visible through the doorways.

Figure 2K:
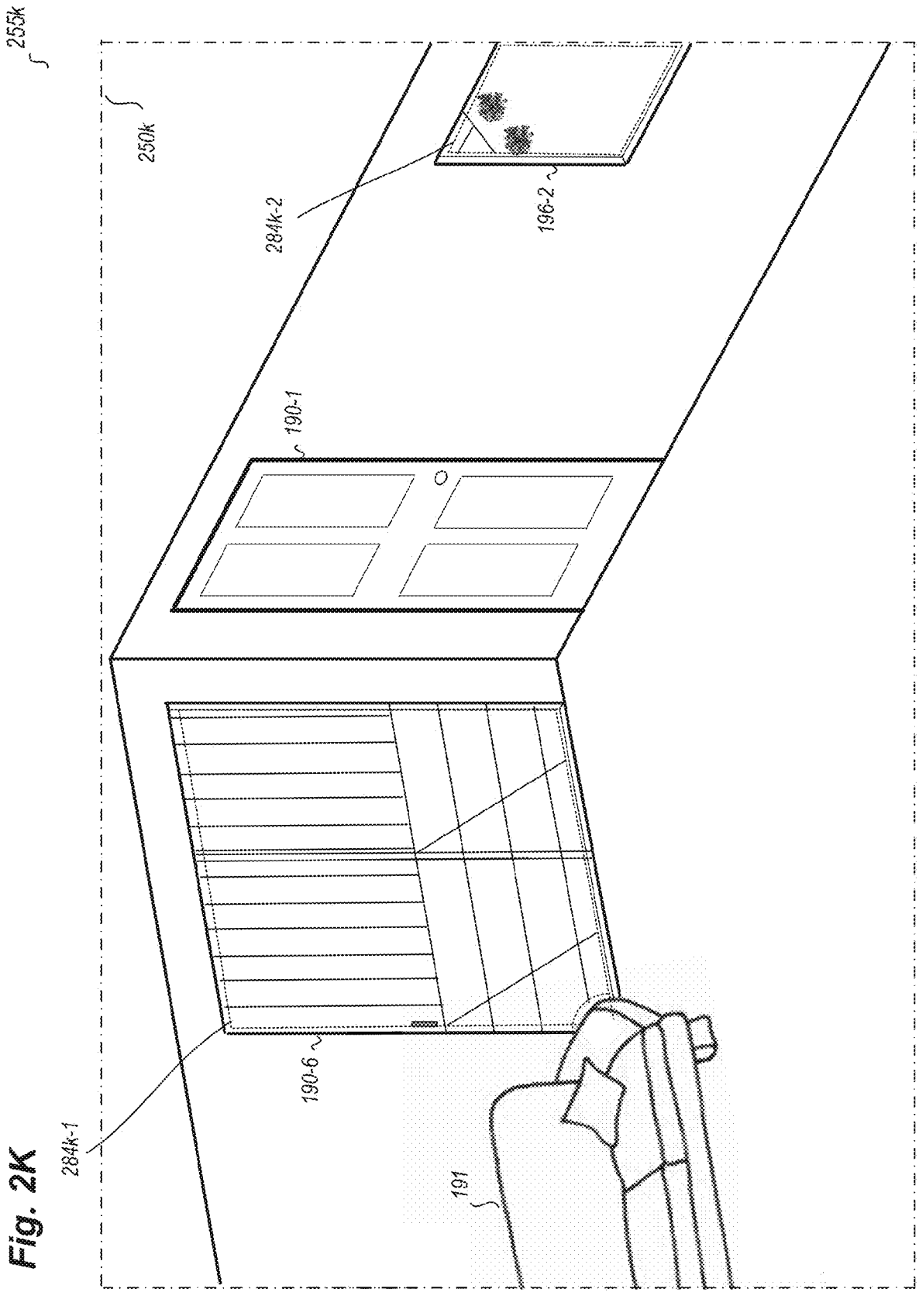

FIGS. 2J and 2K continue the examples of FIGS. 2A-2I, and illustrate information 255*j* and 255*k* that shows further examples of determinations by the MRIWBM system of pixel groups within images corresponding to different rooms or other spatial regions, and in these examples using non-panoramic perspective images in rectilinear format. In particular, FIG. 2J illustrates image 250*j* showing a portion of the living room (e.g., acquired from acquisition location 210A) in a roughly eastward direction, as well as a larger portion of the hallway (relative to image 250*i*-1 in FIG. 2I) through non-doorway wall opening 263*a*, with image pixel group 284*j*1 determined by the MRIWBM system corresponding to the hallway, and the remaining pixels being a second image pixel group corresponding to the visible portions of the living room. Similarly, FIG. 2K illustrates image 250*k* showing a portion of the living room (e.g., acquired from acquisition location 210A) in a roughly southward direction, with image pixel group 284*k*1 determined by the MRIWBM system corresponding to a part of the side yard 188 visible through the doorway 190-6, with image pixel group 284*k*2 determined by the MRIWBM system corresponding to a part of the front yard xxx visible through the window 196-2, and the remaining pixels being a third image pixel group corresponding to the visible portions of the living room. When multiple images show the same or overlapping portions of the same rooms (e.g., the living room and hallway room in images 250*i*-1, 250*i*-2, 250*j* and 250*k*), the MRIWBM system may in some embodiments analyze each image separately with different and independent white balancing corrections performed for portions of a given room that are visible in the different images, while in other embodiments and situations the MRIWBM system may perform a single white balancing correction analysis for each room or other spatial region across multiple portions of the room or other spatial region that are visible in the different images.

Figure 2L:
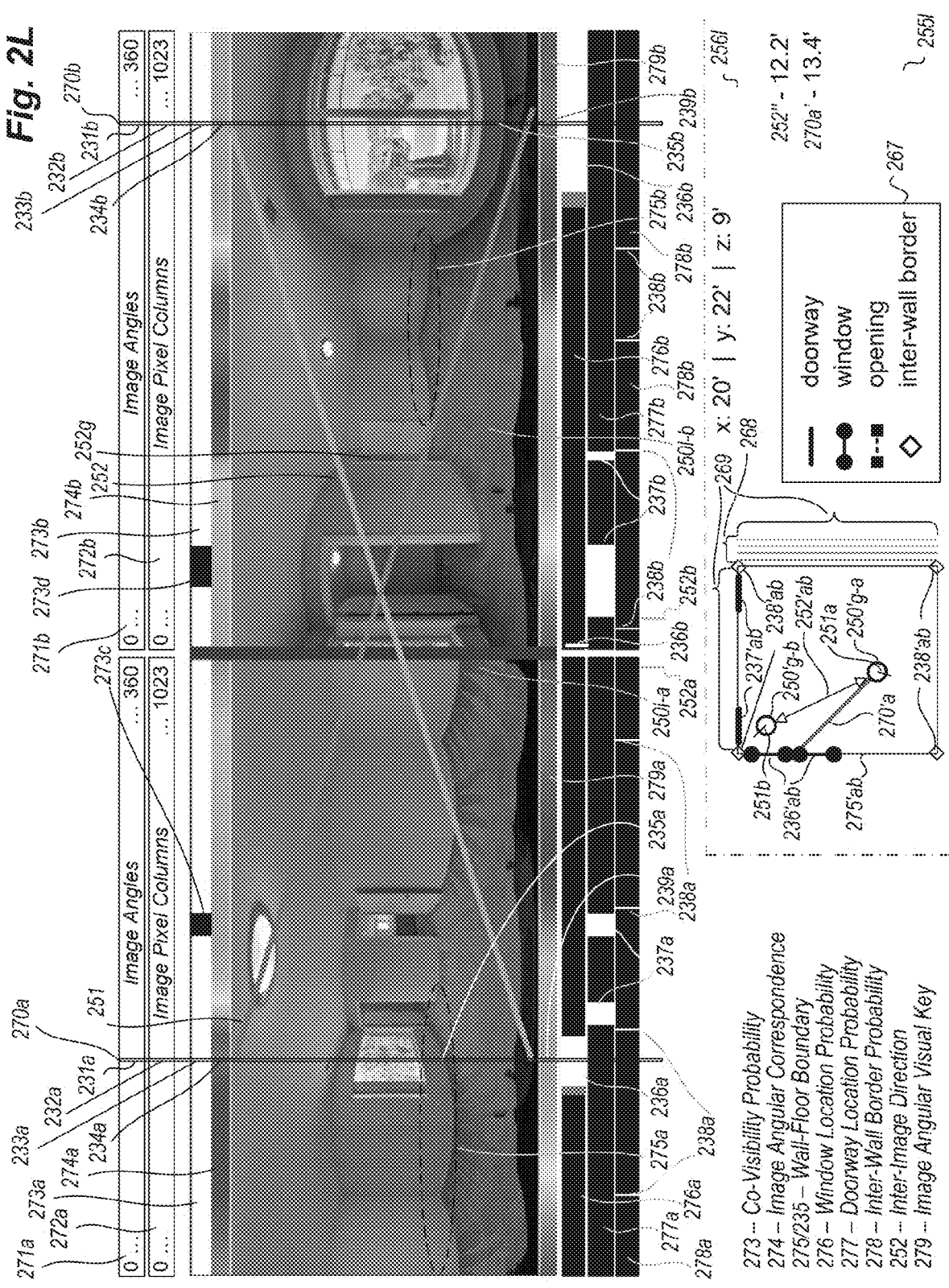

FIG. 2L continues the examples of FIGS. 2A-2K, and illustrates information 255*l* showing various types of building information that is determined by the MRIWBM system based on analysis of the visual data of two example panorama images 250*l*-*a* and 250*l*-*b*. With respect to FIG. 2L, the two example panorama images 250*l*-*a* and 250*l*-*b* are shown in straightened equirectangular projection format, with various outputs 273-278 and 252 of the analysis being shown. In this example, each image has 360° of horizontal coverage, as illustrated by image angle information 271a and 271b for the images 250l-a and 250l-b, respectively, and the visual data of each of the images is separated into 512 pixel rows (not shown) and 1024 pixel columns, as illustrated by image pixel column information 272a and 272b, respectively—it will be appreciated that each image angle may correspond to one or more pixel columns. Information 276, 277 and 278 is shown to illustrate probabilistically predicted data by the MRIWBM system for locations of windows, doorways, and non-doorway wall openings, respectively, including information 276a-278a of image 250l-a and information 276b-278b of image 250l-b. For example, with respect to window location probability information 276a for image 250l-a, information 236a illustrates the pixel columns of image 250l-a that are predicted to include visual data for the window, with the leftmost portion of the information 236a shown in gray to indicate a lower probability (e.g., due to the window shades partially obscuring the left end of the window) then the other portions of the information 236a-information 236b of window location probability data 276b for image 250l-b similarly shows the predicted window location information for that image. In a similar manner, the portions 237a of the doorway location probability information 277a of image 250l-a show the predicted locations of the two doorways visible in that image, and the corresponding portions 237b of the doorway location probability information 277b for image 250l-b show the predicted locations of the two doorways visible in that image.

In addition, after doorways, non-doorway wall openings and other structural information (e.g., windows; borders between walls, ceilings and floors; etc.) are determined by the MRIWBM system separately for each of the images 250I-a and 250l-b, the MRIWBM system performs further analyses to determine matching information between the two images. For example, information 273 of FIG. 2L illustrates probabilistically predicted co-visibility data for the two images, including information 273a for image 250l-a and information 273b for image 250l-b—in this example, almost all of the visual data of each of the two images is co-visible with respect to the other image, such as based on the acquisition locations of the two images being in the same room and with at most minimal intervening obstructions or other occluding objects. With respect to image 250l-a, most of the image pixel columns in information 273a are shown in white to indicate a 100% probability of co-visibility with image 250l-b, except for an area 273c shown in black to indicate a small portion of the image 250l-a with visual data for a portion of another room through a doorway (e.g., to be shown in black to indicate a 0% probability of co-visibility since the corresponding doorway in image 250l-b at 252g is shown at approximately a 90° angle from the acquisition location for that image such that the other room is not visible in image 250l-b, or if the visual data through the doorway is not considered, then area 273c may similarly be shown in white to indicate a 100% probability of co-visibility since the portion of the room up to the doorway is visible in both rooms), and with a similar situation for area 273d corresponding to a portion of the doorway in image 250l-b (since there is co-visibility in image 250l-a for the left part of the same doorway). In other situations, the probability information for the co-visibility data may include intermediate values between 0% and 100%, in a manner analogous to that discussed below with respect to window location probabilities. In addition, information 274 of FIG. 2G illustrates probabilistically predicted image angular correspondence data for the two images, including information 274a for image 250l-a and information 274b for image 250l-b. In this example, to assist in illustrating matches in image angular correspondence data between the two images, a visual legend 279 is shown below each image (legend 279a for image 250l-a and legend 279b for image 250l-b) using a spectrum of colors (e.g., chosen randomly) to correspond to different image angles, and with the information in the image angular correspondence data for a first image of the pair using the pixel column legend color for the other second image of the pair to illustrate pixel columns in the first image that correspond to other pixel columns of the second image. For example, an image angular correspondence bar 252 is overlaid to show that example pixel column 270a of image 250l-a, which corresponds to just left of the middle of the window in the image, is given a color in the legend 279a of a mid-green shade 239a, with a corresponding image pixel column 270b of image 250l-b having been identified as including visual data for the same part of the surrounding room and thus having the same mid-green shade, with corresponding information 231a, 232a, 233a and 234a shown for image 250l-a for image angles 271a, pixel columns 272a, co-visibility information 273a and image angular correspondence data 274a, and similar corresponding information 231b, 232b, 233b and 234b shown for image 250l-b for image angles 271b, pixel columns 272b, co-visibility information 273b and image angular correspondence data 274b—it will be appreciated that since the image 250l-a has a smaller number of image pixel columns with visual data of the window than does image 250l-b, there are a larger number of image pixel columns in the image angular correspondence information 274b for image 250l-b that include the various shades of green corresponding to respective parts of the legend information 279a for image 250l-a. A second image angular correspondence bar 251 is similarly overlaid to illustrate one or more pixel columns of image 250l-a that have visual data whose color of a shade of magenta in the image angular correspondence data 274a corresponds to the same color 239b in the legend 279b for image 250l-b. In addition, FIG. 2L further illustrates information 275 to correspond to a portion of the wall-floor boundary that is probabilistically predicted in each of the images and shown as a series of red arcs (including in this example to estimate the boundary for doorways and other areas in which a wall is not present or is not visible, such as behind the open doorway shown in image 250l-b), including information 275a for image 250l-a to show a portion of that image's wall-floor boundary, and information 275b for image 250l-b to show a portion of that image's wall-floor boundary. For example, with respect to image pixel column 270a in image 250l-a, an image pixel row 235a of image 250l-a is identified to correspond to the wall-floor boundary for that pixel column, and an image pixel row 235b of image 250l-b is similarly identified to correspond to the wall-floor boundary for image pixel column 270b of image 250l-b. The portions 238a of the inter-wall border location probability information 278a of image 250I-a show the predicted locations of the four inter-wall borders visible in that image, and the corresponding portions 238b of the inter-wall border location probability information 278b of image 250l-b show the predicted locations of the four inter-wall borders visible in that image.

In addition to the per-image pixel column predicted types of building information 273-278, additional types of building information is determined based on a combination of the visual data of the two images, including structural layout information 275'ab based on the wall-floor boundary information 275 and inter-image pose information 252'ab, as illustrated as part of information 2561 of FIG. 2L, and with pixel column indicators 252a and 252b shown for images 250l-a and 250l-b, respectively, to show the pixel column in each image that includes visual data in the direction of the other image—the MRIWBM system may similarly determine structural information for the room from a single one of the images 250l-a and 250l-b, optionally with less certainty about parts of the room (e.g., walls that are farther from the image's acquisition location in that single image). In this example, the structural layout information 275'ab is based on a combination of the boundary information 275a and 275b from images 250l-a and image 250l-b, respectively, and the inter-wall border probability information 278a and 278b from images 250l-a and image 250l-b, respectively, and is shown in the form of a two-dimensional room shape of the room in which the two images are acquired. Additional determined building information is shown on the structural layout 275'ab, including determined acquisition locations 250'g-a and 250'g-b for the images 250l-a and 250l-b, respectively, and indications of window locations 236'ab, doorway locations 237'ab, non-doorway wall opening locations 238'ab and inter-wall border locations 238'ab, with a corresponding legend 267 shown for reference. In this example, the two acquisition locations indicated on the structural layout further include indicators 251a and 251b to show the direction from that acquisition location to which the 0° portion of the image corresponds—in addition, for reference purposes, an indication of the direction 270'a is shown on the structural layout to indicate the pixel column 270a of image 250l-a. Each of the types of information labeled with an 'ab' in this example indicate a combination of data from the two images. In this example, scale information of various types is further determined for the room, including predicted values for room width length and height 269, a predicted value 252" for the distance between the two images' acquisition locations, and predicted distance value 270a' corresponding to the distance from image acquisition location 250'g-a to the wall shown in pixel column 270a. In addition, uncertainty information may exist with respect to any and/or all of the predicted types of building information, as illustrated in this example for the structural layout information 275'ab by uncertainty bands 269 corresponding to uncertainty about a location of a right side of the room-uncertainty information is not illustrated in this example for other types of determined building information or for other parts of the structural layout 275'ab. It will be appreciated that various other types of building information may be determined in other embodiments, and that building information types may be illustrated in other manners in other embodiments. Additional details related to examples for determining some of the types of information illustrated in FIG. 2L are included in U.S. Non-Provisional patent application Ser. No. 18/527,073, filed Dec. 1, 2023 and entitled "Automated Building Dimension Determination Using Analysis Of Acquired Building Images", which is incorporated herein by reference in its entirety.

FIG. 2M continues the examples of FIGS. 2A-2L, and illustrates information 255m an additional panorama image having multiple different non-doorway wall openings and associated separate groups of image pixels for those wall openings. In particular, in this example, a first group of image pixels 248m-1 is segmented for a first additional room visible through non-doorway wall opening 263c, and a second group of image pixels 248m-2 is segmented for a second additional room visible through non-doorway wall opening 263d, with the remaining image pixels being part of a third pixel group corresponding to visible data for the room in which the image is acquired. In a manner similar to that of FIGS. 21 and 2J, while a doorway with a closed door is further identified by the MRIWBM system, the corresponding pixels within a sub-portion 284m-3 of the image are not segmented as a separate group of image pixels since an area beyond the doorway is not visible. In addition, as discussed in greater detail elsewhere herein, the group of image pixels 284m-2 within the non-doorway wall opening 263d may in some embodiments be further segmented into multiple image pixel groups, such as to treat a room to the left within the non-doorway wall opening 263d with carpet separately from a room in the foreground within the non-doorway wall opening 263d with wood flooring and to have separate corresponding groups of image pixels for each, and to optionally further have another group of image pixels corresponding to a balcony area visible in the upper area within the non-doorway wall opening 263d.

Various details have been provided with respect to FIGS. 2A-2M, but it will be appreciated that the provided details are non-exclusive examples included for illustrative purposes, and other embodiments may be performed in other manners without some or all such details.

Figure 3:
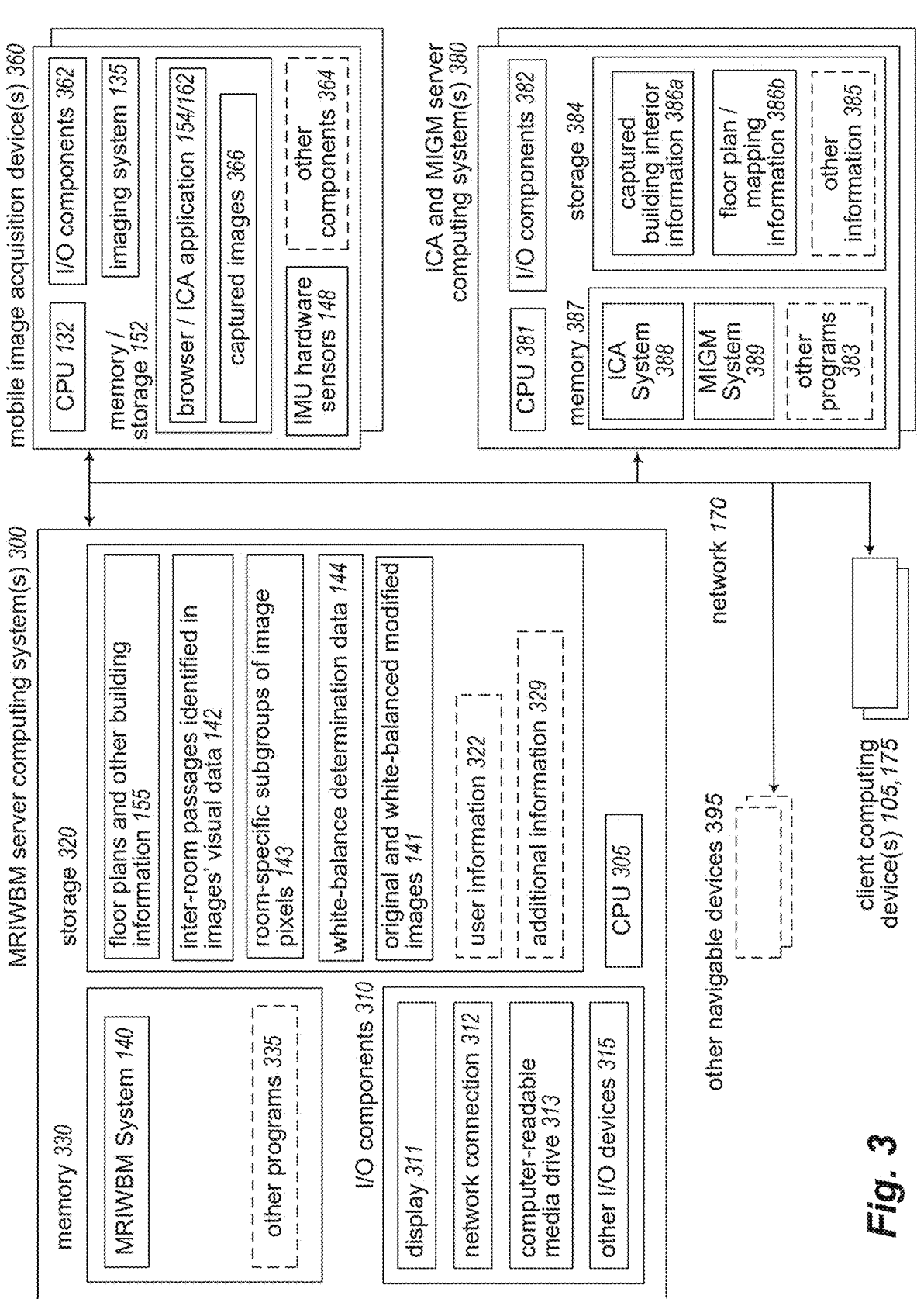
FIG. 3 is a block diagram illustrating computing systems suitable for executing an embodiment of a system that performs at least some of the techniques described in the present disclosure.

FIG. 3 is a block diagram illustrating an embodiment of one or more server computing systems 300 executing an implementation of a MRIWBM system 140, and one or more server computing systems 380 executing an implementation of an ICA system 388 and an MIGM system 389—the server computing system(s) and MRIWBM and/or ICA and/or MIGM systems may be implemented using a plurality of hardware components that form electronic circuits suitable for and configured to, when in combined operation, perform at least some of the techniques described herein. One or more computing systems and devices may also optionally be executing a Building Information Access system, not shown (such as server computing system(s) 300, client computing device(s) 105,175, etc.) and/or optional other programs 335 and 383 (such as server computing system(s) 300 and 380, respectively, in this example). In the illustrated embodiment, each server computing system 300 includes one or more hardware central processing units ("CPUs") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 may have similar components, although only one or more hardware processors 381, memory 387, storage 384 and I/O components 382 are illustrated in this example for the sake of brevity.

In the illustrated embodiment, the MRIWBM system 140 executes in memory 330 of the server computing system(s) 300 in order to perform at least some of the described techniques, such as by using the processor(s) 305 to execute software instructions of the system 140 in a manner that configures the processor(s) 305 and computing system 300 to perform automated operations that implement those described techniques. The illustrated embodiment of the MRIWBM system may include one or more components, not shown, to each perform portions of the functionality of the MRIWBM system, such as in a manner discussed elsewhere herein, and the memory may further optionally execute one or more other programs 335—as one specific example, a copy of the ICA and/or MIGM systems may execute as one of the other programs 335 in at least some embodiments, such as instead of or in addition to the ICA and/or MIGM systems 388-389 on the server computing system(s) 380, and/or a copy of a Building Information Access system may execute as one of the other programs 335. The MRIWBM system 140 may further, during its operation, store and/or retrieve various types of data on storage 320 (e.g., in one or more databases or other data structures), such as images 141 including original images 141*a* (e.g., images captured and/or generated by the ICA system; additional images and/or annotation information; etc.) and white-balanced corrected modified images 141*b*, information 142 about inter-room passages and/or other inter-region passages identified in visual data of the images 141*a* (and optionally various other types of determined structural data and other data from image analysis, such as image horizontal midlines, image horizon lines, etc.), corresponding room-specific and/or other region-specific pixel subgroups 143, data 144 determined as part of the white balancing correction operations (e.g., neutral pixels and associated chromatic adjustment data, color-saturated pixels, blue sky analysis data, etc.), floor plans and other associated building information 155 (e.g., 2D and/or 2.5D and/or 3D models generated by the MIGM system, such as using white-balanced corrected modified images 141*b*), optionally various types of user information 322 for users who interact with the MRIWBM system, and/or various types of optional additional information 329 (e.g., various analytical information related to presentation or other use of one or more building interiors or other environments).

In addition, embodiments of the ICA and MIGM systems 388-389 execute in memory 387 of the server computing system(s) 380 in the illustrated embodiment in order to perform techniques related to generating panorama images and floor plans for buildings, such as by using the processor(s) 381 to execute software instructions of the systems 388 and/or 389 in a manner that configures the processor(s) 381 and computing system(s) 380 to perform automated operations that implement those techniques. The illustrated embodiment of the ICA and MIGM systems may include one or more components, not shown, to each perform portions of the functionality of the ICA and MIGM systems, respectively, and the memory may further optionally execute one or more other programs 383. The ICA and/or MIGM systems 388-389 may further, during operation, store and/or retrieve various types of data on storage 384 (e.g., in one or more databases or other data structures), such as video and/or image information 386*a* acquired for one or more buildings (e.g., 360° video or images for analysis to generate floor plans, to provide to users of client computing devices 105,175 for display, etc.), floor plans and/or other generated mapping information 386*b*, and optionally other information 385 (e.g., additional images and/or annotation information for use with associated floor plans, building and room dimensions for use with associated floor plans, various analytical information related to presentation or other use of one or more building interiors or other environments, etc.)—while not illustrated in FIG. 3, the ICA and/or MIGM systems may further store and use additional types of information, such as about other types of building information to be analyzed and/or provided to the MRIWBM system, about ICA and/or MIGM system operator users and/or end-users, etc.

The server computing system(s) 300 and executing MRIWBM system 140, server computing system(s) 380 and executing ICA and MIGM systems 388-389, and optionally executing Building Information Access system (not shown), may communicate with each other and with other computing systems and devices in this illustrated embodiment, such as via one or more networks 170 (e.g., the Internet, one or more cellular telephone networks, etc.), including to interact with user client computing devices 105,175 (e.g., used to view white-balanced corrected modified images, floor plans, and optionally other related information, such as by interacting with or executing a copy of the Building Information Access system), and/or mobile image acquisition devices 360 (e.g., used to acquire images and/or other information for buildings or other environments to be modeled), and/or optionally other navigable devices 395 that receive and use floor plans and optionally other generated information for navigation purposes (e.g., for use by semi-autonomous or fully autonomous vehicles or other devices). In other embodiments, some of the described functionality may be combined in less computing systems, such as to combine the MRIWBM system 140 and a Building Information Access system in a single system or device, to combine the MRIWBM system 140 and the image acquisition functionality of device(s) 360 in a single system or device, to combine the ICA and MIGM systems 388-389 and the image acquisition functionality of device(s) 360 in a single system or device, to combine the MRIWBM system 140 and the ICA and MIGM systems 388-389 in a single system or device, to combine the MRIWBM system 140 and the ICA and MIGM systems 388-389 and the image acquisition functionality of device(s) 360 in a single system or device, etc.

Some or all of the user client computing devices 105,175 (e.g., mobile devices), mobile image acquisition devices 360, optional other navigable devices 395 and other computing systems (not shown) may similarly include some or all of the same types of components illustrated for server computing system 300. As one non-limiting example, the mobile image acquisition devices 360 are each shown to include one or more hardware CPU(s) 132, I/O components 362, memory and/or storage 152, one or more imaging systems 135, IMU hardware sensors 148 (e.g., for use in acquisition of video and/or images, associated device movement data, etc.), and optionally other components 364. In the illustrated example, one or both of a browser and one or more client applications 154,162 (e.g., an application specific to the MRIWBM system and/or to ICA system and/or to the MIGM system) are executing in memory 152, such as to participate in communication with the MRIWBM system 140, ICA system 388, MIGM system 389 and/or other computing systems, and one or more captured images 366 are stored in memory or storage 152. While particular components are not illustrated for the other navigable devices 395 or other computing devices/systems 105,175, it will be appreciated that they may include similar and/or additional components.

It will also be appreciated that computing systems 300 and 380 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAS, wireless phones, Internet appliances, and various other consumer products that include appropriate communication capabilities. In addition, the functionality provided by the illustrated MRIWBM system 140 may in some embodiments be distributed in various components, some of the described functionality of the MRIWBM system 140 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the MRIWBM system 140 executing on server computing systems 300, by a Building Information Access system executing on server computing systems 300 or other computing systems/devices, etc.) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIG. 4 illustrates an example embodiment of a flow diagram for a Multi-Room Image White Balancing Manager (MRIWBM) system routine 400, such as to perform a corresponding computer-implemented method. The routine may be performed by, for example, execution of the MRIWBM system 140 of FIG. 1, the MRIWBM system 140 of FIG. 3, and/or an MRIWBM system as described with respect to FIGS. 2I-2M and elsewhere herein, such as to perform automated operations related to automatically analyzing visual data of an image acquired at a building that shows at least parts of multiple rooms and/or other spatial regions in order to perform white balancing corrections separately for different parts of the image corresponding to the different rooms and/or spatial regions. In the example embodiment of FIG. 4, the images are for houses or other buildings, but in other embodiments, similar analyses may be performed for other types of structures or for non-structure locations, and the results may be used in other manners than those discussed with respect to routine 400, as discussed elsewhere herein.

The illustrated embodiment of the routine begins at block 405, where one or more images for a building are obtained— in some embodiments and situations, the obtaining of the one or more images may include executing an ICA routine that captures the one or more images, with one example of such a routine discussed in greater detail with respect to FIG. 5. In block 410, the routine then, for each of the images that is in a standard RGB color space format or other non-linear gamma-corrected color space format, optionally converts the image to a linear RGB color space, such as using the CIE XYZ color space format. In block 415, the routine then, for each image, analyzes the image to identify any visible inter-room passages or other inter-region separators of multiple rooms or other spatial regions (including interior-exterior separators such as windows through which a different area is visible), and for each such identified passage or other separator, creates a separate subgroup of image pixels visible through the passage or other separator, optionally after determining that the pixels in the image within the passage or other separator are part of a different room or spatial region (e.g., to verify that a door and a doorway is not fully closed and nontransparent, such as by analyzing structural data within the image pixels visible through the passage or other separator that is different from nearby structural data outside the passage or other separator, by identifying differences in color or other features between the pixels within the passage or other separator and other nearby pixels, etc.). The routine then further creates another subgroup of the image pixels that are remaining and not part of the one or more created subgroups to correspond to the visual data of the image for the room or other spatial region in which the image was acquired. In some embodiments and situations, the analysis of the image may further determine one or more additional types of information, such as a horizontal midline of the image, a horizon line, a subset of the pixels corresponding to a ceiling, etc., although in other embodiments such information may be determined at other times.

After block 415, the routine continues to block 420 to determine if the analyzed images include one or more images that have multiple image pixel subgroups corresponding to different rooms or other spatial regions, and if not continues to block 490, while otherwise continuing to block 425 to select the next such image (beginning with a first image), where the routine optionally performs a blue sky analysis on the image to determine if an amount of blue coloring in pixels above a horizon line is above a defined threshold (e.g., if a percentage or other amount of pixels above the horizon line that are determined to have sufficient blue coloring is above a defined threshold)—if the image is determined to have sufficient blue sky data, such as to correspond to an exterior image, the routine may further in block 425 determine if there are one or more inter-region separators of external spatial regions visible in the visual data of the image, such as to enable white balancing corrections to be applied to the exterior image (e.g., using white patch analysis). In block 430, the routine then determines if the selected image is an external image without any identified external spatial region separators, such as to correspond to a single exterior area with consistent illumination, and if so continues to block 490, and otherwise continues to perform blocks 435-445. In particular, in block 435, the routine determines one or more neutral pixels for each image pixel subgroup in the selected image, optionally using pixels from that subgroup that are above the horizontal midline for the image and/or that are from a ceiling section of the selected image within the subgroup, and optionally further filters out one or more pixels from the image pixel subgroup that are identified as being color saturated, as discussed in greater detail elsewhere herein—in other embodiments and situations, the filtering of color-saturated pixels may be performed for an image as a whole rather than separately for each image pixel subgroup. In block 440, the routine then, for each image pixel subgroup, performs a separate white balancing correction analysis for at least some pixels in that subgroup, such as by using differences between the values for the multiple color channels of the one or more neutral pixels for that subgroup to adjust color values for each of the at least some pixels. In block 445, the routine then optionally converts the resulting white-balanced corrected modified image to a standard RGB color space format.

If it is instead determined in block 420 that there are not any images with multiple image pixel subgroups, or in block 430 that a selected image is an exterior image without any identified external spatial region separator, the routine continues to block 490 to optionally perform one or more other white balancing correction analyses (e.g., for a single selected image from block 430, or for all obtained images from block 420) that have visual coverage of a single room or other spatial region, such as by performing a consistent white balancing correction analysis across all of the pixels of the image. After blocks 445 or 490, the routine in block 450 then determines if there are more images to analyze, and if so returns to block 425 to select the next such image, and otherwise continues to block 485. In block 485, the routine then stores the white-balanced corrected modified images generated in blocks 490 and/or in blocks 440 and optionally 445, and continues to block 495 to determine whether to continue, such as until an explicit indication to terminate is received, or instead only if an explicit indication to continue is received. If it is determined to continue, the routine returns to block 405 to wait for and obtain additional images to analyze, and otherwise continues to block 499 and ends.

FIG. 5 illustrates an example flow diagram of an embodiment of an ICA (Image Capture & Analysis) system routine 500, such as to perform a corresponding computer-implemented method. The routine may be performed by, for example, the ICA system 160 of FIG. 1, the ICA system 388 of FIG. 3, and/or an ICA system as described with respect to FIGS. 2A-2C and elsewhere herein, such as to acquire 360° panorama images and/or other images at acquisition locations within buildings or other structures, such as for use in subsequent generation of related floor plans and/or other mapping information. While portions of the example routine 500 are discussed with respect to acquiring particular types of images at particular acquisition locations, it will be appreciated that this or a similar routine may be used to acquire video (with video frame images) and/or other data (e.g., audio), whether instead of or in addition to such panorama images or other perspective images. In addition, while the illustrated embodiment acquires and uses information from the interior of a target building, it will be appreciated that other embodiments may perform similar techniques for other types of data, including for non-building structures and/or for information external to one or more target buildings of interest. Furthermore, some or all of the routine may be executed on a mobile device used by a user to acquire image information, and/or by a system remote from such a mobile device. In at least some embodiments, the routine 500 may be invoked from block 612 of routine 600 of FIGS. 6A-6B, with corresponding information from routine 500 provided to routine 600 as part of implementation of that block 612—in other embodiments, the routine 600 may proceed with additional operations in an asynchronous manner without waiting for such processing control to be returned (e.g., to proceed with other processing activities while waiting for the corresponding information from the routine 500 to be provided to routine 600 in block 612).

The illustrated embodiment of the routine begins at block 505, where instructions or information are received. At block 510, the routine determines whether the received instructions or information indicate to acquire visual data and/or other data representing a building interior (optionally in accordance with supplied information about one or more additional acquisition locations and/or other guidance acquisition instructions), and if not continues to block 590. Otherwise, the routine proceeds to block 512 to receive an indication to begin the image acquisition process at a first acquisition location (e.g., from a user of a mobile image acquisition device that will perform the acquisition process). After block 512, the routine proceeds to block 515 in order to perform acquisition location image acquisition activities for acquiring a 360° panorama image for the acquisition location in the interior of the target building of interest, such as via one or more fisheye lenses and/or non-fisheye rectilinear lenses on the mobile device and to provide horizontal coverage of at least 360° around a vertical axis, although in other embodiments other types of images and/or other types of data may be acquired. As one non-exclusive example, the mobile image acquisition device may be a rotating (scanning) panorama camera equipped with a fisheye lens (e.g., with 180° degrees of horizontal coverage) and/or other lens (e.g., with less than 180° degrees of horizontal coverage, such as a regular lens or wide-angle lens or ultrawide lens). The routine may also optionally obtain annotation and/or other information from the user regarding the acquisition location and/or the surrounding environment, such as for later use in presentation of information regarding that acquisition location and/or surrounding environment.

After block 515 is completed, the routine continues to block 525 to determine if there are more acquisition locations at which to acquire images, such as based on corresponding information provided by the user of the mobile device and/or received in block 505—in some embodiments, the ICA routine will acquire only a single image and then proceed to perform blocks 530-580 to provide that image and corresponding information (e.g., to return the image and corresponding information to the MIGM system for further use before receiving additional instructions or information to acquire one or more next images at one or more next acquisition locations). If there are more acquisition locations at which to acquire additional images at the current time, the routine continues to block 527 to optionally initiate the capture of linking information during movement of the mobile device along a travel path away from the current acquisition location and towards a next acquisition location within the building interior—the captured linking information may include additional sensor data (e.g., from one or more IMU, or inertial measurement units, on the mobile device or otherwise carried by the user) and/or additional visual information (e.g., images, video, etc.) recorded during such movement. Initiating the capture of such linking information may be performed in response to an explicit indication from a user of the mobile device or based on one or more automated analyses of information recorded from the mobile device. In addition, the routine may further optionally monitor the motion of the mobile device in some embodiments during movement to the next acquisition location, and provide one or more guidance cues (e.g., to the user) regarding the motion of the mobile device, quality of the sensor data and/or visual information being captured, associated lighting/environmental conditions, advisability of capturing a next acquisition location, and any other suitable aspects of capturing the linking information. Similarly, the routine may optionally obtain annotation and/or other information from the user regarding the travel path, such as for later use in presentation of information regarding that travel path or a resulting inter-panorama image connection link. In block 529, the routine determines that the mobile device has arrived at the next acquisition location (e.g., based on an indication from the user, based on the forward movement of the mobile device stopping for at least a predefined amount of time, etc.), for use as the new current acquisition location, and returns to block 515 in order to perform the acquisition location image acquisition activities for the new current acquisition location.

Figure 6A:
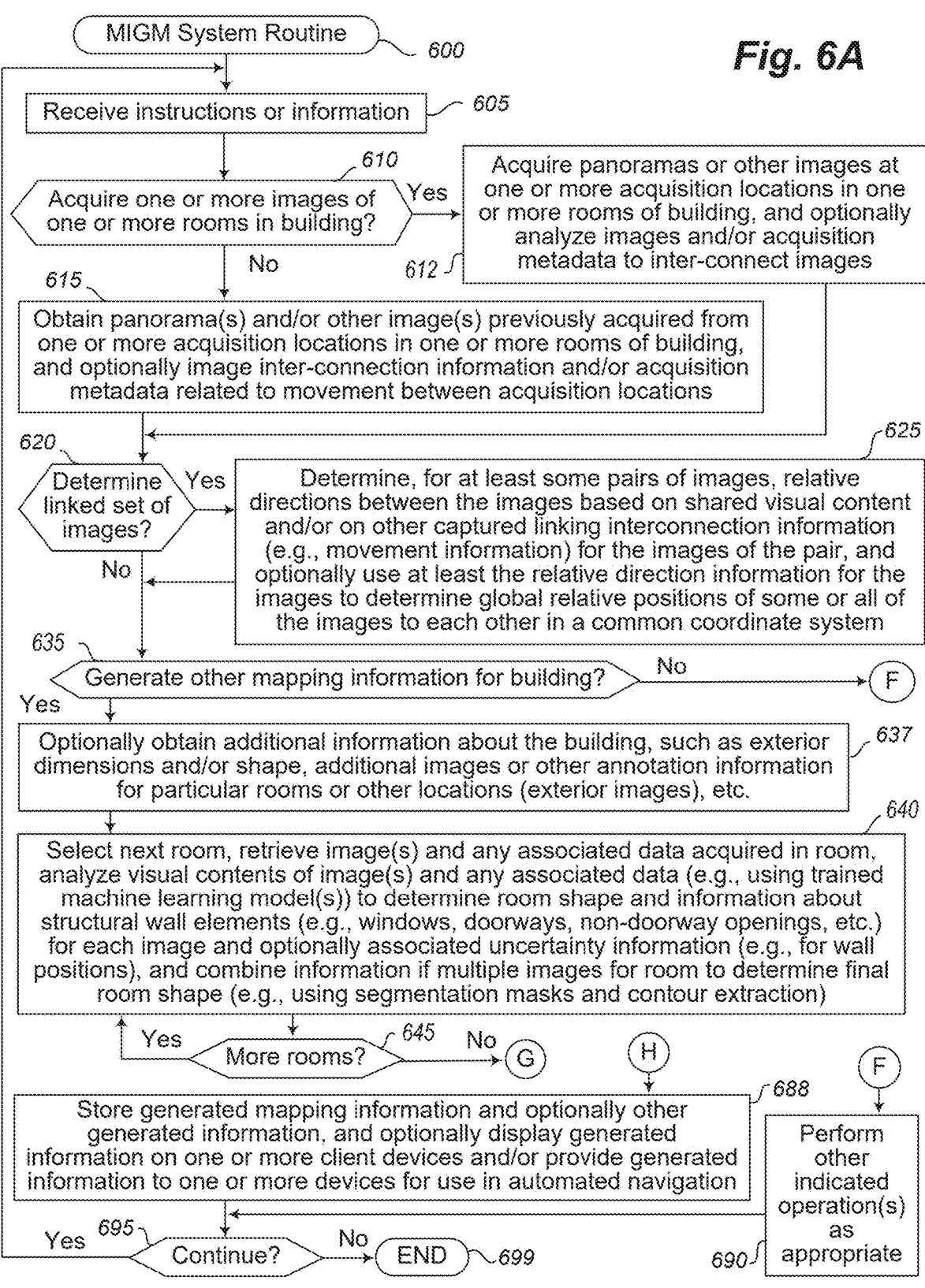

If it is instead determined in block 525 that there are not any more acquisition locations at which to acquire image information for the current building or other structure at the current time, the routine proceeds to block 530 to optionally analyze information about the one or more acquisition locations to identify possible additional areas in the building for which to acquire visual data (e.g., based on not obtaining visual data for a kitchen or a bathroom, on only obtaining visual data for 2 bathrooms while textual description information for the building indicates 3 bathrooms, etc.) and/or other information to gather (e.g., audio data), and to optionally further provide user suggestions and/or directions if so identified and/or to otherwise assist in capturing corresponding additional data. In block 535, the routine then optionally preprocesses the acquired 360° panorama images before their subsequent use (e.g., for generating related mapping information, for providing information about features of rooms or other enclosing areas, etc.), such as to produce images of a particular type and/or in a particular format (e.g., to do non-linear processing to convert an initial version of the image to a final version, such as to modify the image from a CIE XYZ color format and/or a non-linear RGB color format to a standard RGB color space format; to generate a straightened equirectangular projection for each such image, with straight vertical data such as the sides of a typical rectangular door frame or a typical border between 2 adjacent walls remaining straight, and with straight horizontal data such as the top of a typical rectangular door frame or a border between a wall and a floor remaining straight at a horizontal midline of the image but being increasingly curved in the equirectangular projection image in a convex manner relative to the horizontal midline as the distance increases in the image from the horizontal midline; etc.). After block 535, the routine continues to block 540 to optionally perform a Multi-Room Image White Balancing Manager (MRIWBM) routine to perform room-specific white balancing corrections to one or some or all acquired images that each has visual coverage of portions of multiple rooms or other separate spatial regions with different illumination characteristics, with one example of such a routine further illustrated with respect to FIG. 4. After the results of the MRIWBM routine are received in block 540, or if the MRIWBM routine is not performed, the images and any associated generated or obtained information are stored for later use in block 580 (e.g., an initial version of each image after block 530, a finalized version of each image after block 535, etc.), and optionally provided to one or more recipients (e.g., to block 612 of routine 600 if invoked from that block). FIGS. 6A-6B illustrate one example of a routine for generating a floor plan representation of a building interior from the generated panorama information.

If it is instead determined in block 510 that the instructions or other information received in block 505 are not to acquire images and other data representing a building interior, the routine continues instead to block 590 to perform any other indicated operations as appropriate, such as to configure parameters to be used in various operations of the system (e.g., based at least in part on information specified by a user of the system, such as a user of a mobile device who captures one or more building interiors, an operator user of the ICA system, etc.), to respond to requests for generated and stored information (e.g., to identify one or more groups of inter-connected linked panorama images each representing a building or part of a building that match one or more specified search criteria, one or more panorama images that match one or more specified search criteria, etc.), to generate and store inter-panorama image connections between panorama images for a building or other structure (e.g., for each panorama image, to determine directions within that panorama image toward one or more other acquisition locations of one or more other panorama images, such as to enable later display of an arrow or other visual representation with a panorama image for each such determined direction from the panorama image to enable an end-user to select one of the displayed visual representations to switch to a display of the other panorama image at the other acquisition location to which the selected visual representation corresponds), to obtain and store other information about users of the system, to perform any housekeeping tasks, etc.

Following blocks 580 or 590, the routine proceeds to block 595 to determine whether to continue, such as until an explicit indication to terminate is received, or instead only if an explicit indication to continue is received. If it is determined to continue, the routine returns to block 505 to await additional instructions or information, and if not proceeds to step 599 and ends.

FIGS. 6A-6B illustrate an example embodiment of a flow diagram for a MIGM (Mapping Information Generation Manager) system routine 600, such as to perform a corresponding computer-implemented method. The routine may be performed by, for example, execution of the MIGM system 160 of FIG. 1, the MIGM system 389 of FIG. 3, and/or a MIGM system as described with respect to FIGS. 2A-2H and elsewhere herein, such as to determine a room shape for a room (or other defined area) by analyzing information from one or more images acquired in the room (e.g., one or more 360° panorama images), to generate a partial or complete floor plan for a building or other defined area based at least in part on one or more images of the area and optionally additional data captured by a mobile computing device, and/or to generate other mapping information for a building or other defined area based at least in part on one or more images of the area and optionally additional data captured by a mobile computing device. In the example of FIGS. 6A-6B, the determined room shape for a room may be a 2D room shape to represent the locations of the walls of the room or a 3D fully closed combination of planar surfaces to represent the locations of walls and ceiling and floor of the room, optionally along with determined locations of doorways and non-doorway wall openings and other inter-region separators, and the generated mapping information for a building (e.g., a house) may include a 2D floor plan and/or 3D computer model floor plan, but in other embodiments, other types of room shapes and/or mapping information may be generated and used in other manners, including for other types of structures and defined areas, as discussed elsewhere herein.

The illustrated embodiment of the routine begins at block 605, where information or instructions are received. The routine continues to block 610 to determine whether image information is already available to be analyzed for one or more rooms (e.g., for some or all of an indicated building, such as based on one or more such images received in block 605 as previously generated by the ICA routine), or if such image information instead is to be currently acquired. If it is determined in block 610 to currently acquire some or all of the image information, the routine continues to block 612 to acquire such information, optionally waiting for one or more users or devices to move throughout one or more rooms of a building and acquire panoramas or other images at one or more acquisition locations in one or more of the rooms (e.g., at multiple acquisition locations in each room of the building), optionally along with metadata information regarding the acquisition and/or interconnection information related to movement between acquisition locations, as discussed in greater detail elsewhere herein-implementation of block 612 may, for example, include invoking an ICA system routine to perform such activities, with FIG. 5 providing one example embodiment of an ICA system routine for performing such image acquisition. If it is instead determined in block 610 not to currently acquire the images, the routine continues instead to block 615 to obtain one or more existing panoramas or other images from one or more acquisition locations in one or more rooms (e.g., multiple images acquired at multiple acquisition locations that include at least one image and acquisition location in each room of a building), optionally along with metadata information regarding the acquisition and/or interconnection information related to movement between the acquisition locations, such as may in some situations have been supplied in block 605 along with the corresponding instructions.

After blocks 612 or 615, the routine continues to block 620, where it determines whether to generate mapping information that includes a linked set of target panorama images (or other images) for a building or other group of rooms (referred to at times as a 'virtual tour', such as to enable an end user to move from any one of the images of the linked set to one or more other images to which that starting current image is linked, including in some embodiments via selection of a user-selectable control for each such other linked image that is displayed along with a current image, optionally by overlaying visual representations of such user-selectable controls and corresponding inter-image directions on the visual data of the current image, and to similarly move from that next image to one or more additional images to which that next image is linked, etc.), and if so continues to block 625. The routine in block 625 selects pairs of at least some of the images (e.g., based on the images of a pair having overlapping visual content), and determines, for each pair, relative directions between the images of the pair based on shared visual content and/or on other captured linking interconnection information (e.g., movement information) related to the images of the pair (whether movement directly from the acquisition location for one image of a pair to the acquisition location of another image of the pair, or instead movement between those starting and ending acquisition locations via one or more other intermediary acquisition locations of other images). The routine in block 625 may further optionally use at least the relative direction information for the pairs of images to determine global relative positions of some or all of the images to each other in a common coordinate system, and/or generate the inter-image links and corresponding user-selectable controls as noted above. Additional details are included elsewhere herein regarding creating such a linked set of images.

After block 625, or if it is instead determined in block 620 that the instructions or other information received in block 605 are not to determine a linked set of images, the routine continues to block 635 to determine whether the instructions received in block 605 indicate to generate other mapping information for an indicated building (e.g., a floor plan), and if so the routine continues to perform some or all of blocks 637-685 to do so, and otherwise continues to block 690. In block 637, the routine optionally obtains additional information about the building, such as from activities performed during acquisition and optionally analysis of the images, and/or from one or more external sources (e.g., online databases, information provided by one or more end users, etc.)—such additional information may include, for example, exterior dimensions and/or shape of the building, additional images and/or annotation information acquired corresponding to particular locations external to the building (e.g., surrounding the building and/or for other structures on the same property, from one or more overhead locations, etc.), additional images and/or annotation information acquired corresponding to particular locations within the building (optionally for locations different from acquisition locations of the acquired panorama images or other images), etc.

After block 637, the routine continues to block 640 to select the next room (beginning with the first) for which one or more images (e.g., 360° panorama images) acquired in the room are available, and to analyze the visual data of the image(s) for the room to determine a room shape (e.g., by determining at least wall locations), optionally along with determining uncertainty information about walls and/or other parts of the room shape, and optionally including identifying other wall and floor and ceiling elements (e.g., wall structural elements/features, such as windows, doorways and stairways and other inter-room wall openings and connecting passages, wall borders between a wall and another wall and/or ceiling and/or floor, etc.) and their positions within the determined room shape of the room. In some embodiments, the room shape determination may include using boundaries of the walls with each other and at least one of the floor or ceiling to determine a 2D room shape (e.g., using one or trained machine learning models), while in other embodiments the room shape determination may be performed in other manners (e.g., by generating a 3D point cloud of some or all of the room walls and optionally the ceiling and/or floor, such as by analyzing at least visual data of the panorama image and optionally additional data captured by an image acquisition device or associated mobile computing device, optionally using one or more of SfM (Structure from Motion) or SLAM (Simultaneous Location And Mapping) or MVS (Multi-View Stereo) analysis). In addition, the activities of block 640 may further optionally determine and use initial pose information for each of those panorama images (e.g., as supplied with acquisition metadata for the panorama image), and/or obtain and use additional metadata for each panorama image (e.g., acquisition height information of the camera device or other image acquisition device used to acquire a panorama image relative to the floor and/or the ceiling). Additional details are included elsewhere herein regarding determining room shapes and identifying additional information for the rooms. After block 640, the routine continues to block 645, where it determines whether there are more rooms for which to determine room shapes based on images acquired in those rooms, and if so returns to block 640 to select the next such room for which to determine a room shape.

If it is instead determined in block 645 that there are not more rooms for which to generate room shapes, the routine continues to block 660 to determine whether to further generate at least a partial floor plan for the building (e.g., based at least in part on the determined room shape(s) from block 640, and optionally further information regarding how to position the determined room shapes relative to each other). If not, such as when determining only one or more room shapes without generating further mapping information for a building (e.g., to determine the room shape for a single room based on one or more images acquired in the room by the ICA system), the routine continues to block 688. Otherwise, the routine continues to block 665 to retrieve one or more room shapes (e.g., room shapes generated in block 645) or otherwise obtain one or more room shapes (e.g., based on human-supplied input) for rooms of the building, whether 2D or 3D room shapes, and then continues to block 670. In block 670, the routine uses the one or more room shapes to create an initial floor plan (e.g., an initial 2D floor plan using 2D room shapes and/or an initial 3D floor plan using 3D room shapes), such as a partial floor plan that includes one or more room shapes but less than all room shapes for the building, or a complete floor plan that includes all room shapes for the building. If there are multiple room shapes, the routine in block 670 further determines positioning of the room shapes relative to each other, such as by using visual overlap between images from multiple acquisition locations to determine relative positions of those acquisition locations and of the room shapes surrounding those acquisition locations, and/or by using other types of information (e.g., using connecting inter-room passages between rooms, optionally applying one or more constraints or optimizations, etc.). In at least some embodiments, the routine in block 670 further refines some or all of the room shapes by generating a binary segmentation mask that covers the relatively positioned room shape(s), extracting a polygon representing the outline or contour of the segmentation mask, and separating the polygon into the refined room shape(s). Such a floor plan may include, for example, relative position and shape information for the various rooms without providing any actual dimension information for the individual rooms or building as a whole, and may further include multiple linked or associated sub-maps (e.g., to reflect different stories, levels, sections, etc.) of the building. The routine further optionally associates positions of the doors, wall openings and other identified wall elements on the floor plan.

After block 670, the routine optionally performs one or more steps 680-685 to determine and associate additional information with the floor plan. In block 680, the routine optionally estimates the dimensions of some or all of the rooms, such as from analysis of images and/or their acquisition metadata or from overall dimension information obtained for the exterior of the building, and associates the estimated dimensions with the floor plan—it will be appreciated that if sufficiently detailed dimension information is available, architectural drawings, blueprints, etc. may be generated from the floor plan. After block 680, the routine continues to block 683 to optionally associate further information with the floor plan (e.g., with particular rooms or other locations within the building), such as additional existing images with specified positions and/or annotation information. In block 685, if the room shapes from block 645 are not 3D room shapes, the routine further optionally estimates heights of walls in some or all rooms, such as from analysis of images and optionally sizes of known objects in the images, as well as height information about a camera when the images were acquired, and uses that height information to generate 3D room shapes for the rooms. The routine further optionally uses the 3D room shapes (whether from block 640 or block 685) to generate a 3D computer model floor plan of the building, with the 2D and 3D floor plans being associated with each other—in other embodiments, only a 3D computer model floor plan may be generated and used (including to provide a visual representation of a 2D floor plan if so desired by using a horizontal slice of the 3D computer model floor plan).

After block 685, or if it is instead determined in block 660 not to determine a floor plan, the routine continues to block 688 to store the determined room shape(s) and/or generated mapping information and/or other generated information, to optionally provide some or all of that information to one or more recipients, and to optionally further use some or all of the determined and generated information, such as to provide the generated 2D floor plan and/or 3D computer model floor plan for display on one or more client devices and/or to one or more other devices for use in automating navigation of those devices and/or associated vehicles or other entities, to similarly provide and use information about determined room shapes and/or a linked set of panorama images and/or about additional information determined about contents of rooms and/or passages between rooms, etc.

If it is instead determined in block 635 that the information or instructions received in block 605 are not to generate mapping information for an indicated building, the routine continues instead to block 690 to perform one or more other indicated operations as appropriate. Such other operations may include, for example, receiving and responding to requests for previously generated floor plans and/or previously determined room shapes and/or other generated information (e.g., requests for such information for display on one or more client devices, requests for such information to provide it to one or more other devices for use in automated navigation, etc.), obtaining and storing information about buildings for use in later operations (e.g., information about dimensions, numbers or types of rooms, total square footage, adjacent or nearby other buildings, adjacent or nearby vegetation, exterior images, etc.), etc.

After blocks 688 or 690, the routine continues to block 695 to determine whether to continue, such as until an explicit indication to terminate is received, or instead only if an explicit indication to continue is received. If it is determined to continue, the routine returns to block 605 to wait for and receive additional instructions or information, and otherwise continues to block 699 and ends.

While not illustrated with respect to the automated operations shown in the example embodiment of FIGS. 6A-6B, in some embodiments human users may further assist in facilitating some of the operations of the MIGM system, such as for operator users and/or end users of the MIGM system to provide input of one or more types that is further used in subsequent automated operations. As non-exclusive examples, such human users may provide input of one or more types as follows: to provide input to assist with the linking of a set of images, such as to provide input in block 625 that is used as part of the automated operations for that block (e.g., to specify or adjust initial automatically determined directions between one or more pairs of images, to specify or adjust initial automatically determined final global positions of some or all of the images relative to each other, etc.); to provide input in block 637 that is used as part of subsequent automated operations, such as one or more of the illustrated types of information about the building; to provide input with respect to block 640 that is used as part of subsequent automated operations, such as to specify or adjust initial automatically determined element locations and/or estimated room shapes and/or to manually combine information from multiple estimated room shapes for a room (e.g., separate room shape estimates from different images acquired in the room) to create a final room shape for the room and/or to specify or adjust initial automatically determined information about a final room shape, etc.; to provide input with respect to block 670 that is used as part of subsequent operations, such as to specify or adjust initial automatically determined positions of room shapes within a floor plan being generated and/or to specify or adjust initial automatically determined room shapes themselves within such a floor plan; to provide input with respect to one or more of blocks 680 and 683 and 685 that is used as part of subsequent operations, such as to specify or adjust initial automatically determined information of one or more types discussed with respect to those blocks; and/or to specify or adjust initial automatically determined pose information (whether initial pose information or subsequent updated pose information) for one or more of the panorama images; etc. Additional details are included elsewhere herein regarding embodiments in which one or more human users provide input that is further used in additional automated operations of the MRIWBM system.

FIG. 7 illustrates an example embodiment of a flow diagram for a Building Information Access system routine 700, such as to perform a corresponding computer-implemented method. The routine may be performed by, for example, execution of a building information access client computing device 175 and its software system(s) (not shown) of FIG. 1, a client computing device 105,175 of FIG. 3, and/or a building information access viewer or presentation system as described elsewhere herein, such as to receive and display generated floor plans and/or other mapping information (e.g., determined room structural layouts/shapes, etc.) for a defined area that optionally include visual indications of one or more determined image acquisition locations, to obtain and display information about images (e.g., white-balanced corrected modified images; images matching one or more indicated target images; etc.), to display additional information (e.g., images) associated with particular acquisition locations in the mapping information, to obtain and display guidance acquisition instructions provided by the MRIWBM system and/or other sources (e.g., with respect to other images acquired during that acquisition session and/or for an associated building, such as part of a displayed GUI), to obtain and display explanations or other descriptions of matching between two or more buildings or properties, etc. In the example of FIG. 7, the presented mapping information is for a building (such as an interior of a house), but in other embodiments, other types of mapping information may be presented for other types of buildings or environments and used in other manners, as discussed elsewhere herein.

The illustrated embodiment of the routine begins at block 705, where instructions or information are received. At block 710, the routine determines whether the received instructions or information in block 705 are to display determined information for one or more target buildings, and if so continues to block 715 to determine whether the received instructions or information in block 705 are to select one or more target buildings using specified criteria (e.g., based at least in part on an indicated building), and if not continues to block 725 to obtain an indication of a target building to use from the user (e.g., based on a current user selection, such as from a displayed list or other user selection mechanism; based on information received in block 705; etc.). Otherwise, if it is determined in block 715 to select one or more target buildings from specified criteria (e.g., based at least in part on an indicated building), the routine continues instead to block 720, where it obtains indications of one or more search criteria to use, such as from current user selections or as indicated in the information or instructions received in block 705, and then searches stored information about buildings to determine one or more of the buildings that satisfy the search criteria or otherwise obtains indications of one or more such matching buildings. In the illustrated embodiment, the routine then further selects a best match target building from the one or more returned buildings (e.g., the returned other building with the highest similarity or other matching rating for the specified criteria, or using another selection technique indicated in the instructions or other information received in block 705), while in other embodiments the routine may instead present multiple candidate buildings that satisfy the search criteria (e.g., in a ranked order based on degree of match) and receive a user selection of the target building from the multiple candidates.

After blocks 720 or 725, the routine continues to block 735 to retrieve a floor plan for the target building and/or other generated mapping information for the building (e.g., a group of inter-linked images for use as part of a virtual tour), and optionally indications of associated linked information for the building interior and/or a surrounding location external to the building, and/or information about one or more generated explanations or other descriptions of why the target building is selected as matching specified criteria (e.g., based in part or in whole on one or more other indicated buildings), and selects an initial view of the retrieved information (e.g., a view of the floor plan, a particular room shape, a particular image, etc., optionally along with generated explanations or other descriptions of why the target building is selected to be matching if such information is available). In block 740, the routine then displays or otherwise presents the current view of the retrieved information, and waits in block 745 for a user selection. After a user selection in block 745, if it is determined in block 750 that the user selection corresponds to adjusting the current view for the current target building (e.g., to change one or more aspects of the current view), the routine continues to block 755 to update the current view in accordance with the user selection, and then returns to block 740 to update the displayed or otherwise presented information accordingly. The user selection and corresponding updating of the current view may include, for example, displaying or otherwise presenting a piece of associated linked information that the user selects (e.g., a particular image associated with a displayed visual indication of a determined acquisition location, such as to overlay the associated linked information over at least some of the previous display; a particular other image linked to a current image and selected from the current image using a user-selectable control overlaid on the current image to represent that other image; etc.), and/or changing how the current view is displayed (e.g., zooming in or out; rotating information if appropriate; selecting a new portion of the floor plan to be displayed or otherwise presented, such as with some or all of the new portion not being previously visible, or instead with the new portion being a subset of the previously visible information; etc.). If it is instead determined in block 750 that the user selection is not to display further information for the current target building (e.g., to display information for another building, to end the current display operations, etc.), the routine continues instead to block 795, and returns to block 705 to perform operations for the user selection if the user selection involves such further operations.

If it is instead determined in block 710 that the instructions or other information received in block 705 are not to present information representing a building, the routine continues instead to block 760 to determine whether the instructions or other information received in block 705 correspond to identifying other images (if any) corresponding to one or more indicated target images, and if so continues to blocks 765-770 to perform such activities. In particular, the routine in block 765 receives the indications of the one or more target images for the matching (such as from information received in block 705 or based on one or more current interactions with a user, and optionally being one or more white-balanced corrected modified images) along with one or more matching criteria (e.g., an amount of visual overlap), and in block 770 identifies one or more other images (if any) that match the indicated target image(s), such as by interacting with the ICA and/or MIGM systems to obtain the other image(s), and with the identified other image(s) optionally being white-balanced corrected modified images. The routine then displays or otherwise provides information in block 770 about the identified other image(s), such as to provide information about them as part of search results, to display one or more of the identified other image(s), etc. If it is instead determined in block 760 that the instructions or other information received in block 705 are not to identify other images corresponding to one or more indicated target images, the routine continues instead to block 775 to determine whether the instructions or other information received in block 705 correspond to obtaining and providing guidance acquisition instructions during an image acquisition session with respect to one or more indicated target images (e.g., a most recently acquired image), and if so continues to block 780, and otherwise continues to block 790. In block 780, the routine obtains information about guidance acquisition instructions of one or more types, such as by interacting with the ICA system, and displays or otherwise provides information in block 780 about the guidance acquisition instructions, such as by overlaying the guidance acquisition instructions on a partial floor plan and/or recently acquired image in manners discussed in greater detail elsewhere herein.

In block 790, the routine continues instead to perform other indicated operations as appropriate, such as to configure parameters to be used in various operations of the system (e.g., based at least in part on information specified by a user of the system, such as a user of a mobile device who acquires one or more building interiors, an operator user of the MRIWBM and/or MIGM systems, etc., including for use in personalizing information display for a particular user in accordance with his/her preferences), to obtain and store other information about users of the system, to respond to requests for generated and stored information (e.g., to display or otherwise provide one or more indicated images, such as white-balanced corrected modified images that are displayed individually and/or as part of a virtual tour of multiple inter-linked images through which a user may move by selecting a link on a currently displayed image to cause a resulting display of another image associated with the selected link; to perform any housekeeping tasks; etc.).

Following blocks 770 or 780 or 790, or if it is determined in block 750 that the user selection does not correspond to the current building, the routine proceeds to block 795 to determine whether to continue, such as until an explicit indication to terminate is received, or instead only if an explicit indication to continue is received. If it is determined to continue (including if the user made a selection in block 745 related to a new building to present), the routine returns to block 705 to await additional instructions or information (or to continue directly on to block 735 if the user made a selection in block 745 related to a new building to present), and if not proceeds to step 799 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention.

Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:

capturing, by a camera device positioned in a first room of a house, a panorama image with a plurality of color pixels having visual data that shows at least a first portion of the first room and at least a second portion of each of one or more second rooms of the house, wherein the first room is separated from the one or more second rooms by one or more inter-room passages that are visible in the visual data and that each is a doorway or a non-doorway wall opening, wherein the at least second portion of each of the one or more second rooms is visible through a respective one of the one or more inter-room passages, wherein each color pixel has multiple color values associated with respective red and green and blue color channels, and wherein each of the first and second rooms has a different illumination source at a time of the capturing;

generating, by one or more computing devices, a modified version of the panorama image with white balance corrections applied separately for different parts of the panorama image corresponding to each of the first and second rooms, including:

analyzing, by the one or more computing devices, the visual data of the panorama image to identify multiple groups of pixels including a first group of pixels associated with the first room and showing the at least portion of the first room, and further including one or more second groups of pixels each associated with a respective one of the one or more second rooms and showing the at least portion of that second room, wherein identifying of the multiple groups of pixels includes identifying each of the one or more inter-room passages in the visual data, and selecting pixels within each identified inter-room passage as one of the one or more second groups of pixels;

determining, by the one or more computing devices and for each of the multiple groups of pixels, a neutral pixel of that group having differences between the multiple color values of the neutral pixel that are below a defined threshold, wherein the determining includes identifying a horizontal midline of the panorama image and selecting the neutral pixel for each of the multiple groups of pixels from above the horizontal midline; and producing, by the one or more computing devices, the modified version of the panorama image by performing white balance corrections that include, for each of the multiple groups of pixels and using the determined neutral pixel for that group, performing chromatic adjustments on at least some pixels in that group to correspond to the illumination source for the room with which the group is associated by adjusting the red and green and blue channel values for each of the at least some pixels to reflect the differences between the multiple color values of that determined neutral pixel for that group, wherein first chromatic adjustments performed for the first group of pixels associated with the first room are different from each second chromatic adjustment performed for one of the one or more second groups of pixels associated with a respective one second room of the one or more second rooms; and presenting, by the one or more computing devices, the generated modified version of the panorama image in a displayed graphical user interface.

2. A computer-implemented method comprising:

obtaining, by one or more computing devices, a panorama image captured by a camera at a building and having visual data from a plurality of color pixels that show at least a portion of each of multiple rooms of the building, wherein each color pixel has multiple color values for multiple respective color channels, wherein the multiple rooms have different levels of illumination at a time of capturing the panorama image, and wherein the multiple rooms are separated by one or more inter-room passages that each includes a doorway or a non-doorway wall opening;

analyzing, by the one or more computing devices, the visual data of the panorama image to identify multiple groups of pixels each associated with a respective one of the multiple rooms and showing the at least portion of that room, the analyzing including identifying and using at least some of each of the one or more inter-room passages that is visible in the visual data;

determining, by the one or more computing devices and for each of the multiple groups of pixels, one or more neutral pixels of that group each having differences between the multiple color values of that neutral pixel below a defined threshold;

generating, by the one or more computing devices, a modified panorama image by performing white balance corrections that include, for each of the multiple groups of pixels, using the determined one or more neutral pixels for that group to perform chromatic adjustments on at least some pixels in that group to correct for the level of illumination in the room with which the group is associated by using the differences between the multiple color values of each of those one or more neutral pixels, wherein first chromatic adjustments performed for a first group of pixels associated with a first room of the multiple rooms are different from second chromatic adjustments performed for a second group of pixels associated with a second room of the multiple rooms; and providing, by the one or more computing devices, the generated modified panorama image for display.

3. The computer-implemented method of claim 2 wherein the analyzing of the visual data of the panorama image includes identifying a horizontal midline of the panorama image, and wherein the determining of the one or more neutral pixels of each of the multiple groups of pixels includes selecting the one or more neutral pixels for that group from above the horizontal midline.

4. A system comprising:

one or more hardware processors of one or more computing devices; and one or more memories with stored instructions that, when executed by at least one of the one or more hardware processors, cause at least one computing device of the one or more computing devices to perform automated operations including at least:

obtaining an image captured by a camera at a building and having a plurality of color pixels with visual data showing at least a portion of each of multiple rooms of the building, wherein each color pixel has multiple color values associated with multiple respective color channels, and wherein the multiple rooms are separated by one or more inter-room passages that each includes a doorway or a non-doorway wall opening;

analyzing the visual data of the image to identify multiple groups of pixels each associated with a respective one of the multiple rooms and showing the at least portion of that room, the analyzing being based on at least some of each of the one or more inter-room passages that is visible in the visual data;

determining, for each of the multiple groups of pixels, a neutral pixel of that group;

generating a modified image by performing white balance corrections that include, for each of the multiple groups of pixels, using the determined neutral pixel for that group to perform chromatic adjustments on at least some pixels in that group by adjusting the multiple color values of each of the at least some pixels using differences between the multiple color values of the neutral pixel, wherein first chromatic adjustments performed for a first group of pixels associated with a first room of the multiple rooms are different from second chromatic adjustments performed for a second group of pixels associated with a second room of the multiple rooms; and providing the generated modified image.

5. The system of claim 4 wherein the image is a panorama image having 360 degrees of horizonal visual coverage around a vertical axis, wherein the determining of the neutral pixel for each of the multiple groups of pixels includes determining one or more neutral pixels for each group based at least in part on differences between the multiple color values of each of the one or more neutral pixels being below a defined threshold, and wherein the analyzing of the visual data includes identifying each of the one or more inter-room passages in the visual data of the panorama image, and includes selecting, for each of the identified one or more inter-room passages, pixels within that identified inter-room passage in the visual data to be one of the multiple groups of pixels.

6. A non-transitory computer-readable medium having stored contents that cause one or more computing devices to perform automated operations, the automated operations including at least:

obtaining, by the one or more computing devices, a panorama image captured by a camera at a building and having a plurality of color pixels with visual data that shows at least a portion of each of multiple spatial regions at the building separated by one or more inter-region separators, wherein each color pixel has multiple color values associated with multiple respective color channels;

analyzing, by the one or more computing devices, the visual data of the panorama image to identify multiple groups of pixels each associated with a respective one of the multiple spatial regions and showing the at least portion of that spatial region, the analyzing being based on at least some of each of the one or more inter-region separators that is visible in the visual data;

determining, by the one or more computing devices and for each of the multiple groups of pixels, a neutral pixel of that group;

generating, by the one or more computing devices, a modified panorama image by performing white balance corrections that include, for each of the multiple groups of pixels, using the determined neutral pixel for that group to perform chromatic adjustments on of at least some pixels in that group by adjusting the multiple color values of each of the at least some pixels using differences between the multiple color values of the neutral pixel, wherein first chromatic adjustments performed for a first group of pixels associated with a first spatial region of the multiple spatial regions are different from second chromatic adjustments performed for a second group of pixels associated with a second spatial region of the multiple spatial regions; and providing, by the one or more computing devices, the generated modified panorama image.

7. The non-transitory computer-readable medium of claim 6 wherein the multiple spatial regions are each a respective one of multiple rooms of the building, wherein the one or more inter-region separators are one or more inter-room passages that each includes a doorway or a non-doorway wall opening, and wherein the analyzing of the visual data includes identifying each of the one or more inter-room passages in the visual data of the panorama image, and includes selecting, for each of the identified one or more inter-room passages, pixels within that identified inter-room passage in the visual data to be one of the multiple groups of pixels.

8. The non-transitory computer-readable medium of claim 6 wherein the multiple spatial regions are each a separate exterior area outside of the building and having different illumination levels at a time of capturing the panorama image, and wherein the one or more inter-region separators are each a passage between at least two spatial regions of the multiple spatial regions.

9. The non-transitory computer-readable medium of claim 6 wherein the multiple spatial regions are each a respective subset of a room of the building having different illumination sources at a time of capturing the panorama image, and wherein the one or more inter-region separators are each a visual separator between at least two spatial regions of the multiple spatial regions.

10. The computer-implemented method of claim 2 wherein the analyzing of the visual data of the panorama image includes identifying a horizontal midline of the panorama image, wherein the determining of the one or more neutral pixels of each of the multiple groups of pixels includes selecting the one or more neutral pixels for that group from above the horizontal midline, and wherein the method further comprises at least one of:

presenting, by the one or more computing devices and using a plurality of panorama images captured in a plurality of rooms of the indicated building, a generated floor plan of the building that includes room shapes of the plurality of rooms positioned relative to each other and having at least relative sizes, including modifying the plurality of panorama images to include white balance corrections, and including analyzing visual data of the modified plurality of panorama images to identify multiple visible doorways and to determine the room shapes of the plurality of rooms, and including generating the floor plan using the analyzed visual data, wherein the plurality of rooms include the multiple rooms and include one or more other rooms; or filtering, by the one or more computing devices and before the generating of the modified version of the panorama image by performing the white balance corrections, some pixels of the panorama image that are in a CIE XYZ color space format and that have saturated color based at least in part on the multiple color values of that pixel being above a second defined threshold, wherein the panorama image is captured in the CIE XYZ color space format and is converted by the camera to a standard RGB (red-green-blue) color space format using non-linear processing, and wherein the method further comprises reverting, before the filtering, the panorama image to the CIE XYZ color space format; or performing, by the one or more computing devices, the white balance corrections for each of the multiple groups of pixels by correcting for the level of illumination in the room with which the group is associated using a gray world analysis based on the color pixels in that group having an average color that is substantially a neutral gray; or performing, by the one or more computing devices, the white balance corrections for each of the multiple groups of pixels by correcting for the level of illumination in the room with which the group is associated using a white patch analysis by selecting the one or more neutral pixels for that group using a lightest patch of pixels in that group; or performing, by the one or more computing devices, the analyzing of the visual data of the panorama image and the white balance corrections for each of the multiple groups of pixels using a raw image format in which an original version of the panorama image is captured, and converting the panorama image in the raw image format after the performing of the white balance corrections to a standard RGB (red-green-blue) format that is used for displaying the generated modified panorama image as part of the providing of the generated modified panorama image for display; or performing, by the one or more computing devices, the analyzing of the visual data of the panorama image by identifying a subset of the plurality of color pixels representing one or more ceilings of the building, and selecting the one or more neutral pixels for each of the multiple groups of pixels from the subset of the plurality of color pixels as part of the determining of the one or more neutral pixels for that group of pixels; or performing, by the one or more computing devices and based at least in part on the visual data further showing at least a portion of an exterior region that is outside of the building and has a level of illumination separate from the different levels of illumination for the multiple rooms and that is separated from the building by at least one interior-exterior separator, the generating of the modified panorama image by using, for an additional group of pixels that are associated with the exterior region and that show the at least portion of the exterior region and that are identified based at least in part on at least some of the interior-exterior separator that is visible in the visual data, one or more additional determined neutral pixels for the additional group of pixels to perform further chromatic adjustments on at least some pixels in the additional group by adjusting the multiple color values of each of the at least some pixels using differences between the multiple color values for the determined one or more additional neutral pixels; or determining, by the one or more computing devices and for identified pixels of the panorama image that are above a horizon line in the panorama image and that each has a value for a blue color channel above a defined blue threshold and values for red and green color channels below one or more other defined other thresholds, that the panorama image is an interior panorama image based at least in part on an amount of those identified pixels being below a defined quantity threshold; or performing, by the one or more computing devices, the providing of the generated modified panorama image for display by transmitting the generated modified panorama image over one or more computer networks to a client device for display on the client device.

* * * * *